(12) United States Patent
Baek et al.

(10) Patent No.: US 10,194,112 B2
(45) Date of Patent: Jan. 29, 2019

(54) DISPLAY DEVICE AND CONTROL METHOD THEREFOR

(71) Applicant: LG ELECTRONICS INC., Seoul (KR)

(72) Inventors: Sanghyun Baek, Seoul (KR); Miyeon Kwon, Seoul (KR); Kyungryun Lee, Seoul (KR); Hyeongjin Park, Seoul (KR); Jeean Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/576,168

(22) PCT Filed: Sep. 16, 2015

(86) PCT No.: PCT/KR2015/009701
§ 371 (c)(1),
(2) Date: Nov. 21, 2017

(87) PCT Pub. No.: WO2017/003022
PCT Pub. Date: Jan. 5, 2017

(65) Prior Publication Data
US 2018/0139405 A1    May 17, 2018

(30) Foreign Application Priority Data

Jun. 29, 2015 (KR) .................. 10-2015-0092127
Jul. 20, 2015 (KR) .................. 10-2015-0102183

(51) Int. Cl.
*H04N 5/44* (2011.01)
*H04N 5/445* (2011.01)
(Continued)

(52) U.S. Cl.
CPC ............ *H04N 5/4403* (2013.01); *G06T 3/40* (2013.01); *H04N 5/44* (2013.01);
(Continued)

(58) Field of Classification Search
CPC ............ H04N 5/4403; H04N 5/44513; H04N 5/44582; H04N 5/44543; H04N 5/44591;
(Continued)

(56) References Cited

U.S. PATENT DOCUMENTS 7,610,599 B1 * 10/2009 Nashida ............. H04N 5/44543
725/38
2010/0026721 A1   2/2010 Park et al.
(Continued)

FOREIGN PATENT DOCUMENTS

JP      2005-316558 A    11/2005
KR   10-2005-0058743 A    6/2005
(Continued)

*Primary Examiner* — Sherrie Hsia
(74) *Attorney, Agent, or Firm* — Birch, Stewart, Kolasch & Birch, LLP

(57) ABSTRACT

A broadcast receiver according to one embodiment of the present invention comprises: a tuner for receiving a broadcast signal; a display module for displaying content on a main screen; an interface module for receiving, from a remote control, a first command for selecting a specific location on the main screen; and a controller for controlling the tuner, the display module, and the interface module, wherein the controller enlarges a specific region within a preset distance from the specific location according to the received first command, and displays the magnified specific region in a zoom window, and furthermore, the location of the zoom window varies according to a motion of the remote control.

22 Claims, 50 Drawing Sheets

(51) Int. Cl.
  *H04N 9/74* (2006.01)
  *H04N 21/2362* (2011.01)
  *H04N 21/41* (2011.01)
  *H04N 21/422* (2011.01)
  *H04N 21/472* (2011.01)
  *H04N 21/4728* (2011.01)
  *H04N 21/84* (2011.01)
  *G06T 3/40* (2006.01)

(52) U.S. Cl.
  CPC ..... *H04N 5/44513* (2013.01); *H04N 5/44582* (2013.01); *H04N 21/2362* (2013.01); *H04N 21/41* (2013.01); *H04N 21/422* (2013.01); *H04N 21/472* (2013.01); *H04N 21/4728* (2013.01); *H04N 21/84* (2013.01); *H04N 2005/443* (2013.01); *H04N 2005/4428* (2013.01); *H04N 2005/4432* (2013.01)

(58) Field of Classification Search
  CPC .......... H04N 5/2628; H04N 5/45; H04N 9/74; H04N 2005/4428; H04N 2005/443; H04N 2005/4432; H04N 21/4728; H04N 21/2343; H04N 21/45; H04N 21/422; H04N 21/41; H04N 21/472; H04N 21/2362; H04N 21/475; H04N 21/84; G06T 3/40
  USPC ....... 348/734, 561, 562, 581, 563–565, 704, 348/569, 596; 725/37, 43
  IPC ............................. H04N 9/74,5/445, 5/44, 5/45
  See application file for complete search history.

(56) References Cited

U.S. PATENT DOCUMENTS

| | | | |
|---|---|---|---|
| 2011/0265118 A1* | 10/2011 | Choi | H04N 5/4401 725/37 |
| 2013/0254694 A1 | 9/2013 | Lee | |
| 2014/0218611 A1 | 8/2014 | Park et al. | |
| 2018/0098018 A1* | 4/2018 | Cho | H04N 5/44582 |

FOREIGN PATENT DOCUMENTS

| | | |
|---|---|---|
| KR | 10-2014-0031352 A | 3/2014 |
| WO | WO 2011/132840 A1 | 10/2011 |

* cited by examiner

FIG. 16A
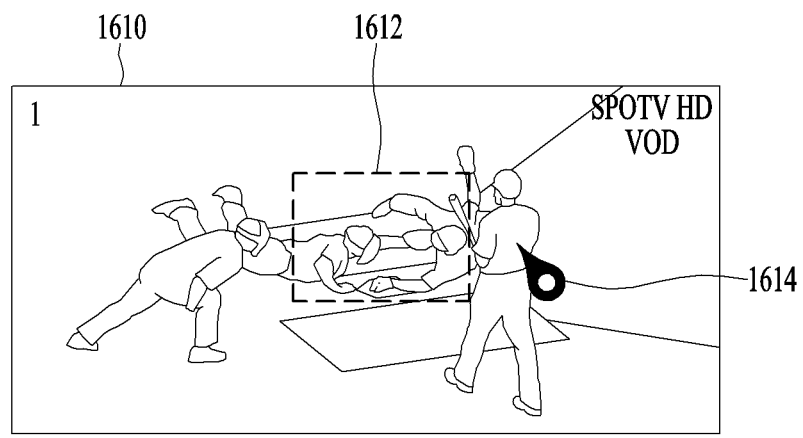
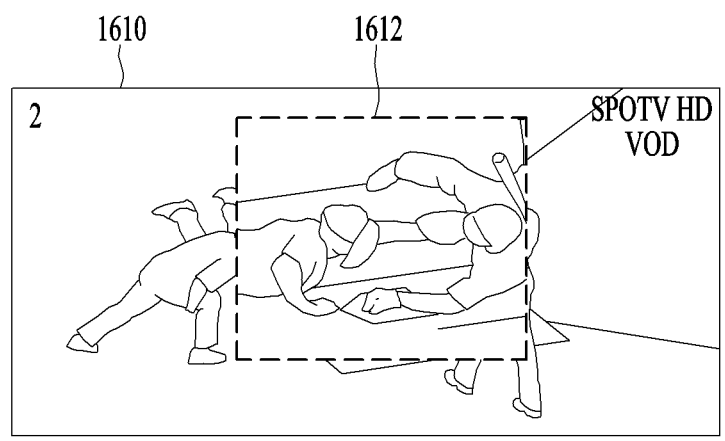

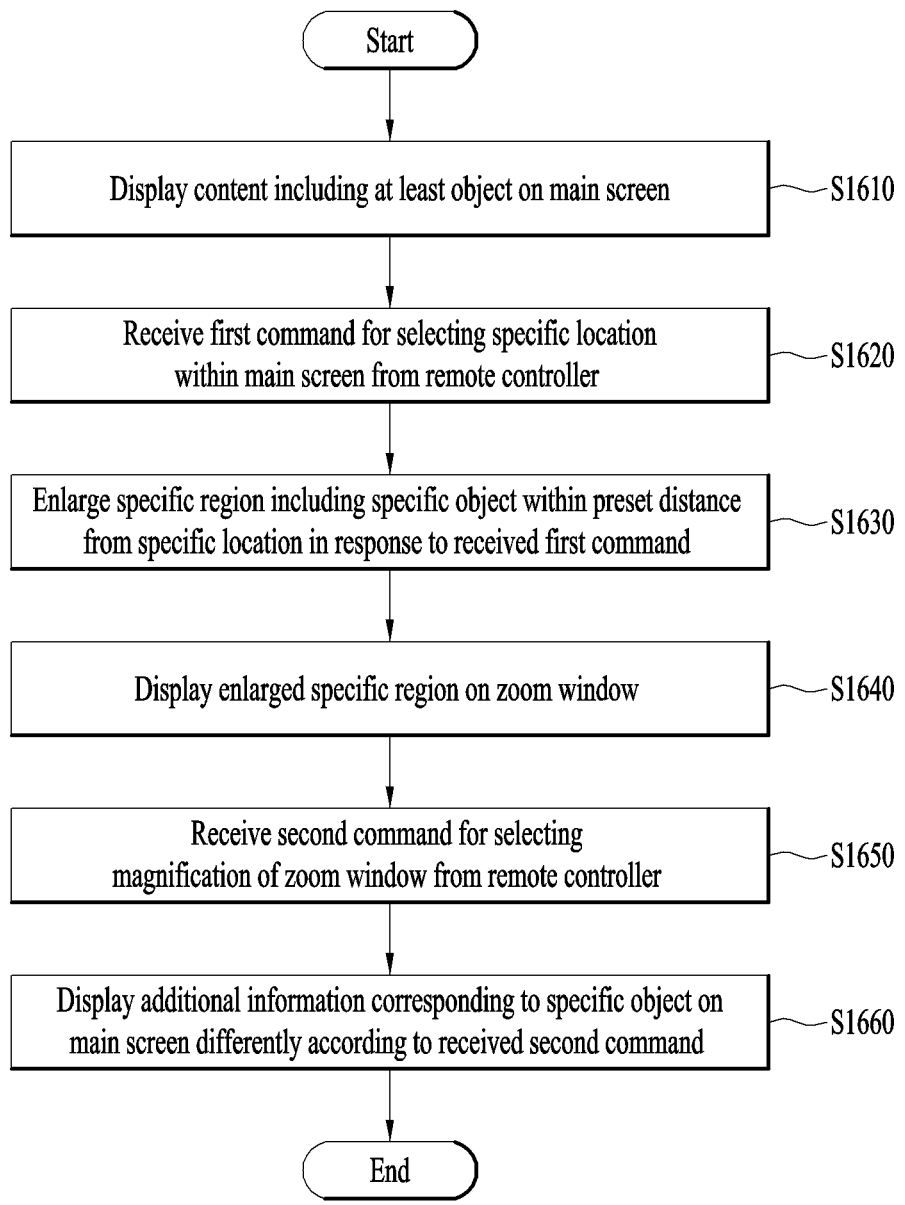

FIG. 25
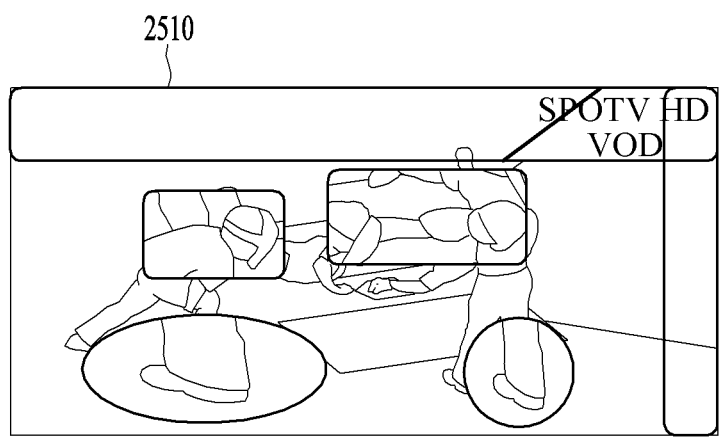
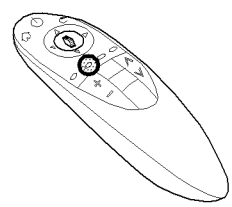

FIG. 29
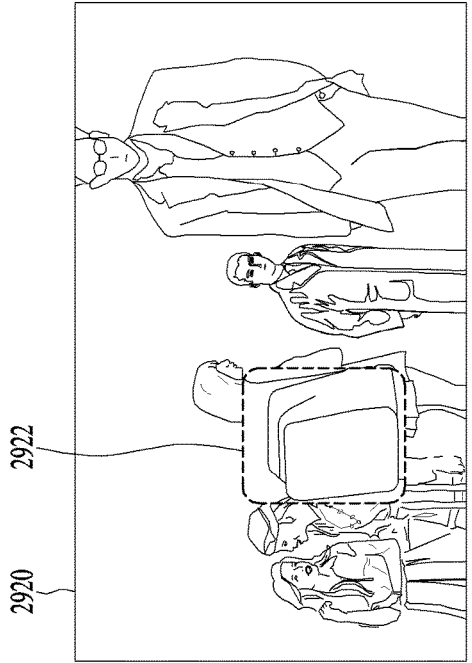
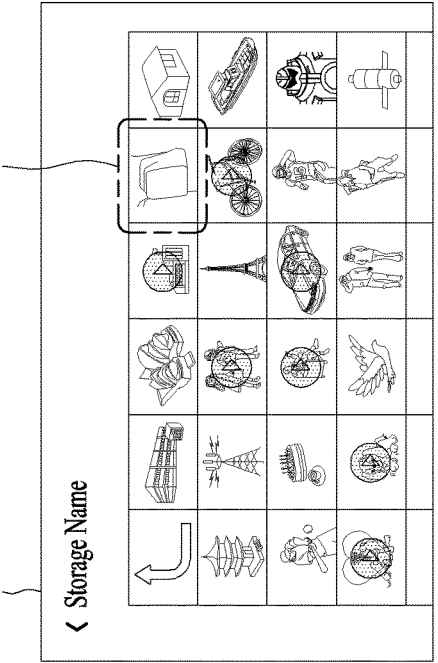
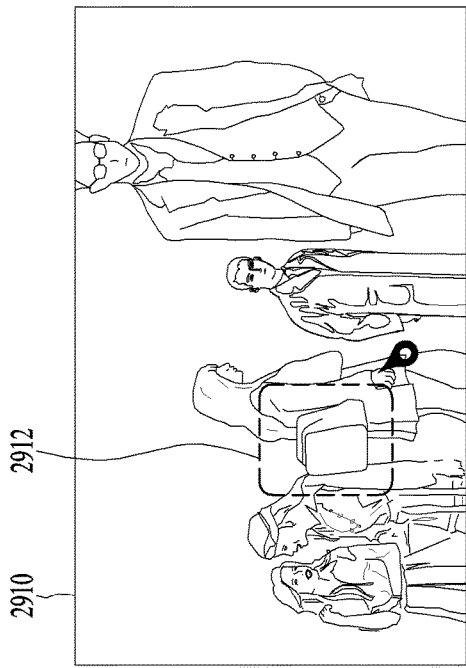
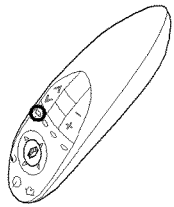

FIG. 32

| | Specific object enlargement |
|---|---|
| Mouth shape change rate is smaller than threshold. | X |
| Mouth shape change rate is greater than threshold. | O |
| Mouth shape change rate = 0 (Identical mouth shape) | X |

FIG. 33
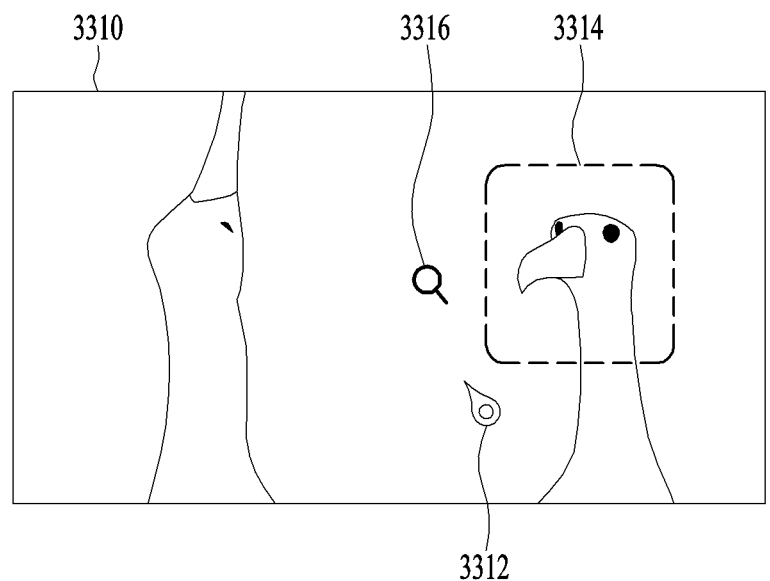
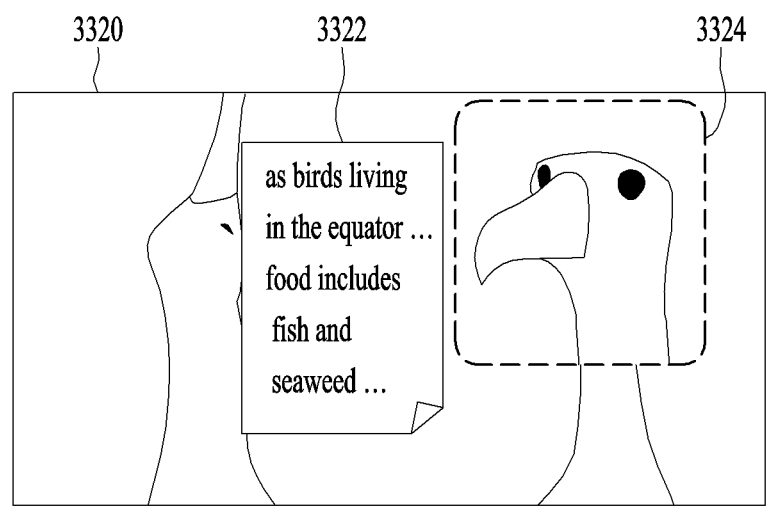

FIG. 36

| Object type / magnification | Person | Thing |
|---|---|---|
| 100 % expansion | a | A |
| 200 % expansion | a + b | A + B |
| 300 % expansion | a + b + c | A + B + C |

FIG. 41
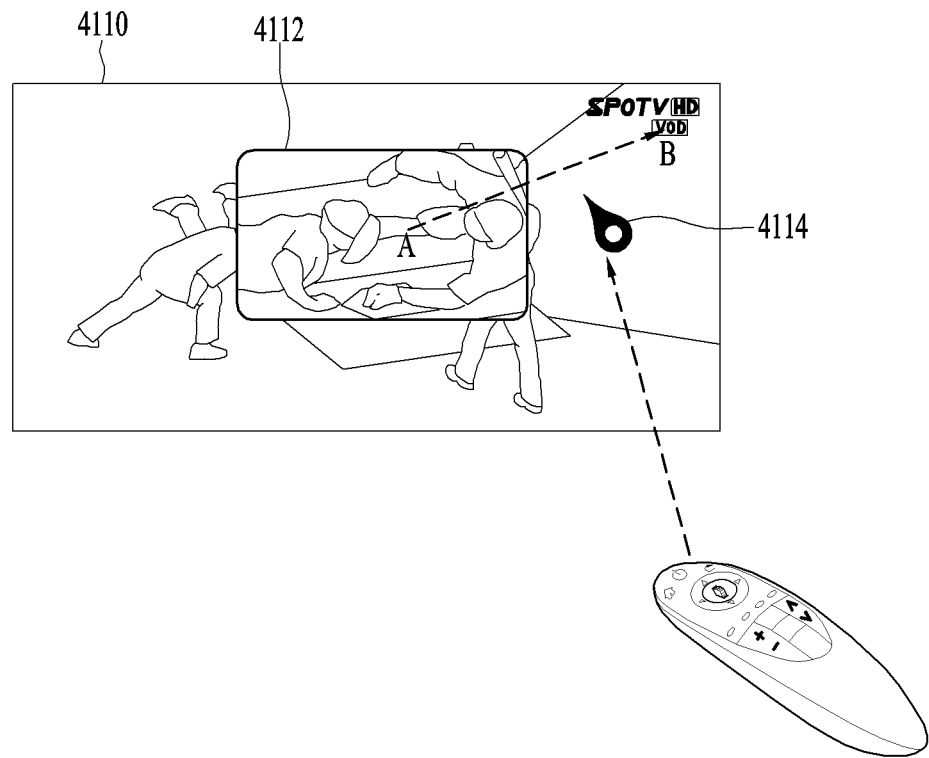
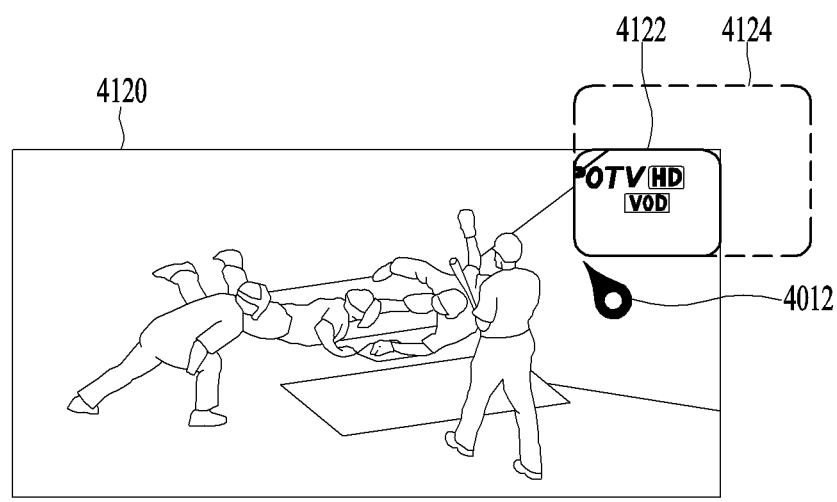

FIG. 42
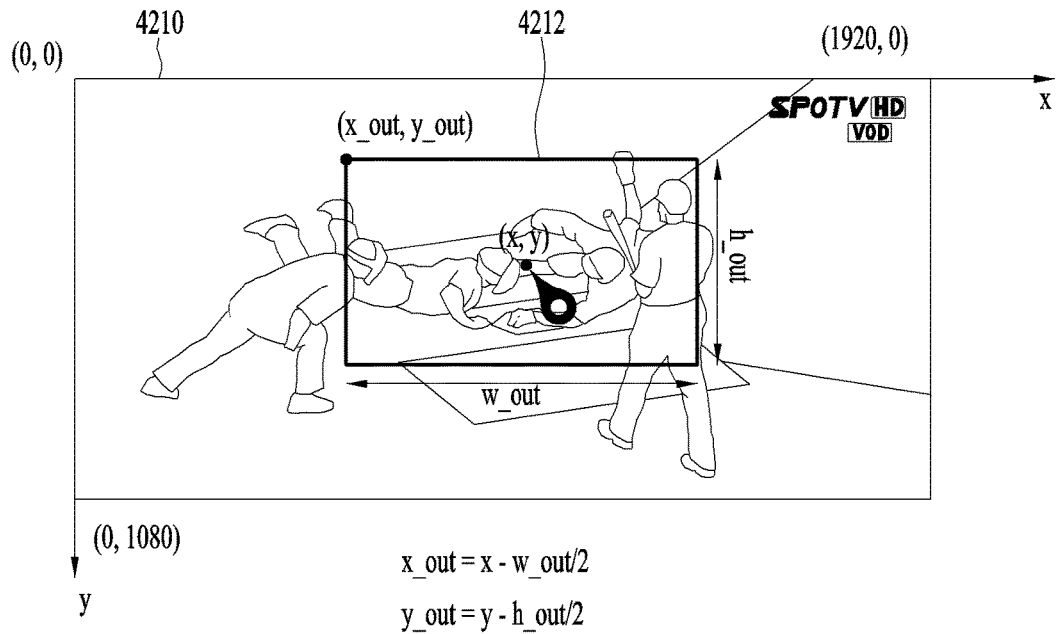
$$x\_out = x - w\_out/2$$
$$y\_out = y - h\_out/2$$
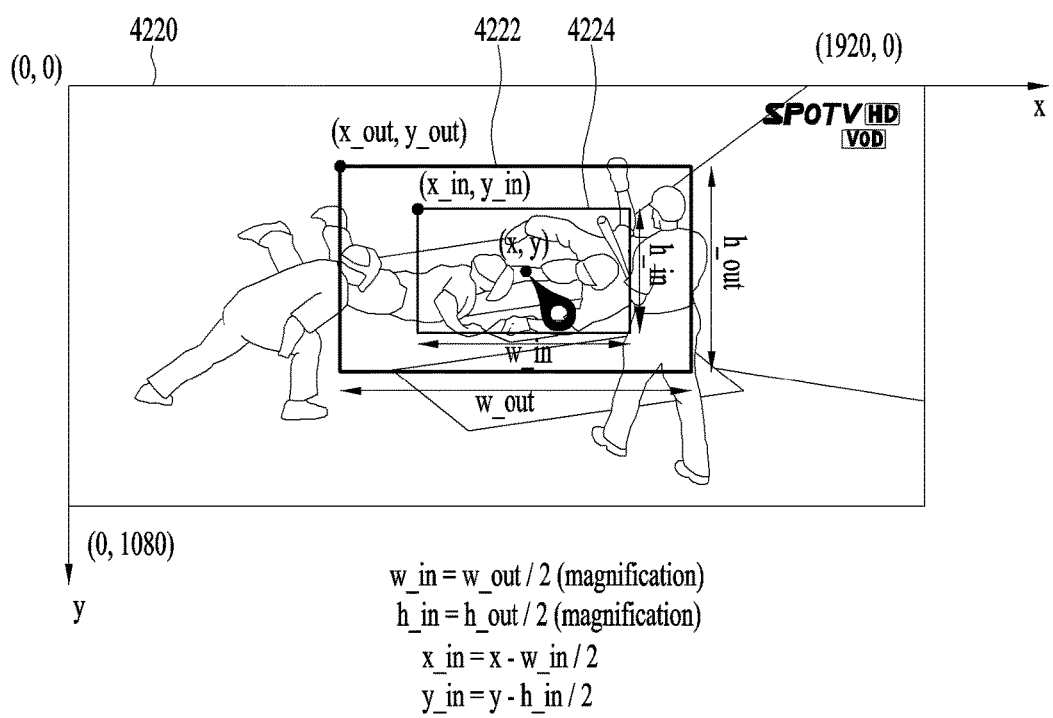
$$w\_in = w\_out / 2 \text{ (magnification)}$$
$$h\_in = h\_out / 2 \text{ (magnification)}$$
$$x\_in = x - w\_in / 2$$
$$y\_in = y - h\_in / 2$$

FIG. 45
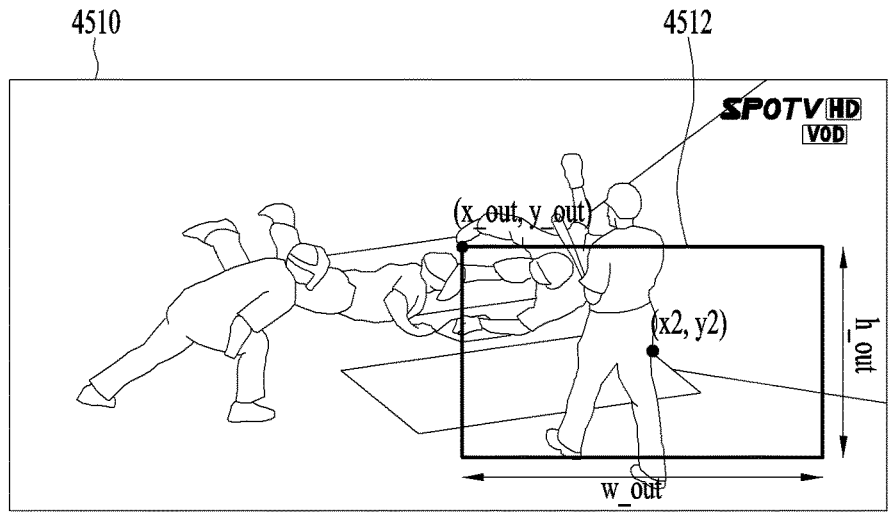
$x\_out = x - w\_out/2$
$y\_out = y - h\_out/2$
X2 : Width direction center coordinates of zoom window
Y2 : Height direction center coordinates of zoom window
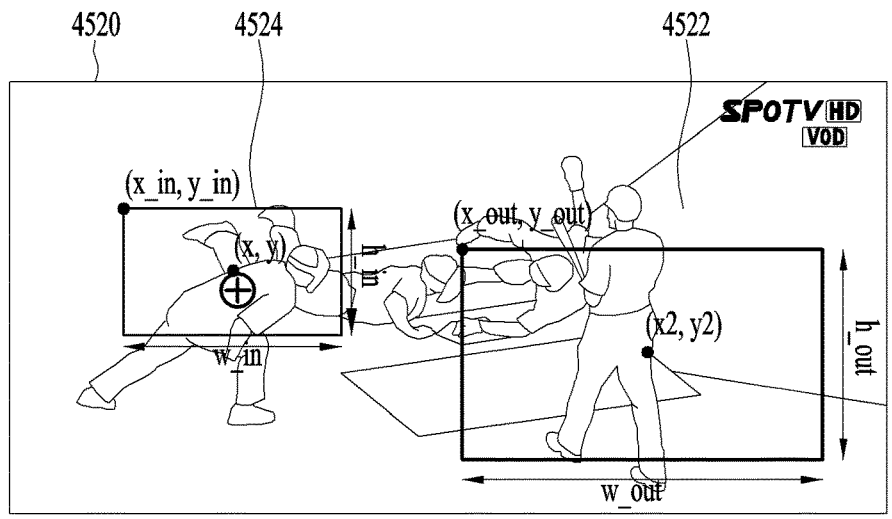
$w\_in = w\_out / 2$ (magnification)
$h\_in = h\_out / 2$ (magnification)
$x\_in = x - w\_in / 2$
$y\_in = y - h\_in / 2$ FIG. 47A
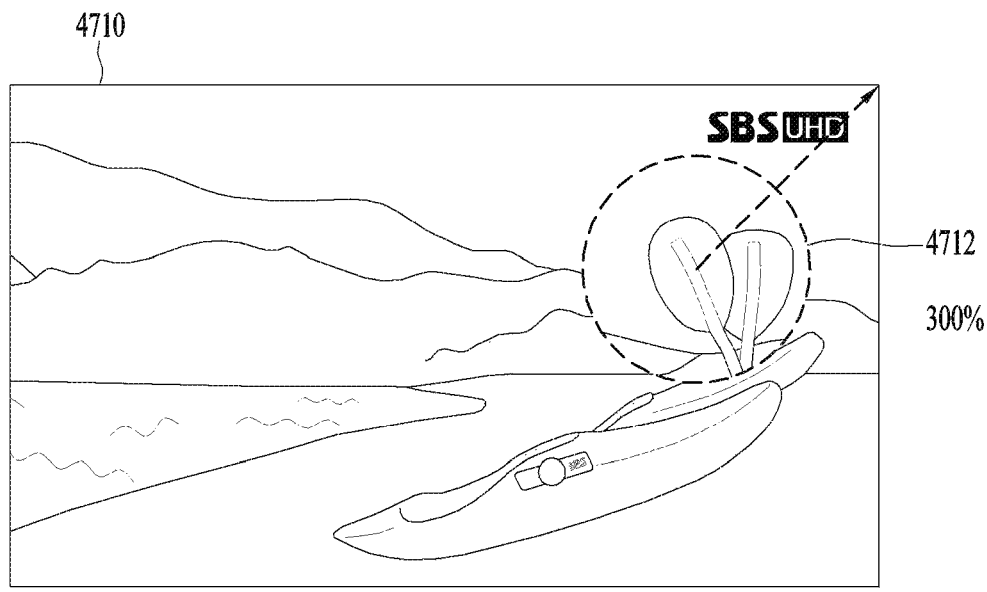
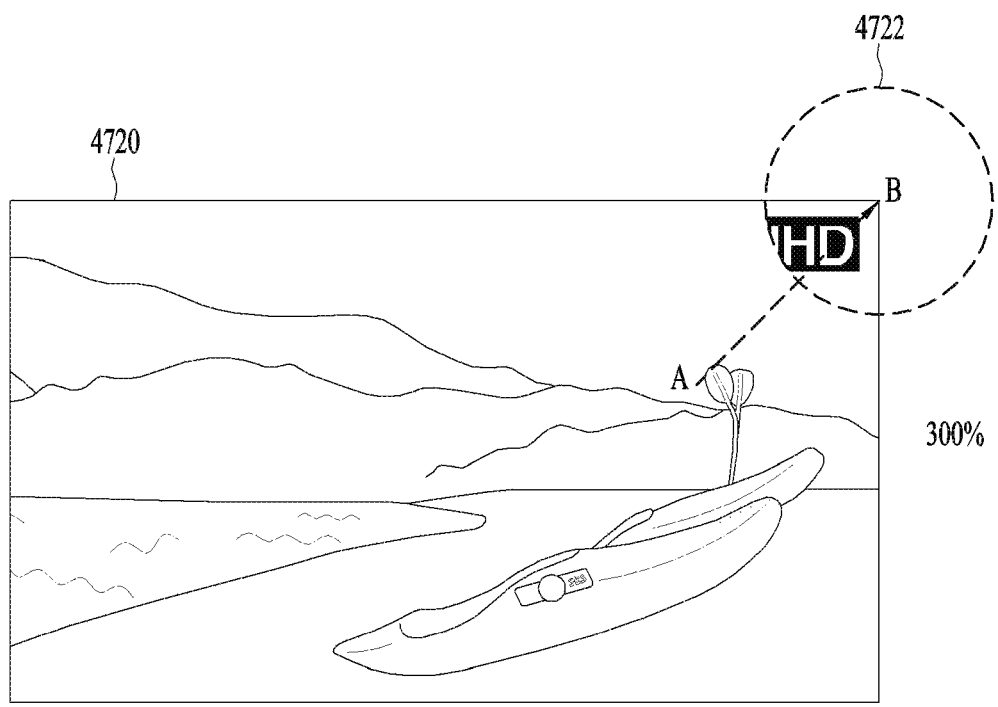

FIG. 47B
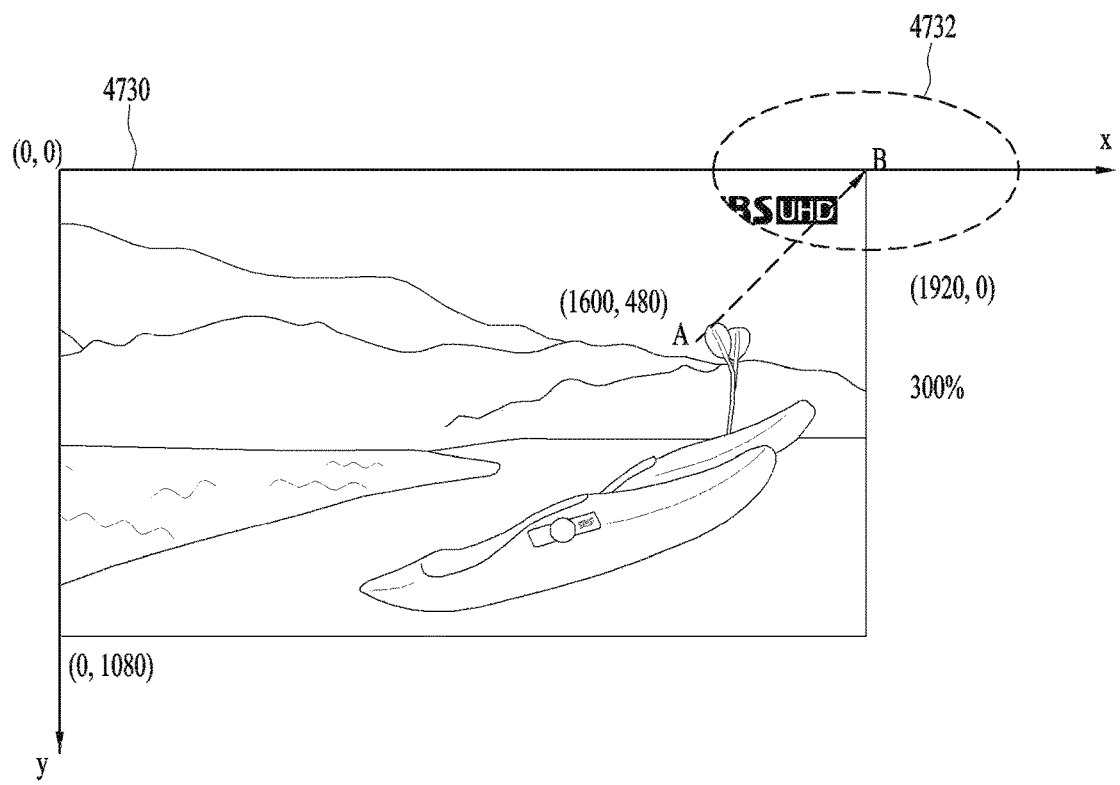
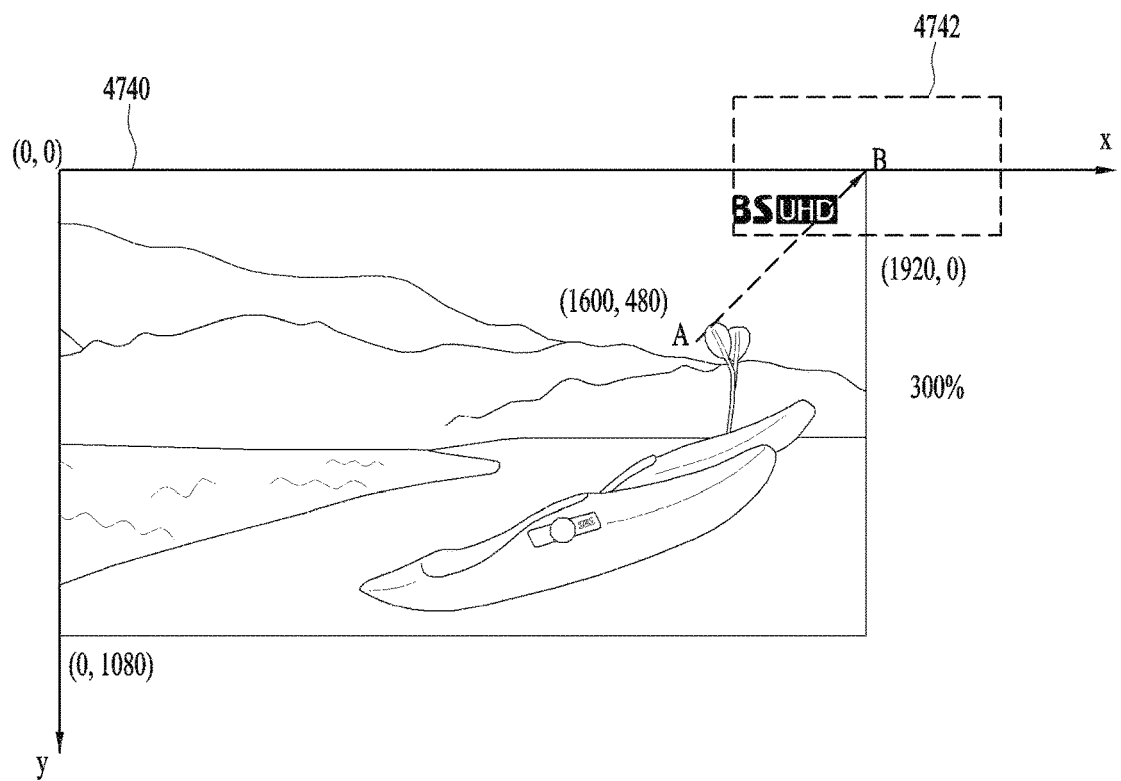

FIG. 48
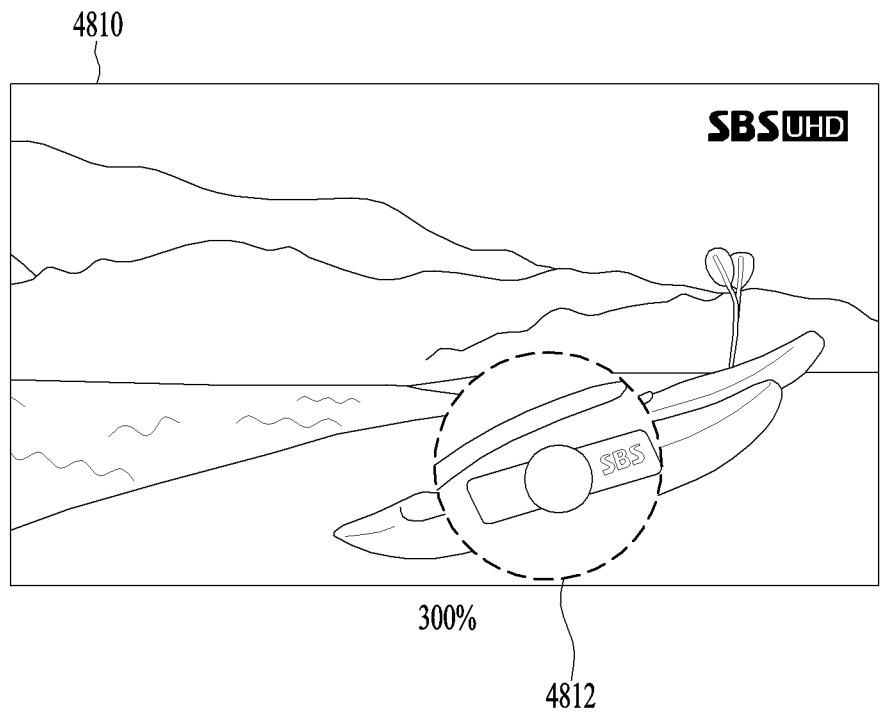
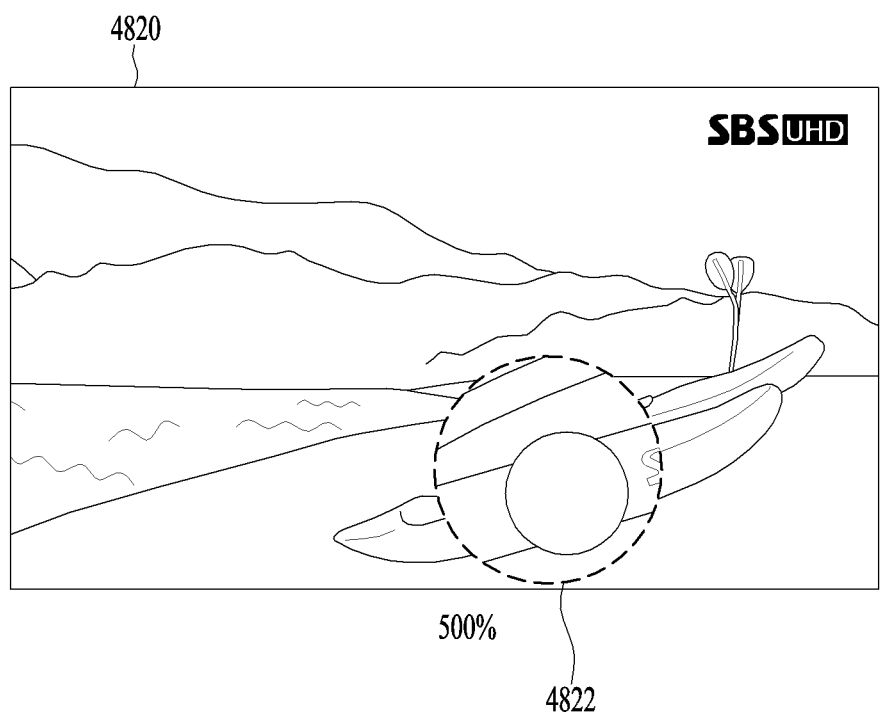

DISPLAY DEVICE AND CONTROL METHOD THEREFOR

CROSS REFERENCE TO RELATED APPLICATIONS

This application is the National Phase of PCT International Application No. PCT/KR2015/009701, filed on Sep. 16, 2015, which claims priority under 35 U.S.C. 119(a) to Patent Application No. 10-2015-0092127, filed in Republic of Korea on Jun. 29, 2015 and No. 10-2015-0102183, filed in Republic of Korea on Jul. 20, 2015, all of which are hereby expressly incorporated by reference into the present application.

TECHNICAL FIELD

The present invention relates to a display device and a control method thereof, and more particularly, to a technique of specifying a specific region desired by a user with a pointer, enlarging the specific region, displaying the enlarged specific region on a zoom window, and displaying the enlarged specific region on the zoom window in a manner of naturally reducing the zoom window when moving the zoom window to a corner of a main screen.

BACKGROUND ART

Recently, many users use display devices such as smart TVs and the like. As an expensive customized content market expands and content types are diversified, the demand for a user to watch a video in a user-desired manner is increasing.

A related art fails to provide a method of enlarging a video of a specific region a user desires to watch in detail. Particularly, while moving images are played, it is impossible to enlarge a specific region a user desires to watch in detail.

When a user is interested in a specific object displayed on a screen, the user should pause the screen or enlarge the whole screen to watch the specific object. Thus, it is a problem of causing inconvenience to the user.

SUMMARY OF THE INVENTION

One technical task of the present invention is to provide a display device and controlling method thereof, which can implement a screen as follows. First of all, the relation between a specific region and a zoom window is established by a mathematical algorithm. When the zoom window is moved to a corner of a main screen from a specific point, the specific region and the zoom window can be naturally reduced on the screen.

Another technical task of the present invention is to provide a display device and controlling method thereof, by which all regions of a main screen can be enlarged without generating a blind spot from a corner part when a zoom window is moved to a corner of the main screen from a specific point.

Further technical task of the present invention is to provide a display device and controlling method thereof, which can provide a user interface enabling a user to intuitively recognize a screen enlargement function using a zoom window of a circular type.

In one technical aspect of the present invention, provided herein is a broadcast receiver, including a tuner receiving a broadcast signal, a display module displaying a content on a main screen, an interface module receiving a first command for selecting a specific location within the main screen from a remote controller, and a controller controlling the tuner, the display module and the interface module, wherein the controller is configured to enlarge a specific region within a preset distance from the specific location according to the received first command and display the enlarged specific region on a zoom window and wherein a location of the zoom window is changed in response to a motion of the remote controller.

In another technical aspect of the present invention, provided herein is a method of controlling a broadcast receiver, including receiving a broadcast signal, displaying a content on a main screen, receiving a first command for selecting a specific location within the main screen from a remote controller, and controlling to enlarge a specific region within a preset distance from the specific location according to the received first command and display the enlarged specific region on a zoom window, wherein a location of the zoom window is changed in response to a motion of the remote controller.

ADVANTAGEOUS EFFECTS

According to one embodiment of the present invention, a screen can be implemented follows. First of all, the relation between a specific region and a zoom window is established by a mathematical algorithm. When the zoom window is moved to a corner of a main screen from a specific point, the specific region and the zoom window can be naturally reduced on the screen, thereby improving user convenience.

According to another embodiment of the present invention, all regions of a main screen can be enlarged without generating a blind spot from a corner part when a zoom window is moved to a corner of the main screen from a specific point, thereby improving user convenience.

According to further embodiment of the present invention, using a zoom window of a circular type, a user interface enabling a user to intuitively recognize a screen enlargement function can be provided, thereby improving user convenience.

BRIEF DESCRIPTION OF THE DRAWINGS

FIG. 16A is a diagram showing a main screen, a specific region and a zoom window according to one embodiment of the present invention.

FIG. 16B is a flowchart of a display device controlling method according to one embodiment of the present invention.

FIG. 25 is a diagram showing that a shape of a zoom window is changed according to one embodiment of the present invention.

FIG. 29 is a diagram showing that a video within a zoom window is captured and saved to a memory according to one embodiment of the present invention.

FIG. 32 is a diagram showing whether to enlarge a specific object in response to a mouth shape change rate according to one embodiment of the present invention.

FIG. 33 is a diagram showing that an information search function for a specific object within a zoom window is executed according to one embodiment of the present invention.

FIG. 36 is a diagram showing that additional information corresponding to a type of a specific object within a zoom window is displayed differently depending on a magnification according to one embodiment of the present invention.

FIG. 41 is a diagram showing that if a prescribed region of a zoom window is located within a main screen in hover mode, a video of the prescribed region is enlarged according to one embodiment of the present invention.

FIG. 42 is a diagram showing that if a whole region of a zoom window is located within a main screen in hover mode, relation between a prescribed region and the zoom window is established according to one embodiment of the present invention.

FIG. 45 is a diagram showing that if a zoom window is located within a main screen, relation between a specific region and the zoom window is established according to one embodiment of the present invention.

FIG. 47A is a diagram showing an enlarged video within a zoom window when a center of a zoom window is moved from a specific point to a corner of a main screen according to one embodiment of the present invention.

FIG. 47B is a diagram showing an enlarged video within a zoom window when a center of a zoom window is moved from a specific point to a corner of a main screen according to one embodiment of the present invention.

FIG. 48 is a diagram showing that an enlarged video of a zoom window is displayed differently depending on a magnification according to one embodiment of the present invention.

DETAILED DESCRIPTION OF THE EMBODIMENTS

Figure 1:
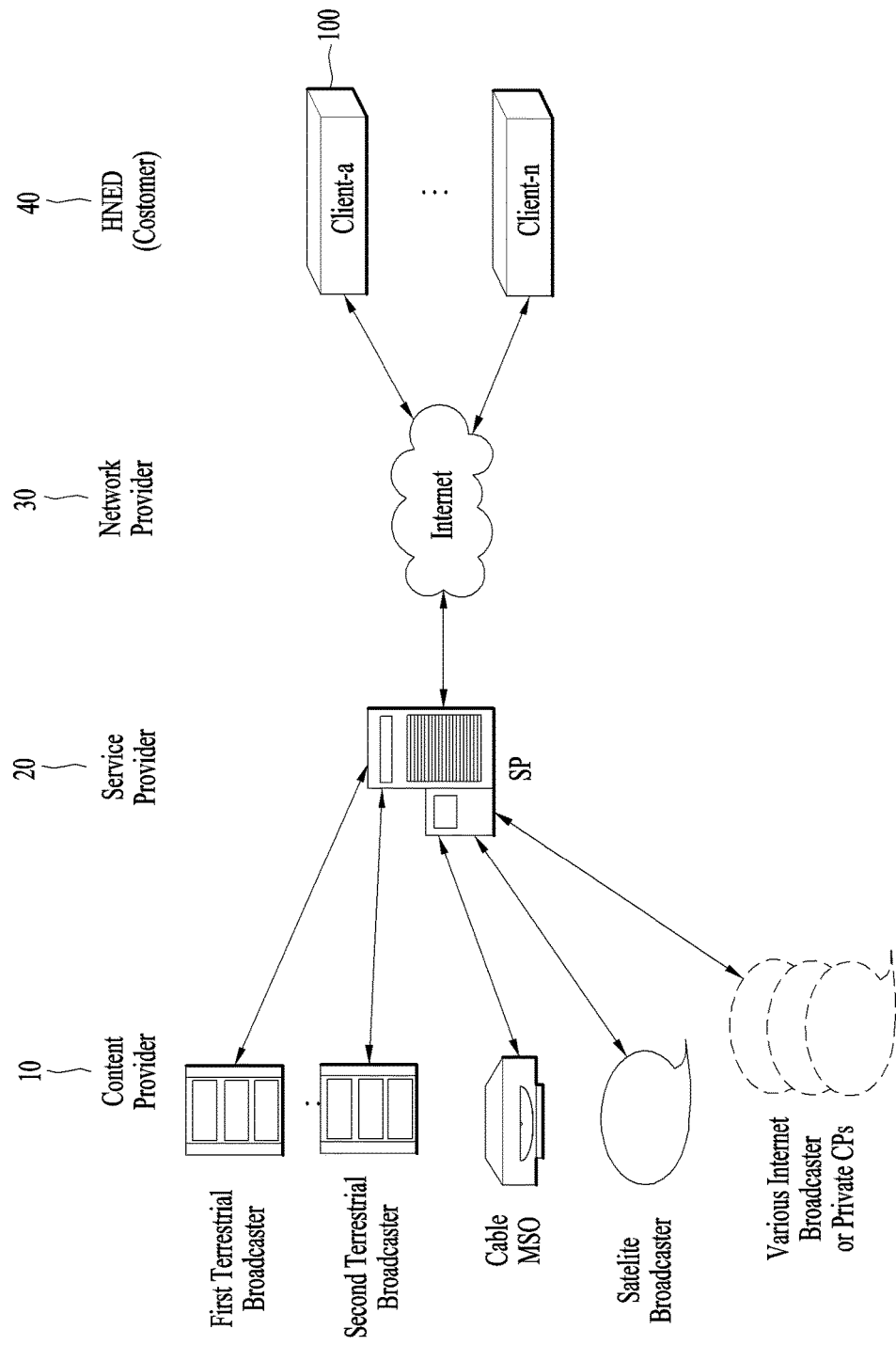
FIG. 1 is a schematic diagram illustrating a service system including a digital device according to one embodiment of the present invention.

Description will now be given in detail according to various embodiment(s) for a digital device and screen saver processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first ~', 'second ~' and the like is provided to facilitate the description of the corresponding terminologies only, which is non-limited by such terminologies or ordinal numbers.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s).

Therefore, the digital device, for example, on the universal OS kernel, it is available to add and delete various applications and various functions can be performed.

In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, the descriptions disclosed in the present specification and/or drawings correspond to one preferred embodiment of the present invention and are non-limited by the preferred embodiment. And, the scope/extent of the right should be determined through the appended claims.

'Digital device' described in the present specification includes any device capable of performing at least one of transmission, reception, processing and output of data, content, service, application and the like for example. The digital device can be paired or connected (hereinafter 'paired') with another digital device, an external server and the like through wire/wireless network and transmit/receive prescribed data through the pairing. In doing so, if necessary, the data may be appropriately converted before the transmission/reception. The digital devices may include standing devices (e.g., Network TV, HBBTV (Hybrid Broadcast Broadband TV), Smart TV, IPTV (Internet Protocol TV), PC (Personal Computer), etc.) and mobile devices (e.g., PDA (Personal Digital Assistant), Smart Phone, Tablet PC, Notebook, etc.). In the present specification, to help the understanding of the present invention and the clarity of the applicant's description, a digital TV and a mobile are shown as embodiments of digital devices in FIG. 2 and FIG. 3, respectively. A digital device described in the present specification may include a panel-only configuration, a configuration such as a set-top box (STB), or a single set configuration of device, system and the like.

Meanwhile, 'wire/wireless network' described in the present specification is a common name of a communication network supportive of various communication specifications and/or protocols for the paring or/and data transceiving between digital devices or between a digital device and an external server. Such wire/wireless networks include all communication networks supported currently or all communication networks that will be supported in the future, by the specifications and are capable of supporting one or more communication protocols for the same. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, if a device is named a digital device in this disclosure, the meaning may indicate a standing device or a mobile device according to a context, or can be used to indicate both unless mentioned specially.

Meanwhile, a digital device is an intelligent device supportive of a broadcast receiving function, a computer function or support, at least one external input and the like, and is able to support e-mail, web browsing, banking, game, application and the like through the aforementioned wire/wireless network. Moreover, the digital device may include an interface (e.g., manual input device, touchscreen, space remote controller, etc.) to support at least one input or control means.

Besides, a digital device may use a standardized OS (operating system). Particularly, a digital device described in the present specification uses Web OS for one embodiment. Hence, a digital device can process adding, deleting, amending, updating and the like of various services or applications on Universal OS kernel or Linux kernel, through which a further user-friendly environment can be configured and provided.

Meanwhile, the aforementioned digital device can receive and process an external input. Herein, the external input includes an external input device, i.e., any input means or digital device capable of transmitting/receiving and processing data by being connected to the aforementioned digital device through wire/wireless network. For instance, as the external inputs, a game device (e.g., HDMI (High-Definition Multimedia Interface), Playstation, X-Box, etc.), a printing device (e.g., smart phone, tablet PC, pocket photo, etc.), and a digital device (e.g., smart TV, Blu-ray device, etc.) are included.

Besides, 'server' described in the present specification means a digital device or system that supplies data to the aforementioned digital device (i.e., client) or receives data from it, and may be called a processor. For example, the server may include a portal server providing web page, web content or web service, an advertising server providing advertising data, a content server providing contents, an SNS server providing SNS (Social Network Service), a service server provided by a manufacturer, an MVPD (Multichannel Video Programming Distributor) providing VoD (Video on Demand) or streaming service, a service server providing a pay service and the like.

Moreover, in case that the following description is made using an application only for clarity in the present specification, it may mean a service as well as an application on the basis of a corresponding content and the like.

In the following description, the present invention is explained in detail with reference to attached drawings.

FIG. 1 is a schematic diagram illustrating a service system including a digital device according to one embodiment of the present invention.

Referring to FIG. 1, a service system may include a content provider (CP) 10, a service provider (SP) 20, a network provider (NP) 30, and a home network end user (HNED) (Customer) 40. The HNED 40 includes a client 100, that is, a digital device according to the present invention.

The CP 10 produces and provides various contents. Referring to FIG. 1, the CP 10 can include a terrestrial broadcaster, a cable system operator (SO), a multiple system operator (MSO), a satellite broadcaster, various Internet broadcasters, private content providers (CPs), etc. Meanwhile, the CP 10 can produce and provide various services, applications and the like as well as well as broadcast contents.

The SP 20 service-packetizes a content produced by the CP 10 and then provides it to the HNED 40. For instance, the SP 20 packetizes at least one of contents, which are produced by a first terrestrial broadcaster, a second terrestrial broadcaster, a cable MSO, a satellite broadcaster, various internet broadcasters, applications and the like, for a service and then provides it to the HNED 40.

The SP 20 can provide services to the client 100 in a uni-cast or multi-cast manner. Meanwhile, the SP 20 can collectively send data to a multitude of pre-registered clients 100. To this end, it is able to use IGMP (internet group management protocol) and the like.

The CP 10 and the SP 20 can be configured in the form of one entity. For example, the CP 10 can function as the SP 20 by producing a content, service-packetizing the produced content, and then providing it to the HNED 40, and vice versa.

The NP 30 provides a network environment for data exchange between the CP 10 and/or the SP 20 and the client 100.

The client 100 is a consumer belonging to the HNED 40. The client 100 may receive data by establishing a home network through the NP 30 for example and transmit/receive data for various services (e.g., VoD, streaming, etc.), applications and the like.

The CP 10 or/and the SP 20 in the service system may use a conditional access or content protection means for the protection of a transmitted content. Hence, the client 100 can use a processing means such as a cable card (CableCARD) (or POD (point of deployment) or a downloadable CAS (DCAS), which corresponds to the conditional access or the content protection.

In addition, the client 100 may use an interactive service through a network as well. In this case, the client 100 can directly serve as a content provider. And, the SP 20 may receive and transmit it to another client or the like.

In FIG. 1, the CP 10 or/and the SP 20 may be a service providing server that will be described later in the present specification. In this case, the server may mean that the NP 30 is owned or included if necessary. In the following description, despite not being specially mentioned, a service or a service data includes an internal service or application as well as a service or application received externally, and such a service or application may mean a service or application data for the Web OS based client 100.

Figure 2:
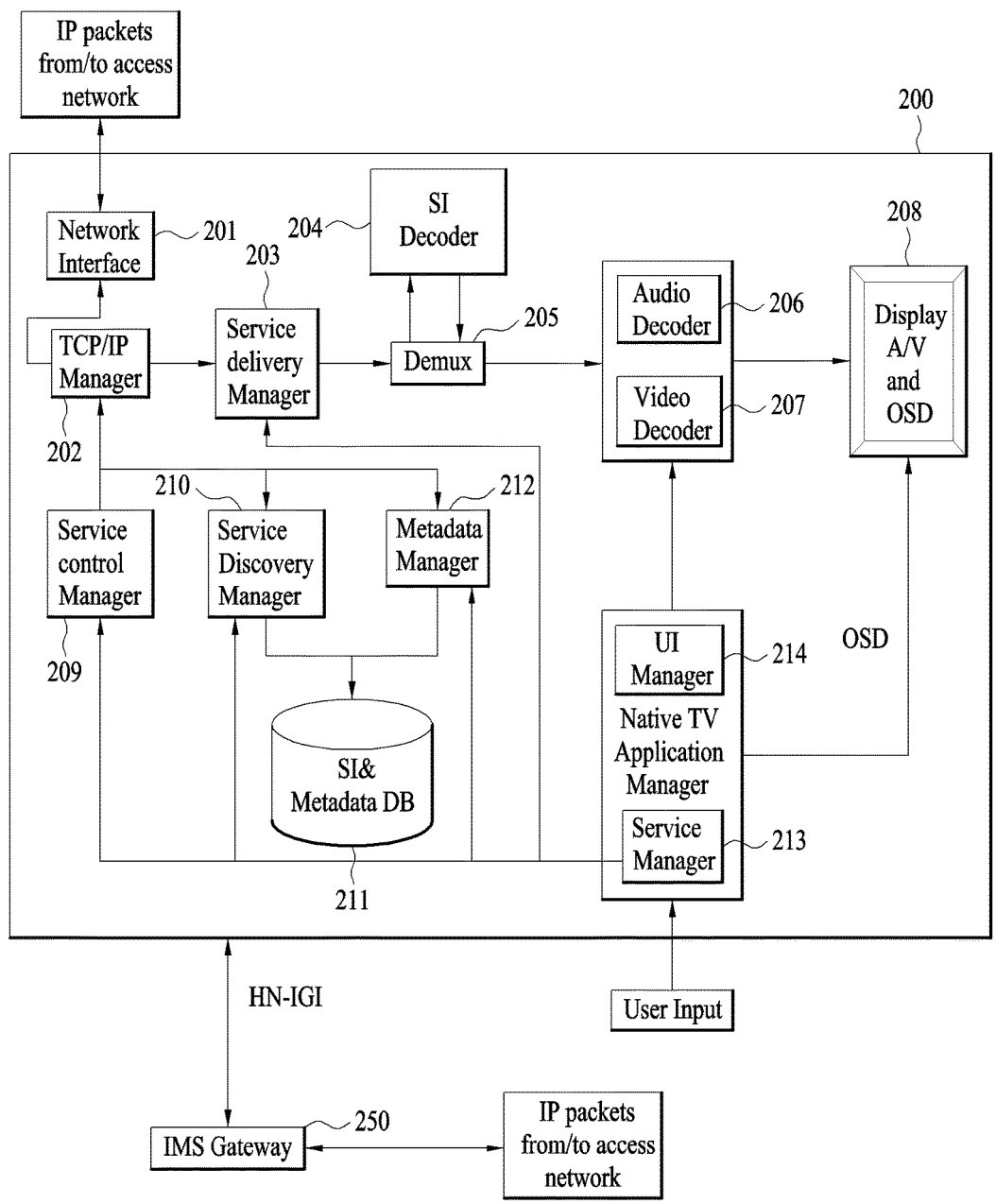
FIG. 2 is a block diagram showing a digital device according to one embodiment of the present invention.

FIG. 2 is a block diagram showing a digital device according to one embodiment of the present invention.

In the following, a digital device mentioned in the present specification may correspond to the client 100 shown in FIG. 1.

The digital device 200 may include a network interface 201, a TCP/IP manager 202, a service delivery manager 203, an SI decoder 204, a demux or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) through an accessed network. For instance, the network interface 201 may receive services, applications, contents and the like from the service provider 20 shown in FIG. 1 through a network.

The TCP/IP manager 202 may involve delivery of IP packets transmitted to the digital device 200 and IP packets transmitted from the digital device 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (system information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital device 200. So to speak, the application manager can administrate the overall states of the digital device 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212.

The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system.

The SI & metadata database 211 may be implemented with non-volatile RAM (NVRAM), flash memory and the like.

Meanwhile, an IMS gateway 250 is a gateway in which functions required for an access to an IMS based IPTV service are collected.

Figure 3:
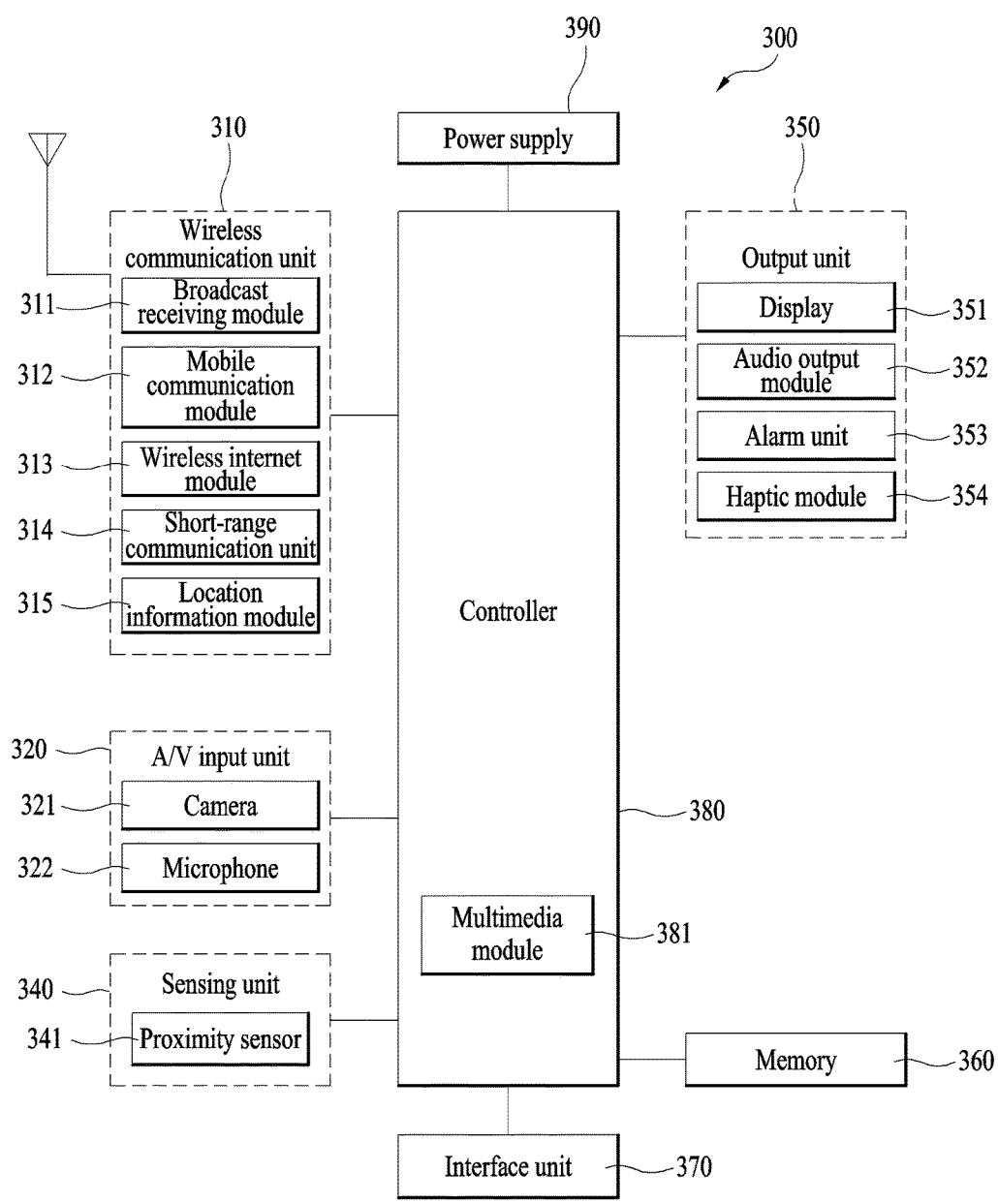
FIG. 3 is a block diagram showing the configuration of a digital device according to another embodiment of the present invention.

FIG. 3 is a block diagram to describe a digital device according to another embodiment of the present invention.

The former description with reference to FIG. 2 is made by taking a standing device as one embodiment of a digital device. And, FIG. 3 uses a mobile device as another embodiment of a digital device.

Referring to FIG. 3, the mobile device 300 includes a wireless communication unit 310, an A/V (audio/video) input unit 320, a user input unit 330, a sensing unit 340, an output unit 350, a memory 360, an interface unit 370, a controller 380, a power supply unit 390, etc.

The respective components are described in detail as follows.

The wireless communication unit 310 typically includes one or more modules which permit wireless communication between the mobile device 300 and a wireless communication system or network within which the mobile device 300 is located. For instance, the wireless communication unit 310 can include a broadcast receiving module 311, a mobile communication module 312, a wireless Internet module 313, a short-range communication module 314, a location information module 315, etc.

The broadcast receiving module 311 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms, e.g., an electronic program guide (EPG), an electronic service guide (ESG), and the like.

The broadcast receiving module 311 may be configured to receive digital broadcast signals using broadcasting systems such as ATSC, DVB-T (Digital Video Broadcasting-Terrestrial), DVB-S(Satellite), MediaFLO (Media Forward Link Only), DVB-H (Handheld), ISDB-T (Integrated Services Digital Broadcast-Terrestrial), and the like. Optionally, the broadcast receiving module 311 can be configured to be suitable for other broadcasting systems as well as the above-noted digital broadcasting systems.

The broadcast signal and/or broadcast associated information received by the broadcast receiving module 311 may be saved to the memory 360.

The mobile communication module 312 transmits/receives wireless signals to/from at least one of a base station, an external terminal, and a server via a mobile network.

Such wireless signals may carry audio signals, video signals, and data of various types according to transceived text/multimedia messages.

The wireless Internet module 313 includes a module for wireless Internet access and may be internally or externally coupled to the mobile device 300. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 314 is a module for short-range communications. Suitable technologies for implementing this module include Bluetooth, radio frequency identification (RFID), infrared data association (IrDA), ultra-wideband (UWB), ZigBee, RS-232, RS-485 and the like.

The location information module 315 is a module for obtaining location information of the mobile terminal 100. And, this module may be implemented with a global positioning system (GPS) module for example.

The audio/video (A/V) input unit 320 is configured to provide audio or video signal input. The A/V input unit 320 may include a camera 321, a microphone 322 and the like. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or transmitted externally via the wireless communication unit 310. Optionally, at least two cameras 321 can be provided according to the environment of usage.

The microphone 322 receives an external audio signal in call mode, recording mode, voice recognition mode, or the like. This audio signal is processed and converted into electrical audio data. The processed audio data is transformed into a format transmittable to a mobile communication base station via the mobile communication module 312 in call mode. The microphone 322 typically includes assorted noise cancelling algorithms to cancel noise generated in the course of receiving the external audio signal.

The user input unit 330 generates input data for a user to control an operation of the terminal. The user input unit 330 may include a keypad, a dome switch, a touchpad (e.g., static pressure/capacitance), a jog wheel, a jog switch, and/or the like.

The sensing unit 340 generates sensing signals for controlling operations of the mobile device 300 using status measurements of various aspects of the mobile terminal. For instance, the sensing unit 340 may detect an open/closed status of the mobile device 300, a location of the mobile device 300, an orientation of the mobile device 300, a presence or absence of user contact with the mobile device 300, an acceleration/deceleration of the mobile device 300, and the like. For example, if the mobile device 300 is moved or inclined, it is able to sense a location or inclination of the mobile device. Moreover, the sensing unit 340 may sense a presence or absence of power provided by the power supply unit 390, a presence or absence of a coupling or other connection between the interface unit 370 and an external device, and the like. Meanwhile, the sensing unit 340 may include a proximity sensor 341 such as NFC (near field communication) and the like.

The output unit 350 generates output relevant to the senses of vision, hearing and touch, and may include the display 351, an audio output module 352, an alarm unit 353, a haptic module 354, and the like.

The display 351 is typically implemented to visually display (output) information processed by the mobile device 300. For instance, if the mobile terminal is operating in phone call mode, the display will generally provide a user interface (UI) or graphical user interface (GUI) related to a phone call. For another instance, if the mobile device 300 is in video call mode or photographing mode, the display 351 may display photographed or/and received images or UI/GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile device 300 may include one or more of such displays.

Some of the displays can be implemented in a transparent or optical transmittive type, which can be called a transparent display. A representative example of the transparent display is the TOLED (transparent OLED). A rear configuration of the display 351 can be implemented as the optical transmittive type as well. In this configuration, a user may be able to see an object located in rear of a terminal body through a region occupied by the display 351 of the terminal body.

Two or more displays 351 can be provided to the mobile device 300 in accordance with an implementation type of the mobile device 300. For instance, a plurality of displays can be disposed on the mobile device 300 in a manner of being spaced apart from a single face or being integrally formed on a single face. Alternatively, a plurality of displays may be disposed on different faces of the mobile device 300, respectively.

If the display 351 and a sensor (hereinafter called 'touch sensor') for detecting a touch action configure a mutual layer structure, the display 351 is usable as an input device as well as an output device. In this case, the touch sensor can be configured with a touch film, a touch sheet, a touchpad, or the like.

The touch sensor can be configured to convert a pressure applied to a specific portion of the display 351 or a variation of capacitance generated from a specific portion of the display 351 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 380. Therefore, the controller 380 is able to know whether a prescribed portion of the display 351 is touched.

A proximity sensor 341 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or stored in the memory 360. During operation, the audio output module 352 may output an audio signal related to a function (e.g., call received, message received) executed in the mobile device 300. The audio output module 352 may include a receiver, a speaker, a buzzer and the like.

The alarm unit 353 outputs a signal for announcing the occurrence of an event of the mobile device 300. Typical events occurring in the mobile device may include a call signal received, a message received, a touch input received, and the like. The alarm unit 353 may output a signal for announcing the event occurrence by way of vibration as well as video or audio signal. The video or audio signal can be outputted via the display 351 or the audio output module 352. Hence, the display 351 or the audio output module 352 can be sorted into a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, two or more haptic modules 354 can be provided to the mobile device 300 in accordance with a configuration type of the mobile device 300.

The memory 360 may store a program for an operation of the controller 380, or may temporarily store inputted/outputted data (e.g., phonebook, message, still image, video, etc.). And, the memory 360 may store data of vibrations and sounds of various patterns outputted in response to a touch input to the touchscreen.

The memory 360 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile device 300 is able to operate in association with the web storage for performing a storage function of the memory 360 on the Internet.

The interface unit 370 may play a role as a passage to every external device connected to the mobile device 300 with external devices. The interface unit 370 receives data from the external devices, delivers a supplied power to the respective elements of the mobile device 300, or enables data within the mobile device 300 to be transferred to the external devices. For instance, the interface unit 370 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile device 300 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectable to the mobile device 300 through a port.

When the mobile device 300 is connected to an external cradle, the interface unit 370 becomes a passage for supplying the mobile device 300 with a power from the cradle or a passage for delivering various command signals input from the cradle by a user to the mobile device 300. Each of the various command signals inputted from the cradle or the power can operate as a signal for recognizing that the mobile device 300 is correctly installed in the cradle.

The controller 380 typically controls the overall operations of the mobile device 300. For example, the controller 380 performs the control and processing associated with voice calls, data communications, video calls, and the like. The controller 380 may include a multimedia module 381 that provides multimedia playback. The multimedia module 381 may be configured as a part of the controller 380, or implemented as a separate component. Moreover, the controller 380 is able to perform a pattern recognition processing for recognizing a writing input and a picture drawing input performed on the touchscreen as a text and an image, respectively.

The power supply unit 390 is supplied with an external or internal power and then supplies a power required for an operation of each component, under the control of the controller 380.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 180.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Figure 4:
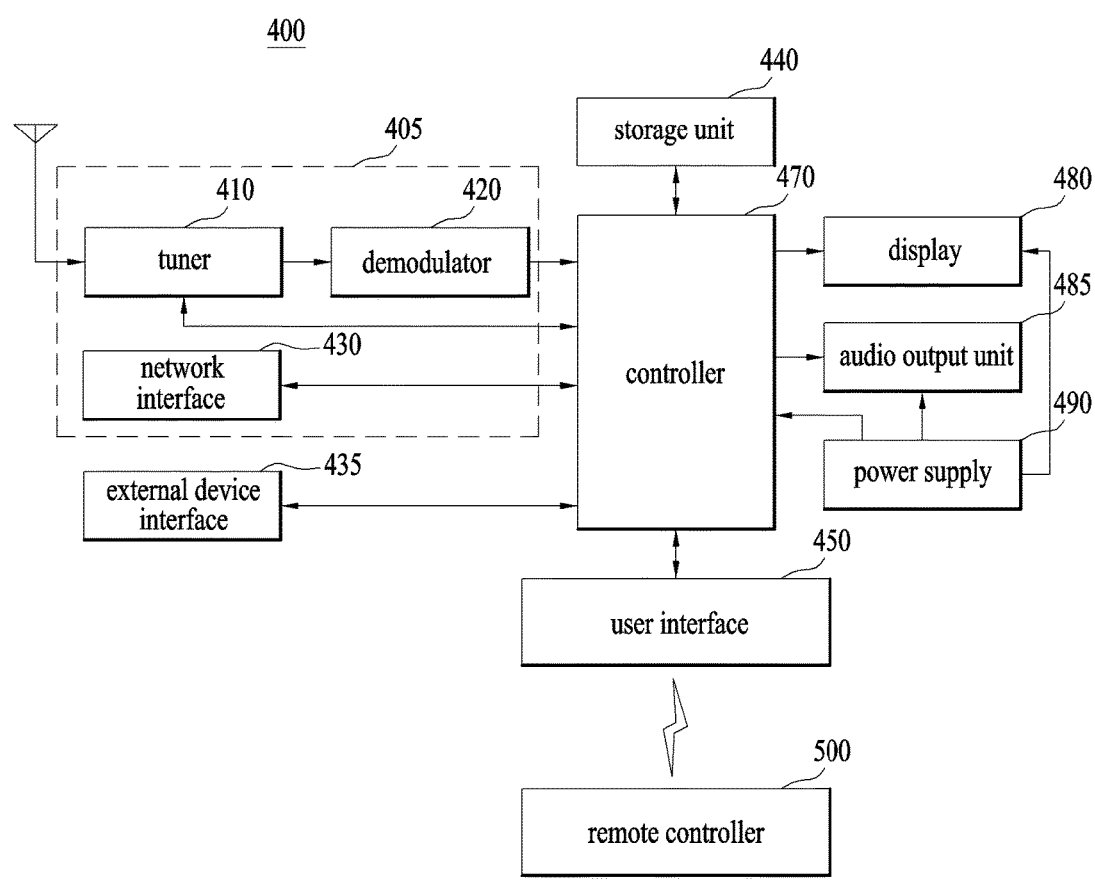
FIG. 4 is a diagram showing a digital device according to another embodiment of the present invention.

FIG. 4 is a block diagram showing a digital device according to another embodiment of the present invention.

Another example of a digital device 400 may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. Yet, in some cases, the broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning in to a channel selected by the user or all previously stored channels among RF broadcast signals received through an antenna. And, the tuner 410 converts the received RF broadcast signal into an IF (intermediate frequency) signal or a baseband signal.

For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 410 is able to process both of the digital broadcast signal and the analog signal. The analog baseband video/audio signal (CVBS/SIF) outputted from the tuner 410 may be directly inputted to the controller 470.

The tuner 410 may receive an RF broadcast signal of a single carrier or multiple carriers. The tuner 410 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 420 receives and demodulates the digital IF signal (DIF) converted by the tuner 410 and is then able to channel decoding and the like. To this end, the demodulator 420 may include a Trellis decoder, a de-interleaver, a Reed-Solomon decoder and the like, or may include a convolution decoder, a de-interleaver, a Reed-Solomon decoder and the like.

The demodulator performs demodulation and channel decoding and is then able to output a stream signal TS. In this case, the stream signal may include a signal of multiplexing a video signal, an audio signal and/or a data signal. For instance, the stream signal may include MPEG-2TS (transport stream) in which a video signal of PMEG-2 and an audio signal of Dolby AC-3 are multiplexed.

The stream signal outputted from the demodulator 420 may be inputted to the controller 470. The controller 470 can control demultiplexing, audio/video signal processing, etc. Furthermore, the controller 470 can control outputs of video and audio through the display 480 and o the audio output unit 485, respectively.

The external device interface 435 may provide an interfacing environment between the digital device 300 and various external devices. To this end, the external device interface 435 may include an A/V input/output unit (not shown) or a wireless communication unit (not shown).

The external device interface 435 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 435 delivers a signal containing data such as an image, a video, an audio and the like, which is inputted through the connected external device, to the controller 470 of the digital device. The controller 470 may control a data signal of the processed image, video and audio and the like to be outputted to the connected external device. To this end, the external device interface 435 may further include an A/V input/output unit (not shown) or a wireless communication unit (not shown).

In order to input video and audio signals of an external device to the digital device 400, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital device 400 may be networked with other digital devices by communication protocols such as Bluetooth, radio frequency identification (RFID), infrared data association (IrDA), ultra wideband (UWB), ZigBee, and digital living network alliance (DLNA), etc. for example.

The external device interface 435 may perform input/output operations with a set-top box (STB) by being connected thereto through at least one of the aforementioned terminals.

Meanwhile, the external device interface 435 may receive an application or an application list within an adjacent external device and then forward it to the controller 470 or the storage unit 440.

The network interface 430 may provide an interface for connecting the digital device 400 to wired/wireless networks including Internet network. The network interface 430 may have Ethernet terminal and the like for an access to a wired network for example. For the access to the wireless network, the network interface 430 may use communication specifications such as WLAN (Wireless LAN) (Wi-Fi), Wibro (Wireless broadband), Wimax (World Interoperability for Microwave Access), HSDPA (High Speed Downlink Packet Access), etc.

The network interface 430 may transceive data with another user or another digital device through the accessed network or another network linked to the accessed network. Particularly, the network interface 430 may send a portion of the content data stored in the digital device 400 to a user/digital device selected from other users/digital devices previously registered at the digital device 400.

Meanwhile, the network interface 430 may access a prescribed webpage through the accessed network or another network linked to the accessed network. Namely, the network interface 430 accesses a prescribed webpage through a network and is then able to transceive data with a corresponding server. Besides, the network interface 430 can receive contents or data provided by a content provider or a network operator. Namely, the network interface 430 may receive contents (e.g., movie, advertisement, game, VOD, broadcast signal, etc.) provided by the content provider or a network provider and information associated with the contents through the network. The network interface 430 may receive update information and file of firmware provided by the network operator. And, the network interface 430 may send data to the internet or content provider or the network operator.

Moreover, the network interface 430 may select a desired application from open applications and receive it through a network.

The storage unit 440 may store programs for various signal processing and controls within the controller 470, and may also store a processed video, audio or data signal.

In addition, the storage unit 440 may execute a function of temporarily storing a video, audio or data signal inputted from the external device interface 435 or the network interface 430. The storage unit 440 may store information on a prescribed broadcast channel through a channel memory function.

The storage unit 440 may store an application or an application list inputted from the external device interface 435 or the network interface 430.

And, the storage unit 440 may store various platforms which will be described later.

The storage unit 440 may include storage media of one or more types, such as a flash memory type, a hard disk type, a multimedia card micro type, a card type memory (e.g. SD or XD memory), RAM, EEPROM, etc. The digital device 400 may play content files (a video file, a still image file, a music file, a text file, an application file, etc.) stored in the storage unit 440 and provide them to the user.

FIG. 4 illustrates an embodiment in which the storage unit 440 is separated from the controller 470, by which the present invention is non-limited. In other words, the storage unit 440 may be included in the controller 470.

The user input interface 450 may forward a signal inputted by a user to the controller 470 or forward a signal outputted from the controller 470 to the user.

For example, the user input interface 450 may receive control signals for power on/off, channel selection, screen settings and the like from a remote controller 500, or transmit control signals of the controller 470 to the remote controller 500, according to various communication schemes such as RF communication, IR communication, and the like.

The user input interface 450 can forward control signals inputted through a power key, a channel key, a volume key, and a local key (not shown) for a setup value or the like to the controller 470.

The user input interface 450 may forward a control signal inputted from a sensing unit (not shown) sensing a gesture of a user to the controller 470 or transmit a signal of the controller 470 to the sensing unit (not shown). Here, the sensing unit (not shown) may include a touch sensor, a voice sensor, a location sensor, an action sensor, etc.

The controller 470 may generate and output a signal for a video or audio output by demultiplexing a stream inputted through the tuner 410, the demodulator 420 or the external device interface 435 or processing demultiplexed signals.

A video signal processed by the controller 470 can be inputted to the display unit 380 and displayed as an image corresponding to the video signal. In addition, the video signal video-processed by the controller 470 can be inputted to an external output device through the external device interface 435.

An audio signal processed by the controller 470 can be audio-outputted to the audio output unit 485. Moreover, the audio signal processed by the controller 470 can be inputted to the external output device through the external device interface 435.

The controller 470 may include a demultiplexer, an image processor, and the like, which are not shown in FIG. 4.

The controller 470 can control the overall operations of the digital device 400. For example, the controller 470 can control the tuner 410 to tune in to an RF broadcast corresponding to a channel selected by a user or a previously stored channel.

The controller 470 can control the digital device 400 according to a user command input through the user input interface 450 or an internal program. Particularly, the controller 470 can control the digital device 400 to access a network to download an application or an application list desired by a user to the digital device 400.

For example, the controller 470 may control the tuner 410 to receive a signal of a channel selected in response to a prescribed channel selection command received through the user input interface 450. And, the controller 470 may process a video, audio or data signal of the selected channel. The controller 470 may control information on a channel selected by the user to be outputted together with a processed video or audio signal through the display unit 480 or the audio output unit 485.

For another example, the controller 470 may control a video signal or an audio signal, which is inputted through the external device interface unit 435 from an external device (e.g., a camera or a camcorder), to be outputted through the display unit 480 or the audio output unit 485 in response to an external device image play command received through the user input interface 450.

Meanwhile, the controller 470 can control the display unit 480 to display a video. For example, the controller 470 can control a broadcast video inputted through the tuner 410, an external input video inputted through the external device interface 435, a video inputted through the network interface 430, or a video stored in the storage unit 440 to be displayed on the display unit 480. Here, the video displayed on the display unit 480 may include a still image or moving images or may include a 2D or 3D video.

The controller 470 may control a content to be played. Here, the content may include a content stored in the digital device 400, a received broadcast content, or a content inputted externally. The content may include at least one of a broadcast video, an external input video, an audio file, a still image, an accessed web screen, and a document file.

The controller 470 may control an application or an application list, which is located in the digital device 300 or downloadable from an external network, to be displayed when an application view menu is entered.

The controller 470 may control installation and execution of applications downloaded from an external network together with various user interfaces. Moreover, the controller 470 can control a video related to a launched application to be displayed on the display unit 480 by a user's selection.

Meanwhile, a channel browsing processor (not shown) configured to generate a thumbnail image corresponding to a channel signal or an external input signal may be further included.

The channel browsing processor may receive an input of a stream signal (TS) outputted from the demodulator 420 or an input of a stream signal outputted from the external device interface 435, extract a video from the inputted stream signal, and then generate a thumbnail image. The generated thumbnail image can be directly inputted to the controller 470 or may be inputted to the controller 470 by being encoded. Moreover, the generated thumbnail image may be encoded into a stream and then inputted to the controller 470. The controller 470 may display a thumbnail list including a plurality of thumbnail images on the display unit 480 using the inputted thumbnail images. The thumbnail images included in the thumbnail list can be updated sequentially or simultaneously. Accordingly, the user can conveniently check content of a plurality of broadcast channels.

The display unit 480 may convert each of a video signal, a data signal, and an OSD signal processed by the controller 470 or each of a video signal and a data signal received from the external device interface 435 into R, G and B signals to generate a drive signals.

The display unit 480 may include a PDP, an LCD, an OLED, a flexible display, a 3D display, or the like.

The display unit 480 may be configured as a touchscreen and used as an input device as well as an output device.

The audio output unit 485 receives a signal audio-processed by the controller 470, for example, a stereo signal, a 3.1 channel signal or a 5.1 channel signal, and then outputs the received signal as audio. The audio output unit 485 may be configured as one of speakers of various types.

Meanwhile, the digital device 400 may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 470 through the user input interface 450.

The digital device 400 may further include a photographing unit (not shown) for photographing a user. Image information acquired by the photographing unit (not shown) can be inputted to the controller 470.

The controller 470 may sense a gesture of a user from an image captured by the photographing unit (not shown) or a signal sensed by the sensing unit (not shown), or by combining the image and the signal.

The power supply unit 490 may supply a corresponding power to the digital device 400 overall.

Particularly, the power supply unit 490 can supply the power to the controller 470 configurable as a system-on-chip (SoC), the display unit 480 for a video display, and the audio output unit 485 for an audio output.

To this end, the power supply unit 490 may include a converter (not shown) configured to convert an AC power to a DC power. Meanwhile, for example, if the display unit 480 is configured as an LCD panel having a multitude of backlight lamps, the power supply unit 490 may further include an inverter (not shown) capable of PWM (pulse width modulation) operation for luminance variation or dimming drive.

The remote controller 500 sends a user input to the user input interface 450. To this end, the remote controller 500 can use Bluetooth, RF communication, IR communication, UWB, ZigBee, etc.

In addition, the remote controller 500 can receive audio, video or data signal outputted from the user input interface 450 and then display the received signal or output the same as audio or vibration.

The above-described digital device 400 may include a digital broadcast receiver capable of processing digital broadcast signals of ATSC or DVB of a stationary or mobile type.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Figure 5:
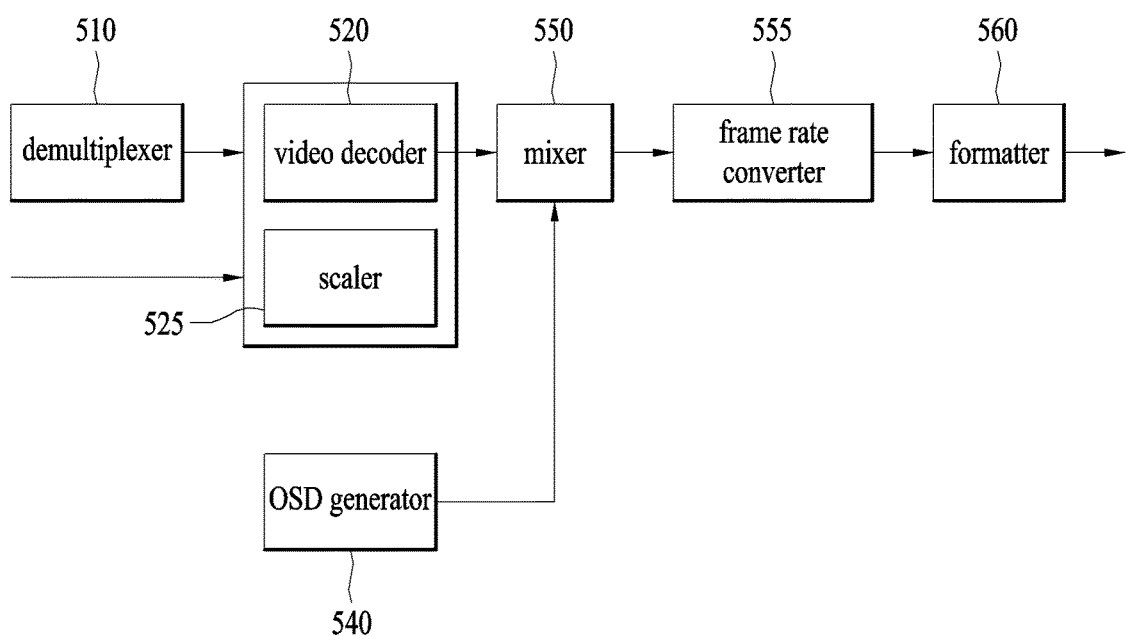
FIG. 5 is a block diagram showing the detailed configuration of each of controllers of FIGS. 2 to 4 according to one embodiment of the present invention.

FIG. 5 is a block diagram showing the detailed configuration of each of controllers of FIGS. 2 to 4 according to one embodiment of the present invention.

One example of the controller may include a demultiplexer 510, a video processor 520, an OSD generator 540, a mixer 550, a frame rate converter (FRC) 555, and a formatter 560. Besides, the controller may further include an audio processor and a data processor (not shown).

The demultiplexer 510 demultiplexer an inputted stream. For instance, the demultiplexer 510 can demultiplex an inputted stream signal into an MPEG-2 TS video, audio and data signals. Herein, the stream signal inputted to the demultiplexer may include a stream signal outputted from the tuner, demodulator or external device interface.

The video processor 520 performs a video processing of the demultiplexed video signal. To this end, the video processor 520 may include a video decoder 525 and a scaler 535.

The video decoder 525 can decode the demultiplexed video signal, and the scaler 535 can scale the resolution of the decoded video signal to be outputtable from the display.

The video decoder 525 can support various specifications. For instance, the video decoder 525 performs a function of MPEG-2 decoder if a video signal is encoded by MPEG-2. And, the video decoder 535 performs a function of H.264 decoder if a video signal is encoded by DMB (digital multimedia broadcasting) or H.264.

Meanwhile, the video signal decoded by the image processor 520 is inputted to the mixer 550.

The OSD generator 540 may generate OSD data according to a user input or by itself. For example, the OSD generator 540 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 540 can generate data to display a caption of a broadcast video or EPG based broadcast information.

The mixer 550 mixes the OSD data generated by the OSD generator 540 and the video signal processed by the video processor 520. The mixer 550 then provides the mixed signal to the formatter 560. By mixing the decoded video signal and the OSD data, OSD is displayed in a manner of overlaying a broadcast video or an external input video.

The frame rate converter (FRC) 555 may convert a frame rate of an inputted video. For example, the frame rate converter 555 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 555 can perform the conversion by inserting a first frame between the first frame and a second frame or inserting a third frame predicted from the first and second frames. For another instance, in case of converting a frame rate into 240 Hz from 60 Hz, the frame rate converter 555 can perform the conversion by further inserting three same or predicted frames between the existing frames. Meanwhile, in case of not performing a separate frame conversion, the frame rate converter 555 may be bypassed.

The formatter 560 may change the output of the frame rate converter 555, which is inputted thereto, to fit an output format of the display unit. For example, the formatter 560 can output an RGB data signal. In this case, this RGB data signal can be outputted as low voltage differential signal (LVDS) or mini-LVDS. If an inputted output of the frame rate converter 555 is a 3D video signal, the formatter 560 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal.

And, the audio processor (not shown) in the controller can process base, treble, volume adjustment and the like.

A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital device is one example according to the present invention. And, at least one of the components may be integrated, added or omitted depending on options of an actually embodied digital device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

Meanwhile, a digital device may include an image signal processing device configured to process a signal of an image saved in the corresponding device or a signal of an inputted image. Examples of the image signal processing device may include a settop box (STB) failing to include the display unit 480 and the audio output unit 485 shown in FIG. 4, the aforementioned DVD player, a Blu-ray player, a game device, a computer and the like.

Figure 6:
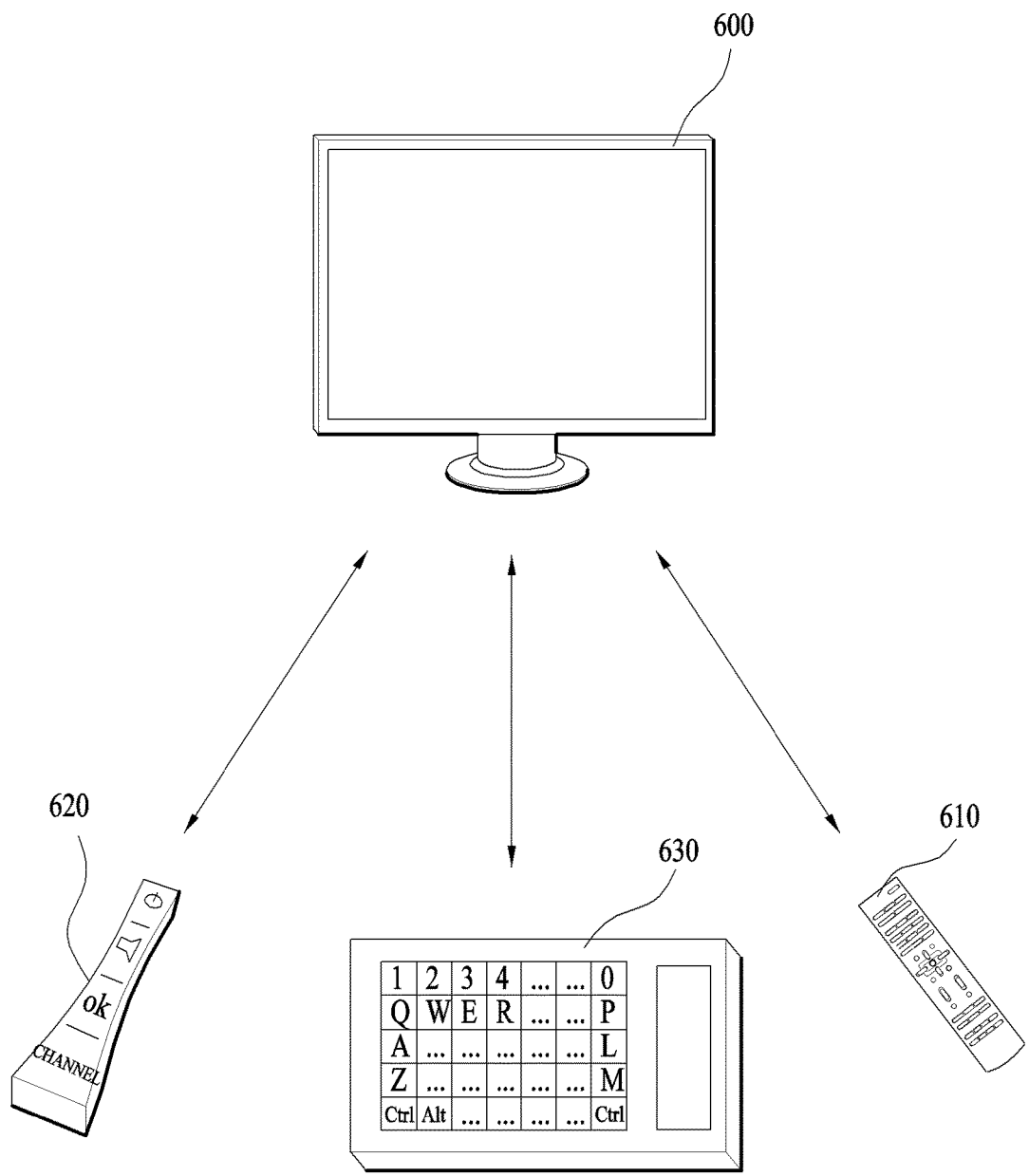
FIG. 6 is a diagram showing an input unit connected to each of the digital devices of FIGS. 2 to 4 according to one embodiment of the present invention.

FIG. 6 is a diagram of an input means connected to each of the digital devices shown in FIGS. 2 to 4 according to one embodiment of the present invention.

In order to control a digital device 600, a front panel (not shown in the drawing) or a control means (e.g., an input means) installed in the digital device 600 is used.

Meanwhile, as a user interface device (UID) capable of a wire/wireless communication, the control means includes a remote controller 610, a key board 630, a pointing device 620, a touchpad, or the like, mainly embodied for the purpose of controlling the digital device 600. And, a control means dedicated to an external input by being connected to the digital device 600 may be included as well. Besides, the control means may further include a mobile device (e.g., a smartphone, a tablet PC, etc.) capable of controlling the digital device 600 through a mode switching or the like despite not having the purpose of controlling the digital device 600. For clarity, a pointing device is taken as one example for the description in the present specification, by which the present invention is non-limited.

The input means can communicate with the digital device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS and the like.

The remote controller 610 is a general input means provided with various key buttons required for controlling the digital device 600.

The pointing device 620 provided with a gyro sensor and the like delivers a prescribed control command to the digital device 600 by embodying a corresponding pointer on a screen of the digital device 600 based on a user's motion, a pressure, a rotation and the like. The pointing device 620 may be called one of various names such as a magic remote controller, a magic controller and the like.

As the digital device 600 is an intelligence integrated digital device capable of providing various services such as a web browser, an application, an SNS (social network service) and the like as well as broadcasts, it is difficult to control the digital device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

The digital device described in the present specification uses OS and/or Web OS as a platform. Hereinafter, such a processing as a WebOS based configuration or algorithm may be performed by the controller of the above-described digital device and the like. In this case, the controller is used in a broad sense including the controllers shown in FIGS. 2 to 5. Hence, in the following description, regarding a configuration for processing WebOS based or related services, applications, contents and the like in a digital device, hardware or component including software, firmware and the like is named a controller.

Such a Web OS based platform may improve development independency and functional extensibility by integrating services, applications and the like based on Luna-service Bus for example and is able to increase application development productivity based on a web application framework. In addition, system resources and the like are efficiently used through a WebOS process and resource management, whereby multitasking can be supported.

Meanwhile, a Web OS platform described in the present specification may be available not only for stationary devices such as personal computers (PCs), TVs and settop boxes (STBs) but also for mobile devices such as cellular phones, smartphones, tablet PCs, laptops, wearable devices, and the like.

A software structure for a digital device is a monolithic structure capable of solving conventional problems depending on markets and has difficulty in external application with a multi-threading based signal process and closed product. In pursuit of new platform based development, cost innovation through chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
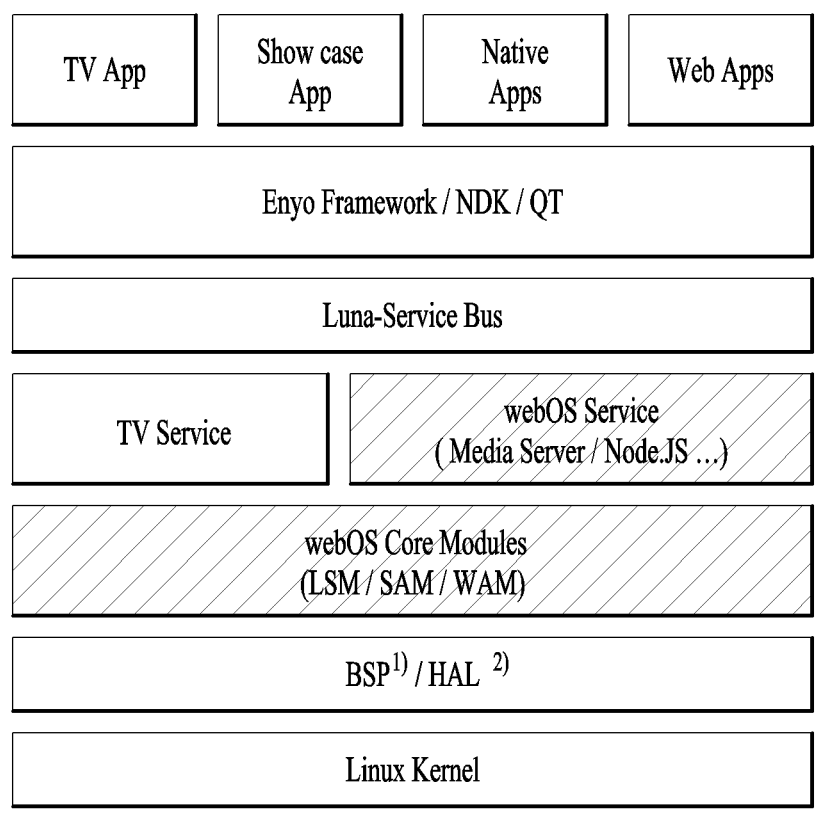
FIG. 7 is a diagram showing webOS architecture according to one embodiment of the present invention.

FIG. 7 is a diagram showing Web OS architecture according to one embodiment of the present invention.

The architecture of Web OS platform is described with reference to FIG. 7 as follows.

The platform can be mainly classified into a system library based Web OS core platform, an application, a service and the like.

The architecture of the Web OS platform includes a layered structure. OS, system library(s), and applications exist in a lowest layer, a next layer and a most upper layer, respectively.

First of all, regarding the lowest layer, as a Linux kernel is included as an OS layer, Linux may be included as an OS of the digital device.

Above the OS layer, BSP/HAL (Board Support Package/Hardware Abstraction layer, Web OS core modules layer, service layer, Luna-Service Bus layer, Enyo framework/NDK (Native Developer's Kit)/QT layer, and an application layer (as a most upper layer) exist in order.

Meanwhile, some layers can be omitted from the aforementioned Web OS layer structure. A plurality of layers can be integrated into a single layer, and vice versa.

The Web OS core module layer may include LSM (Luna Surface Manager) for managing a surface window and the like, SAM (System & Application Manage) for managing launch, running state and the like of an application, WAM (Web Application Manager) for managing Web application and the like based on WebKit, etc.

The LSM manages an application window appearing on a screen. The LSM is in charge of a display hardware (HW), provides a buffer capable of rendering substance required for applications, and outputs a composition of rendering results of a plurality of application to a screen.

The SAM manages a performance policy per conditions of system and application.

Meanwhile, since Web OS may regard a web application (Web App) as a basic application, the WAM is based on Enyo Framework.

A service use of application is performed through Luna-service Bus. A new service may be registered as the Bus, and an application can find and use a service required for itself.

The service layer may include services of various service levels such as TV service, Web OS service and the like. Meanwhile, the Web OS service may include a media server, a Node.JS and the like. Particularly, Node.JS service supports javascript for example.

The Web OS service is Linux process of implementing a function logic and can communicate through Bus. This can be mainly divided into four parts and is constructed with a TV process, services migrating into Web OS from an existing TV or services corresponding to manufacturer-differentiated services, Web OS common service, and Node.js service developed with javascript and used through Node.js.

The application layer may include all applications supportable by the digital device, e.g., TV application, showcase application, native application Web application, etc.

Application on Web OS may be sorted into Web Application, PDK (Palm Development Kit) application, QML (Qt Meta Language or Qt Modeling Language) application and the like according to implementing methods.

The Web Application is based on WebKit engine and is run on WAM Runtime. Such a web application is based on Enyo Framework or may be run in a manner of being developed based on general HTML5, CSS (cascading style sheets), and javascript.

The PDK application includes a native application and the like developed with C/C++ based on PDK provided for a $3^{rd}$ party or an external developer. The PDK means a set of development libraries and tools provided to enable a third party (e.g., a game, etc.) to develop a native application (C/C++). The PDK application can be used to develop an application of which performance is significant.

The QML application is a Qt based native application and includes basic applications (e.g., card view, home dashboard, virtual keyboard, etc.) provided with Web OS platform. Herein, QML is a mark-up language of a script type instead of C++.

Meanwhile, in the above description, the native application means an application that is developed with C/C++, complied, and run in binary form. Such a native application has an advantage of a fast running speed.

Figure 8:
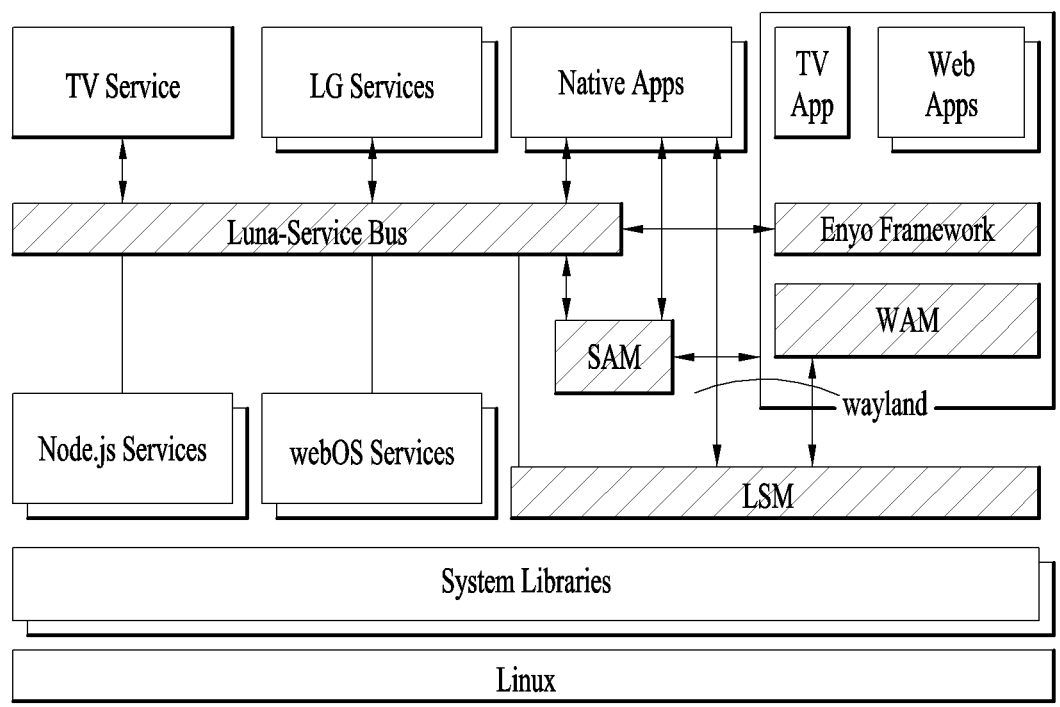
FIG. 8 is a diagram showing architecture of webOS device according to one embodiment of the present invention.

FIG. 8 is a diagram showing an architecture of Web OS device according to one embodiment of the present invention.

FIG. 8 is a block diagram based on a runtime of a Web OS device, which can be understood with reference to the layered structure shown in FIG. 7.

The following description is made with reference to FIG. 7 and FIG. 8.

Referring to FIG. 8, above a system OS (Linux) and system libraries, services, applications and Web OS core modules are included. And, communications among them can be performed through Luna-Service-Bus.

Node.js services (e-mail, contact, calendar, etc.) based on HTML5, CSS, and java script, Web OS services such as Logging, backup, file notify, database (DB), activity manager, system policy, AudioD (Audio Daemon), update, media server and the like, TV services such as EPG (Electronic Program Guide), PVR (Personal Video Recorder), data broadcasting and the like, CP services such as voice recognition, Now on, Notification, search, ACR (Auto Content Recognition), CBOX (Contents List Browser), wfdd, DMR, Remote Application, download, SDPIF (Sony Philips Digital Interface Format) and the like, native applications such as PDK applications, browser, QML application and the like, and Enyo Framework based UI related TV applications and Web applications are processed through the Web OS core module like the aforementioned SAM, WAM and LSM via Luna-Service-Bus. Meanwhile, in the above description, it is not mandatory for the TV applications and the Web applications to be Enyo-Framework-based or UI-related.

CBOX can manage a list and metadata for contents of such an external device connected to TV as USB, DLNA, Cloud and the like. Meanwhile, the CBOX can output a content listing of various content containers such as USB, DMS, DVR, Cloud and the like in form of an integrated view. And, the CBOX shows a content listing of various types such as picture, music, video and the like and is able to manage the corresponding metadata. Besides, the CBOX can output a content of an attached storage by real time. For instance, if a storage device such as USB is plugged in, the CBOX should be able to output a content list of the corresponding storage device. In doing so, a standardized method for the content list processing may be defined. And, the CBOX may accommodate various connecting protocols.

SAM is provided to enhance improvement and extensibility of module complexity. Namely, for instance, since an existing system manager handles various functions (e.g., system UI, window management, web application run time, constraint condition processing on UX, etc.) by a single process, implementation complexity is very high. Hence, by separating major functions and clarifying an inter-function interface, implementation complexity can be lowered.

LSM supports system UX implementation (e.g., card view, launcher, etc.) to be independently developed and integrated and also supports the system UX implementation to easily cope with a product requirement change and the like. In case of synthesizing a plurality of application screens like App On App, the LSM enables multitasking by utilizing hardware (HW) resource to the maximum, and is able to provide a window management mechanism for multi-window, 21:9 and the like.

LSM supports implementation of system UI based on QML and enhances development productivity thereof. QML UX can easily configure a screen layout and a UI component view and facilitates development of a code for processing a user input. Meanwhile, an interface between QML and Web OS component is achieved through QML extensive plug-in, and a graphic operation of application may be based on wayland protocol, luna-service call and the like.

LSM is an abbreviation of Luna Surface Manager, as described above, and performs a function of an application window compositor.

LSM synthesizes an independently developed application, a US component and the like and then outputs the synthesized one to a screen. With respect to this, if components such as Recents application, showcase application, launcher application and the like render contents of their own, respectively, LSM defines an output region, an inter-operating method and the like as a compositor. So to speak, the LSM (i.e., compositor) processes graphic synthesis, focus management, input event and the like. In doing so, LSM receives an event, a focus and the like from an input manager. Such an input manager may include a remote controller, an HID (e.g., mouse & keyboard), a joy stick, a game pad, an application remote, a pen touch and the like.

Thus, LSM supports a multiple window model and can be simultaneously run on all applications owing to system UI features. With respect to this, LSM can support launcher, recents, setting, notification, system keyboard, volume UI, search, finger gesture, Voice Recognition (STT (Sound to Text), TTS (Text to Sound), NLP (Natural Language Processing), etc.), pattern gesture (camera, MRCU (Mobile Radio Control Unit)), Live menu, ACR (Auto Content Recognition), and the like.

Figure 9:
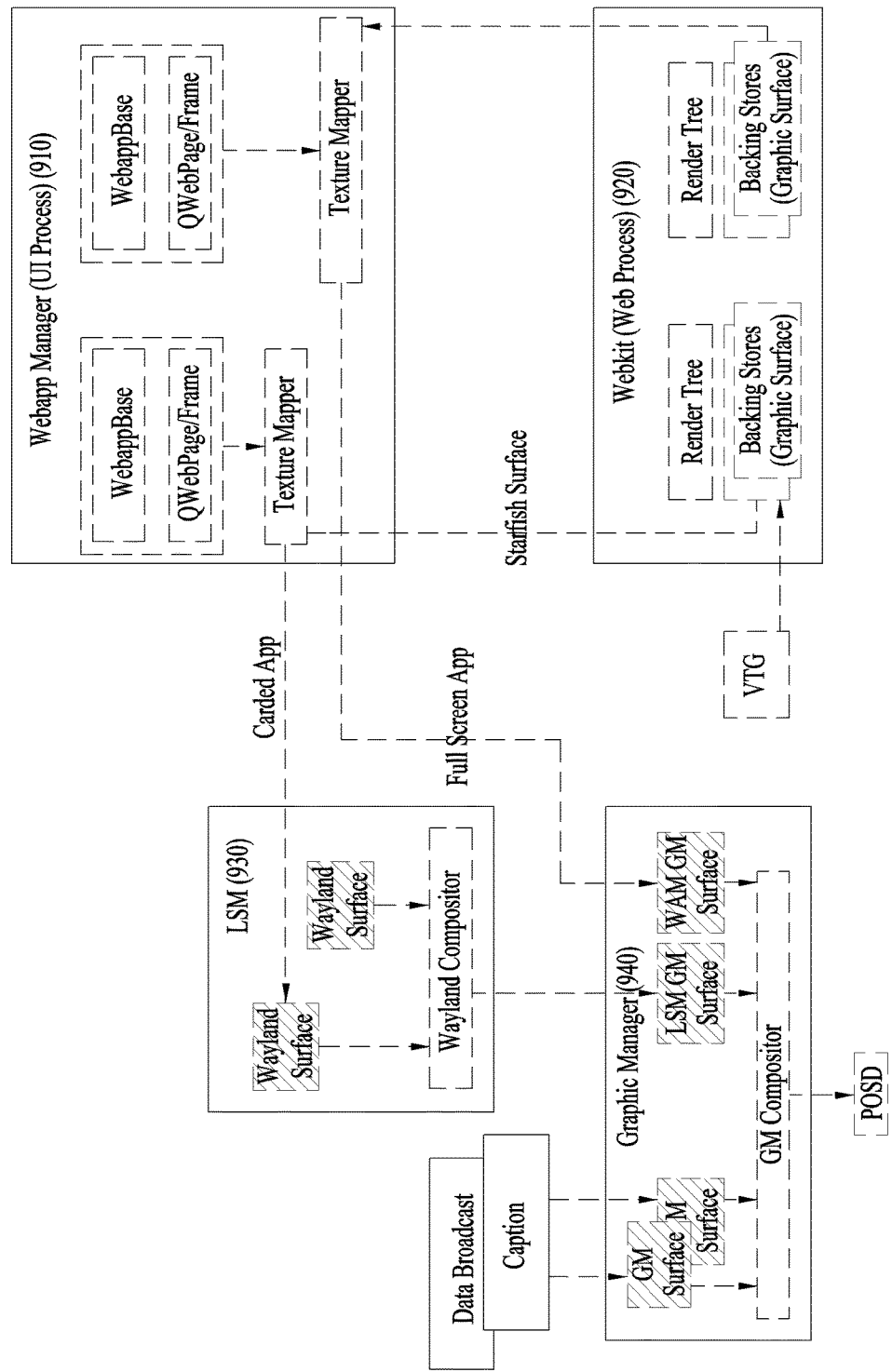
FIG. 9 is a diagram showing a graphic composition flow in a webOS device according to one embodiment of the present invention.

FIG. 9 is a diagram showing a graphic composition flow in a Web OS device according to one embodiment of the present invention.

Referring to FIG. 9, a graphic composition processing can be performed through a web application manager 910 in charge of a UI process, a webkit 920 in charge of a web process, an LSM 930, and a graphic manager (GM) 940.

If a web application based graphic data (or application) is generated as a UI process from the web application manager 910, the generated graphic data is forwarded to a full-screen application or the LSM 930. Meanwhile, the web application manager 910 receives an application generated from the webkit 920 for sharing the GPU (graphic processing unit) memory for the graphic managing between the UI process and the web process and then forwards it to the LSM 930 if the application is not the full-screen application. If the application is the full-screen application, it can bypass the LSM 930. In this case, it may be directly forwarded to the graphic manager 940.

The LSM 930 sends the received UI application to a wayland compositor via a wayland surface. The wayland compositor appropriately processes it and then forwards it to the graphic manager. Thus, the graphic data forwarded by the LSM 930 is forwarded to the graphic manager compositor via the LSM GM surface of the graphic manager 940 for example.

Meanwhile, as described above, the full-screen application is directly forwarded to the graphic manager 940 without passing through the LSM 930. Such an application is processed by the graphic manager compositor via the WAM GM surface.

The graphic manager processes all graphic data within the Web OS device. The graphic manager receives all the graphic data through the GM surface like data broadcasting application, caption application and the like as well as the data through the LSM GM and the data through the WAM GM surface and then processes them to be outputted to the screen appropriately. Herein, a function of the GM compositor is equal or similar to that of the aforementioned compositor.

Figure 10:
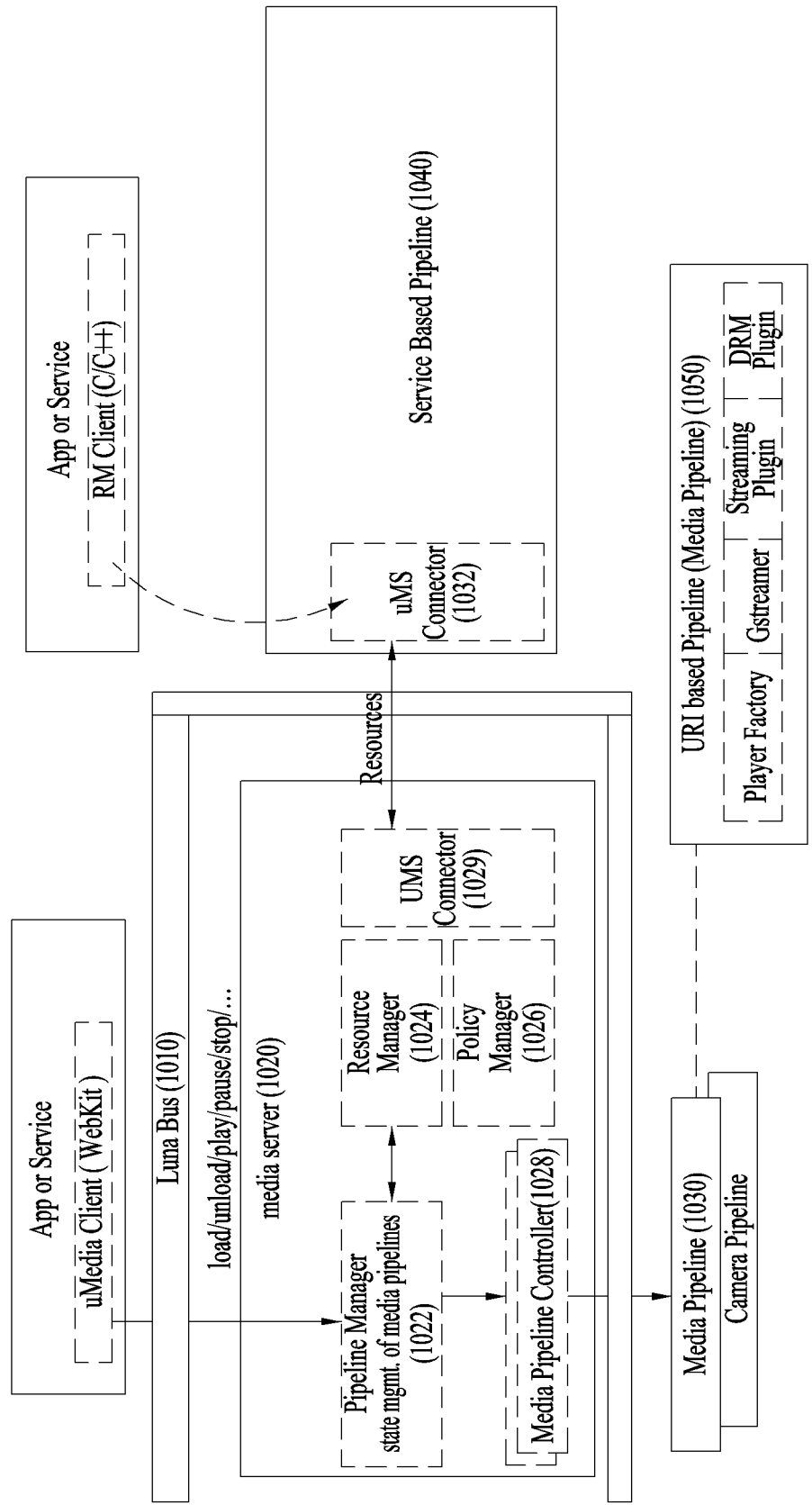
FIG. 10 is a diagram showing a media server according to one embodiment of the present invention.
Figure 11:
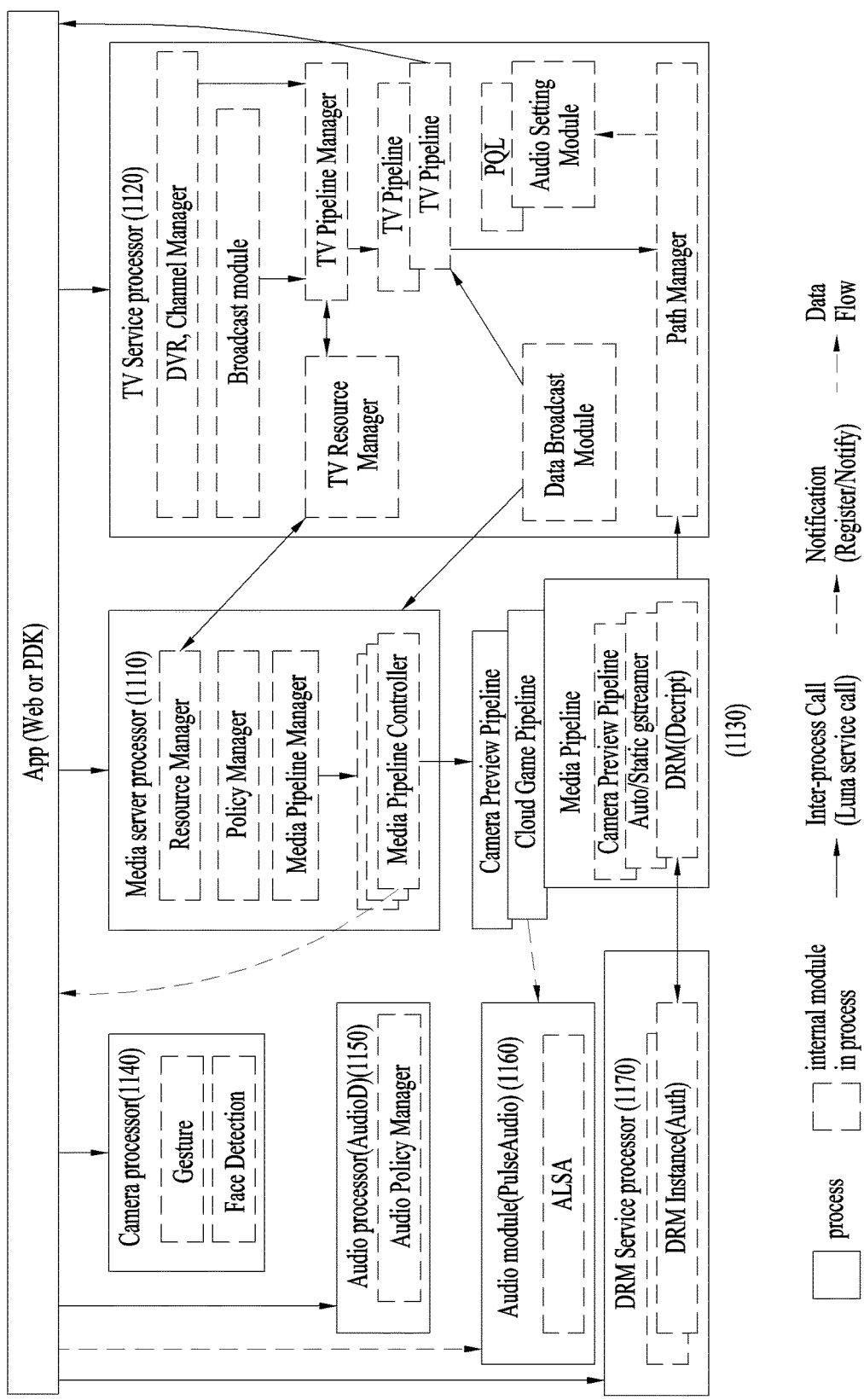
FIG. 11 is a block diagram showing a configuration of a media server according to one embodiment of the present invention.
Figure 12:
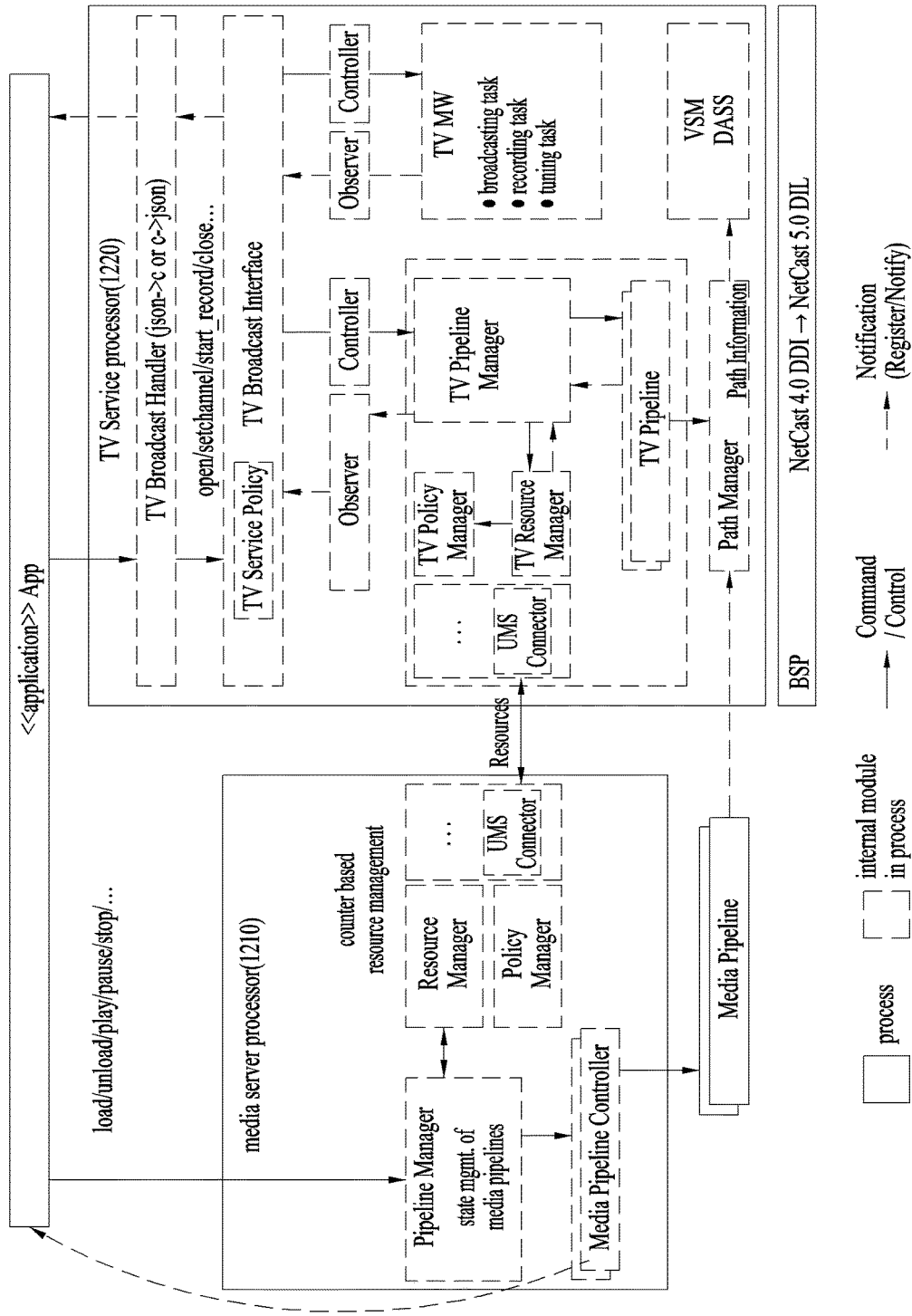
FIG. 12 is a diagram showing the relation between a media server according to one embodiment of the present invention and a TV service.

FIG. 10 is a diagram showing a media server according to one embodiment of the present invention. FIG. 11 is a block diagram showing a configuration of a media server according to one embodiment of the present invention. FIG. 12 is a diagram showing the relation between a media server and according to one embodiment of the present invention and a TV service.

A media server supports executions of various multimedia in a digital device and manages necessary resources. The media server can efficiently use a hardware resource required for a media play. For instance, the media server needs audio/video hardware resource to execute multimedia, and is able to efficiently utilize the resource by managing a current resource use status. Generally, a stationary (or standing) device having a screen larger than that of a mobile device requires more hardware resources on multimedia execution and needs a faster encoding/decoding and graphic data transfer speed due to a massive data size. Meanwhile, the media server should be able to handle a broadcasting/recording/tuning task, a task of recording at the same time of viewing, a task of displaying both a sender screen and a receiver screen during a video call, and the like as well as a streaming and a file based play. Yet, since hardware resources such as an encoder, a decoder, a tuner, a display engine, and the like are limited by chipset units, it is difficult for the media server to execute several tasks at the same time. Hence, the media server handles the tasks in a manner of restricting a use scenario or receiving an input of user selection.

The media server can add robustness to system stability. For instance, by removing an erroneous play pipeline per pipeline in the course of a media play and then re-maneuvering the media play, another media play is not affected even if such an error occurs. Such a pipeline is a chain of connecting the respective unit functions (e.g., decoding, analysis, output, etc.) in case of a media play request, and necessary unit functions may be changed according to a media type and the like.

The media server may have extensibility. For instance, the media server can add a pipeline of a new type without affecting an existing implementation scheme. For instance, the media server can accommodate a camera pipeline, a video conference (Skype) pipeline, a third-party pipeline and the like.

The media server can handle a general media play and a TV task execution as separate services, respectively. The reason for this is that an interface of a TV service is different from a media play case. In the above description, the media server supports operations of 'setchannel', 'channelup', 'channeldown', 'channeltuning', 'recordstart' and the like in association with the TV service but supports operations of 'play', 'pause', 'stop' and the like in association with the general media play, thereby supporting different operations for the two services, respectively. Thus, the media server is able to handle the services separately.

The media server may control or manage resource management functions integratedly. Hardware resource allocation, recovery and the like in a device are integratedly performed in the media server. Particularly, a TV service process delivers a currently running task, a current resource allocation status and the like to the media server. Each time each media is executed, the media server secures a resource, activates a pipeline, and performs a grant of execution by a priority (e.g., policy), a resource recovery of other pipelines and the like in response to a media execution request based on a current resource status occupied by each pipeline. Herein, a predefined execution priority and a necessary resource information for a specific request are managed by a policy manager, and a resource manager can handle resource allocation, recovery and the like by communicating with the policy manager.

The media server can retain an ID (identifier) for every operation related to a play. For instance, based on an identifier, the media server can give a command by indicating a specific pipeline. For two or more media plays, the media server may give a command to pipelines by distinguishing the two from each other.

The media server may be in charge of a play of HTMS 5 standard media.

Besides, the media server may follow a TV reconfiguration range for a separate service processing of a TV pipeline. The media server can be designed irrespective of the TV reconfiguration range. If the TV is not separately service-processed, when a problem arises from a specific task, the TV may be re-executed entirely.

The media server is so-called uMS, i.e., a micro media server. Herein, a media player is a media client. This may mean a webkit for HTML 5 video tag, camera, TV, Skype, $2^{nd}$ screen and the like.

A core function of the media server is the management of a micro resource such as a resource manager, a policy manager or the like. With respect to this, the media server controls a playback control role on a web standard media content. Regarding this, the media server may manage a pipeline controller resource.

Such a media server supports extensibility, reliability, efficient resource usage and the like for example.

So to speak, the uMS, i.e., the media server manages and controls the use of resources for an appropriate processing in a Web OS device such as a resource (e.g., cloud game, MVPD (pay service, etc.), camera preview, 2nd screen, Skype, etc.), a TV resource and the like overall, thereby functioning in managing and controlling an efficient usage. Meanwhile, when resources are used, each resource uses a pipeline for example. And, the media server can manage and control generation, deletion, usage and the like of the pipeline for resource management overall.

Herein, a pipeline may be generated if a media related to a task starts to continue a job such as a parsing of request, decoding stream, video output, or the like. For instance, in association with a TV service or application, watching, recording, channel tuning or the like is individually processed in a manner that a resource usage or the like is controlled through a pipeline generated in response to a corresponding request.

A processing structure of a media server and the like are described in detail with reference to FIG. 10 as follows.

In FIG. 10, an application or service is connected to a media server 1020 through a luna-service bus 1010. The media server 1020 is connected to generated pipelines through the luna-service bus 1010 again and manages them.

The application or service is provided with various clients according to its property and is able to exchange data with the media server 1020 or the pipelines through them.

The clients may include a uMedia client (webkit) for the connection to the media server 1020, an RM (resource manager) client (C/C++) and the like for example.

The application including the uMedia client, as described above, is connected to the media server 1020. In particular, the uMedia client corresponds to a video object to be described later. Such a client uses the media server 1020 for an operation of a video in response to a request or the like.

Herein, the video operation relates to a video status. Loading, unloading, play (or, playback, reproduce), pause, stop and the like may include all status data related to video operations. Each operation or status of a video can be processed through individual pipeline generation. Hence, the uMedia client sends status data related to the video operation to the pipeline manager 1022 in the media server.

The pipeline manager 1022 obtains information on a current resource of a device through data communication with the resource manager 1024 and makes a request for allocation of a resource corresponding to the status data of the uMedia client. In doing so, the pipeline manager 1022 or the resource manager 1024 controls the resource allocation through the data communication with the policy manager 1026 if necessary in association with the resource allocation and the like. For instance, if a resource to be allocated by the resource manager in response to the request made by the pipeline manager 1022 does not exist or is insufficient, an appropriate resource allocation or the like according to the request can be performed according to priority comparison of the policy manager 1026 and the like.

Meanwhile, the pipeline manager 1022 makes a request for pipeline generation for an operation according to the uMedia client's request for the resource allocated according to the resource allocation of the resource manager 1024 to a media pipeline controller 1028.

The media pipeline controller 1028 generates a necessary pipeline under the control of the pipeline manager 1022. Regarding the generated pipelines, as shown in the drawing, pipelines related to play, pause, stop and the like can be generated as well as a media pipeline and a camera pipeline. Meanwhile, the pipelines may include pipelines for HTML5, Web CP, smartshare play, thumbnail extraction, NDK, cinema, MHEG (Multimedia and Hypermedia Information coding Experts Group) and the like.

Besides, pipelines may include a service based pipeline (self-pipeline) and a URI based pipeline (media pipeline) for example.

Referring to FIG. 10, the application or service including the RM client may not be directly connected to the media server 1020. The reason for this is that the application or service may directly process a media. So to speak, in case that the application or service directly processes media, the media server can be bypassed. Yet, in doing so, since resource management is necessary for the pipeline generation and usage, a uMS connector functions for it. Meanwhile, if a resource management request for the direct media processing of the application or service is received, the uMS connector communicates with the media server 1020 including the resource manager 1024. To this end, the media server 1020 should be provided with a uMS connector as well.

Hence, by receiving the resource management of the resource manager 1024 through the uMS connector, the application or service can cope with the request of the RM client. Such an RM client may process services such as native CP, TV service, 2$^{nd}$ screen, flash player, U-tube MSE (media source extensions), cloud game, Skype and the like. In this case, as described above, the resource manager 1024 can manage resource through appropriate data communication with the policy manager 1026 if necessary for the resource management.

Meanwhile, the URI based pipeline is processed through the media server 1020 instead of the case of directly processing media like the RM client. The URI based pipelines may include player factory, Gstreamer, streaming plug-in, DRM (Digital Rights Management) plug-in pipeline and the like.

A method of interfacing between an application and media services is described as follows.

There is an interfacing method using a service on a web application. This may be a Luna Call method using PSB (palm service bridge) or a method using Cordova. This is to extend a display with a video tag. Besides, there may be a method of using HTMS5 standard for video tag or media element.

And, there is a method of interfacing using a service in PDK.

Alternatively, there is a method of using a service in an existing CP. This is usable by extending plug-in of an existing platform on the basis of luna for backward compatibility.

Finally, there is an interfacing method in case of non-Web OS. In this case, it is able to interface by directly calling a luna bus.

Seamless change is processed by a separate module (e.g., TVWIN), which is a process for showing a TV on a screen preferentially without Web OS and then processing seamlessly before or during Web OS booting. Since a booting time of Web OS is considerably long, it is used to provide basic functions of a TV service preferentially for a quick response to a user's power-on request. And, the module is a part of a TV service process and supports a seamless change capable of providing fast booting and basic TV functions, a factory mode and the like. And, the module may be in charge of a switching from non-Web OS mode to Web OS mode.

Referring to FIG. 11, a processing structure of a media server is illustrated.

In FIG. 11, a solid line box may indicate a process handling configuration and a dotted line box may indicate an internal processing module in a process. A solid line arrow may include an inter-process call, i.e., a luna service call and a dotted line arrow may indicate a notification of register/notify or a data flow.

A service, a web application or a PDK application (hereinafter 'application') is connected to various service processing configurations through a luna-service bus. Through it, the application operates or an operation of the application is controlled.

A corresponding data processing path is changed according to a type of an application. For instance, if the application is an image data related to a camera sensor, it is processed by being sent to a camera processor 1130. Herein, the camera processor 1130 includes a gesture module, a face detection module and the like and processes image data of the application received. Herein, in case of data requiring a usage of a pipeline and the like automatically or according to a user's selection, the camera processor 1130 may process the corresponding data by generating the pipeline through a media server processor 1110.

Alternatively, if an application includes audio data, the corresponding audio can be processed through an audio processor (AudioD) 1140 and an audio module (PulseAudio) 1150. For instance, the audio processor 1140 processes audio data received from the application and then sends it to an audio module 1150. In doing so, the audio processor 1140 may determine the processing of the audio data by including an audio policy manager. The processed audio data is processed and handled by the audio module 1150. Meanwhile, the application may notify data related to the audio data processing to the audio module 1160, which may be notified to the audio module 1160 by a related pipeline. The audio module 1150 includes ALSA (Advanced Linux Sound Architecture).

Or, in case that an application includes or processes (hereinafter 'includes') a DRM hooked content, a corresponding content data is sent to a DRM service processor 1160. The DRM service processor 1160 generates the DRM hooked content data by generating a DRM instance. Meanwhile, for the processing of the DRM hooked content data, the DRM service processor 1160 can be connected to a DRM pipeline in a media pipeline through the luna-service bus.

A processing for a case that an application includes media data or TV service data (e.g., broadcast data) is described as follows.

FIG. 12 is a diagram showing details of the media service processor and the TV service processor in FIG. 11.

The following description is made with reference to FIG. 11 and FIG. 12 both.

First of all, in case that an application includes TV service data, it is processed by the TV service processor 1120/1220.

Herein, the TV service processor 1120 may include at least one of a DVR/channel manager, a broadcast module, a TV pipeline manager, a TV resource manager, a data broadcast module, an audio setting module, a path manager and the like. Alternatively, the TV service processor 1220 in FIG. 12 may include a TV broadcast handler, a TV broadcast interface, a service processing unit, a TV middleware (MW), a path manager, and a BSP (NetCast). Herein, the service processing unit may mean a module including a TV pipeline manager, a TV resource manager, a TV policy manager, a USM connector and the like.

In the present specification, The TV service processor may be implemented into the configuration shown in FIG. 11 or FIG. 12 or a combination of both configurations. some of the illustrated components may be omitted or new components (not shown) may be further added as required.

Based on attribute or type of the TV service data received from the application, the TV service processor 1120/1220 sends DVR or channel associated data to the DVR/channel manager and also sends it to the TV pipeline manager to generate and process a TV pipeline. Meanwhile, if the attribute or type of the TV service data is a broadcast content data, the TV service processor 1120 generates and processes a TV pipeline through the TV pipeline manager to process the corresponding data through the broadcast module.

Or, a json (Javascript standard object notation) file or a file composed with c is processed by the TV broadcast handler, sent to the pipeline manager through the TV broadcast interface, and then processed by generating a TV pipeline. In this case, the TV broadcast interface sends the data or file through the TV broadcast handler to the TV pipeline manager on the basis of the TV service policy so that the data or file can be referred to for the pipeline generation.

Meanwhile, the TV pipeline manager may be controlled by the TV resource manager when generating one or more pipelines in response to a TV pipeline generation request from the Processing module or manager in the TV service. Meanwhile, in order to request a status and allocation of a resource allocated for the TV service in response to a TV pipeline generation request made by the TV pipeline manager, the TV resource manager may be controlled by the TV policy manager and performs data communication with the media server processor 1110/1210 through the uMS connector. The resource manager in the media server processor delivers a status and a presence/non-presence of allocation of a resource for a current TV service in response to a request made by the TV resource manager. For instance, as a result of confirmation of the resource manager within the media server processor 1110/1210, if all resources for the TV service are already allocated, it is able to notify the TV resource manager that all current resources are completely allocated. In doing so, the resource manager in the media server processor may request or assign TV pipeline generation for the requested TV service by removing a prescribed TV pipeline according to a priority or prescribed reference from TV pipelines previously assigned for the TV service, together with the notification. Alternatively, according to a status report of the resource manager in the media server processor 1110/1210, the TV resource manager may control TV pipelines to be appropriately removed, added, or established.

Meanwhile, BSP supports backward compatibility with an existing digital device for example.

The above-generated TV pipelines may operate appropriately in the corresponding processing process under the control of the path manager. The path manager may determine or control a processing path or process of pipelines by considering an operation of a pipeline generated by the media server processor 1110/1210 as well as the TV pipeline in the processing process.

If the application includes media data instead of TV service data, the data is processed by the media server processor 1110/1210. Herein, the media server processor 1110/1210 includes a resource manager, a policy manager, a media pipeline manager, a media pipeline controller and the like. Meanwhile, various pipelines generated under the control of the media pipeline manager and the media pipeline controller may include a camera preview pipeline, a cloud game pipeline, a media pipeline and the like. Streaming protocol, auto/static gstreamer, DRM and the like may be included in the media pipeline, of which processing flow may be determined under the control of the path manager. The former description with reference to FIG. 10 is recited for a detailed processing process in the media server processor 1110/1210, which is not described redundantly herein.

In the present specification, the resource manager in the media server processor 1110/1210 can perform a resource managing with a counter base for example.

Figure 13:
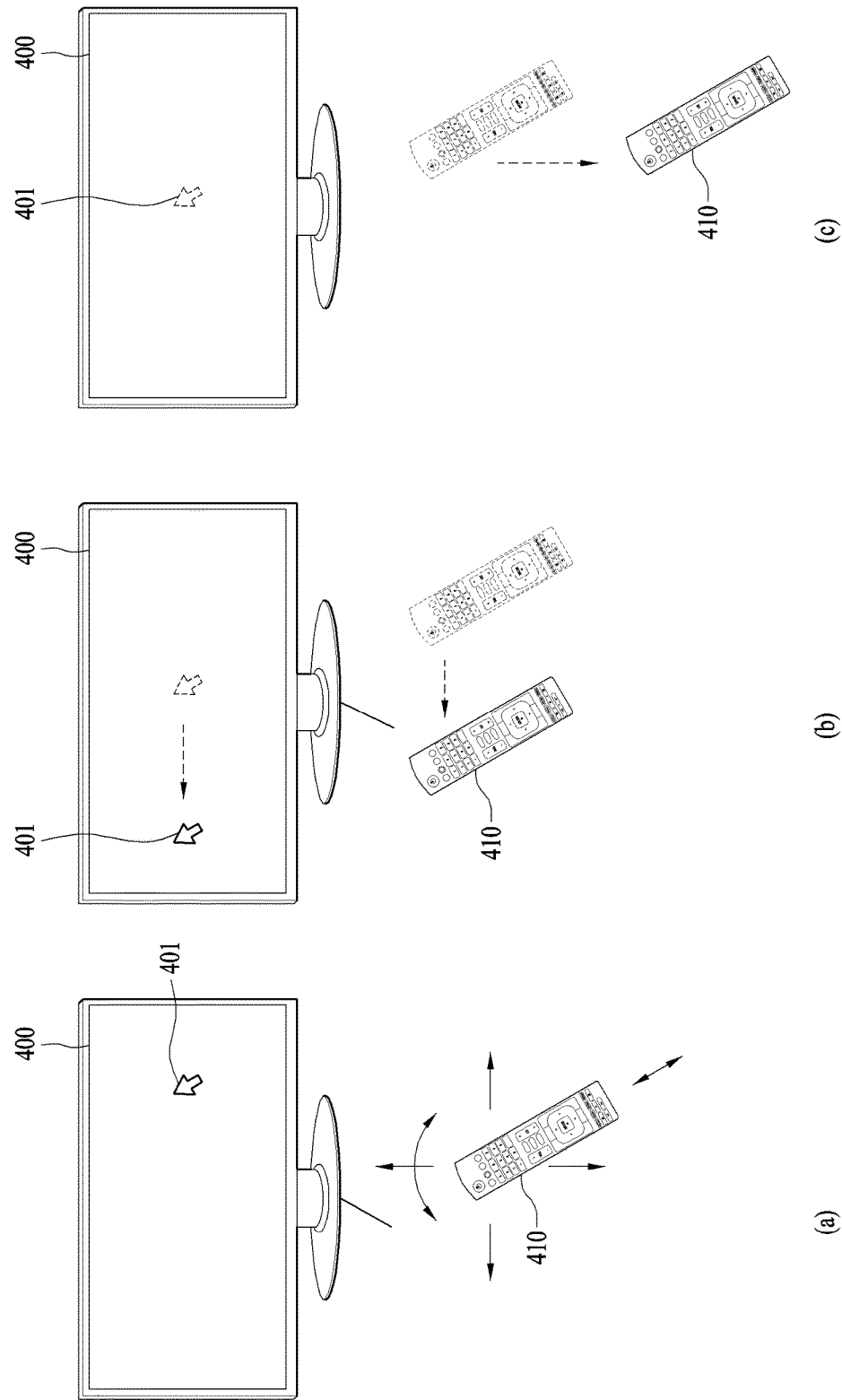
FIG. 13 is a diagram showing a method of controlling a remote controller controlling a random one of video display devices according to embodiments of the present invention.

FIG. 13 is a diagram showing a method of controlling a remote controller controlling a random one of video display devices according to embodiments of the present invention.

As shown in FIG. 13 (*a*), a pointer 205 corresponding to a remote controller 200 is displayed on a display unit 180 for example.

A user can move or rotate the remote controller 200 top and bottom, right and left [FIG. 13 (*b*)] or back and forth [FIG. 13 (*c*)]. The pointer 205 displayed on the display unit 180 of the video display device corresponds to a motion of the remote controller 200. Since the corresponding pointer 205 is moved and displayed in response to a motion in 3D space, such a remote controller 200 may be named a space remote controller.

FIG. 13 (*b*) exemplarily shows that, if a user moves the remote controller 200 to the left, the pointer 205 displayed on the display unit 180 of the video display device moves to the left correspondingly.

Information on the motion of the remote controller 200 sensed through a sensor of the remote controller 200 is sent to the video display device. From the information on the motion of the remote controller 200, the video display device may calculate coordinates of the pointer 205. The video display device can display the pointer 205 to correspond to the calculated coordinates.

FIG. 13 (*c*) exemplarily shows that a user moves the remote controller 200 to get away from the display unit 180 while pressing a specific button in the remote controller 200. If so, a selected region within the display unit 180 corresponding to the pointer 205 can zoom in so as to be displayed by being enlarged. On the contrary, if a user moves the remote controller 200 to get close to the display unit 180, a selected region within the display unit 180 corresponding to the pointer 205 can zoom out so as to be displayed by being reduced. Meanwhile, if the remote controller 200 gets away from the display unit 180, the selected region may zoom out. If the remote controller 200 gets close to the display unit 180, the selected region may zoom in.

Meanwhile, while the specific button in the remote controller 200 is pressed, recognition of top-bottom and right-left motions may be excluded. Namely, if the remote controller 200 is moved to get away from or close to the display unit 180, top, bottom, right and left motions are not recognized but a back-forth motion can be set to be recognized only. While the specific button in the remote controller 200 is not pressed, only the pointer 205 moves in response to top-bottom or right-left motion of the remote controller 200.

Meanwhile, a moving speed or direction of the pointer 205 may correspond to that of the remote controller 200.

Meanwhile, a pointer in the present specification means an object displayed on the display unit 180 in response to a motion of the remote controller 200. Hence, objects in various shapes are possible using the pointer 205 as well as the arrow shape shown in the drawing. For example, the object may conceptually include one of a point, a cursor, a prompt, a thick outline and the like. And, the pointer 205 can be displayed to correspond to a plurality of points of a line, a surface or the like as well as to correspond to a point of one of a width line and a length line on the display unit 180.

Figure 14:
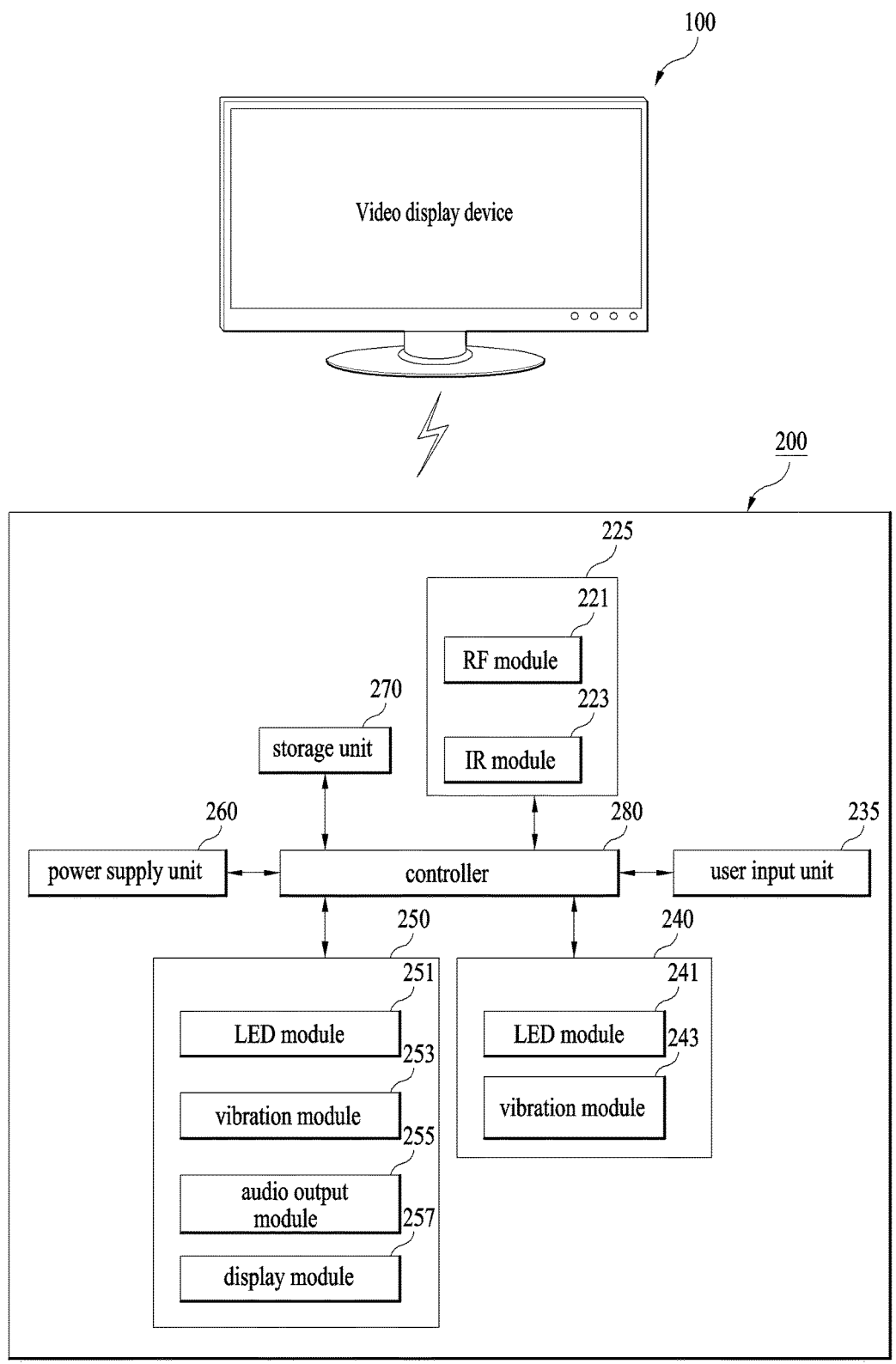
FIG. 14 is an internal block diagram of a remote controller controlling a random one of video display devices according to embodiments of the present invention.

FIG. 14 is an internal block diagram of a remote controller controlling a random one of video display devices according to embodiments of the present invention.

Referring to FIG. 14, a remote controller 200 may include a wireless communication unit 225, a user input unit 235, a sensor unit 240, an output unit 250, a power supply unit 260, a storage unit 270, and a controller 280.

The wireless communication unit 225 transceives signals with a random one of video display devices according to the aforementioned embodiments of the present invention. Among the video display devices according to the embodiments of the present invention, a prescribed video display device 100 shall be described for example.

In the present embodiment, the remote controller 200 may include an RF module 221 capable of transceiving signals with the video display device 100 by the RF communication standards. And, the remote controller 200 may include an IR module 223 capable of transceiving signals with the video display device 100 by the IR communication standards.

In the present embodiment, the remote controller 200 transmits a signal containing information on a motion of the remote controller 200 and the like to the video display device 100 through the RF module 221.

And, the remote controller 200 may receive a signal transmitted by the video display device 100 through the RF module 221. Moreover, the remote controller 200 can send commands for power ON/OFF, channel switching, volume change and the like to the video display device 100 through the IR module 223 if necessary.

The user input unit 235 may include a keypad, a button, a touchpad, a touchscreen or the like. A user manipulates the user input unit 235, thereby inputting a command related to the video display device 100 to the remote controller 200. In case that the user input unit 235 includes a hard key button, a user can input a command related to the video display device 100 to the remote controller 200 through an action of pushing the hard key button. In case that the user input unit 235 includes a touchscreen, a user touches a soft key of the touchscreen, thereby inputting a command related to the video display device 100 to the remote controller 200. The user input unit 235 may include input means (e.g., a scroll key, a jog key, etc.) of various types that can be manipulated by a user, by which the scope of the appended claims and their equivalents is non-limited.

The sensor unit 240 may include a gyro sensor 241 or an acceleration sensor 243.

The gyro sensor 241 can sense information on a motion of the remote controller 200.

For example, the gyro sensor 241 can sense information on an operation of the remote controller 200 with reference to x-, y- and z-axes. The acceleration sensor 243 can sense information on a moving speed of the remote controller 200 and the like. Meanwhile, a distance measurement sensor may be further included, by which a distance from the display unit 180 can be sensed.

The output unit 250 can output a video or audio signal corresponding to a manipulation of the user input unit 235 or a signal transmitted by the video display device 100. Through the output unit 250, a user can whether the user input unit 235 is manipulated, or whether the video display device 100 is controlled.

For example, the output unit 250 may include an LED module 251 configured to turn on light, a vibration module 253 configured to generate vibration, an audio output module 255 configured to output audio, or a display module 257 configured to output video, if the user input unit 235 is manipulated or a signal is transceived with the video display device 100 through the wireless communication unit 225.

The power supply unit 260 supplies power to the remote controller 200. If the remote controller 200 fails to move during a prescribed time, the power supply unit 260 stops supplying the power, thereby reducing the waste of power consumption. If a prescribed key provided to the remote controller 200 is manipulated, the power supply unit 260 can resume the power supply.

The storage unit 270 can store various kinds of programs, applications, data and the like necessary for the control or operation of the remote controller 200. If the remote controller 200 transceives signals with the video display device 100 through the RF module 221 by wireless, the remote controller 200 and the video display device 100 transceive signals on a prescribed frequency band. The controller 280 of the remote controller 200 saves information on a frequency band capable of transceiving signals with the video display device 100 paired with the remote controller 200 by wireless to the storage unit 270 and is then able to refer to the saved information.

The controller 280 controls various matters or issues related to the control of the remote controller 200. The controller 280 can transmit a signal corresponding to a manipulation of a prescribed key of the user input unit 235 or a signal corresponding to a motion of the remote controller 200 sensed by the sensor unit 240 to the video display device 100 through the wireless communication unit 225.

Figure 15:
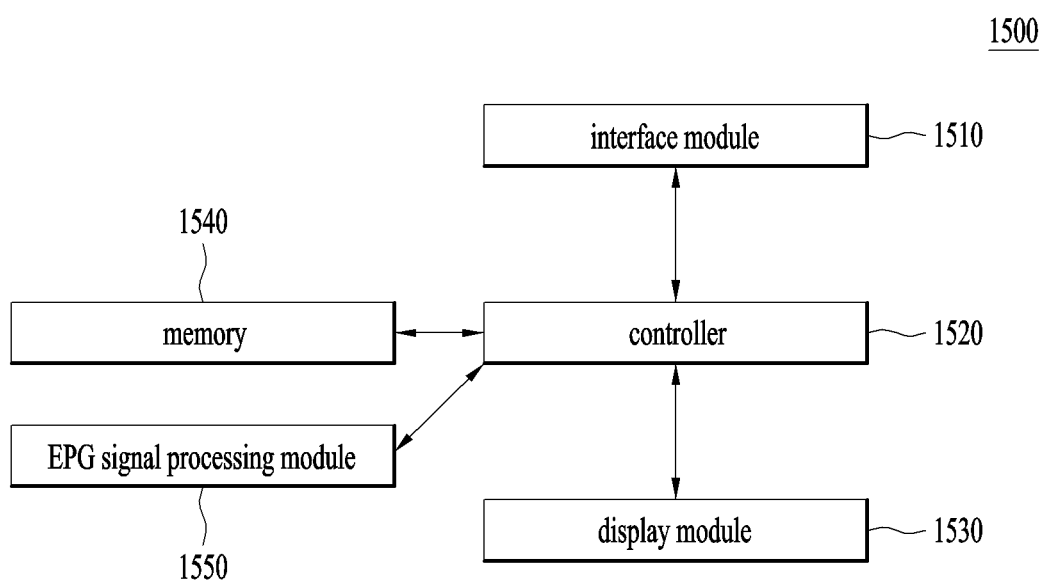
FIG. 15 is a diagram of configuration of a display device according to one embodiment of the present invention.

FIG. 15 is a diagram of configuration of a display device according to one embodiment of the present invention.

A display device 1500 may include an interface module 1510, a controller 1520, a display module 1530, a memory 1540, and an EPG signal processing module 1550.

The interface module 1510 receives a first command for selecting a specific location within a main screen from a remote controller and also receives a second command for selecting a magnification of a zoom window.

The display module 1530 displays a content containing at least one object on the main screen of the display device.

The memory 1540 stores the content displayed on the main screen.

The controller 1520 controls the display module 1530, the memory 1540, the EPG signal processing module 1550 and the interface module 1510.

The controller 1520 enlarges a specific region containing a specific object located within a preset distance from a specific location, displays the enlarged specific region on the zoom window, and displays additional information corresponding to the specific object on the main screen differently in response to the received second command.

Here, the content may correspond to a moving image and a location of the zoom window varies depending on the specific location.

The interface module transceives data with an external server.

The controller 1520 specifies a specific object differently depending on a zoom percentage, sends metadata of the specified specific object to the external server through the interface module, and receives additional information corresponding to the metadata from the external server through the interface module.

If the metadata of the specific object fails to exist, the controller 1520 sends an image of the specific object to the external server through the interface module and receives additional information corresponding to the image from the external server through the interface module.

This shall be described in detail with reference to FIG. 33 later.

The controller 1520 specifies a specific object with a pointer and senses a variation of the specific object displayed on the main screen and a variation of an object different from the specific object. If the variation of the specific object is the greatest one of the sensed object variations, the controller 1520 turns up the voile of an audio signal corresponding to the specific object, enlarges a specific region including the specific object, and displays the enlarged specific region on the zoom window.

If the specific object and the object different from the specific object are persons, the controller senses the variation of the object based on a mouth shape change.

This shall be described in detail with reference to FIG. 30 later.

Although the controller 1520 specifies a specific region with a pointer, if a specific signal is received from the remote controller, the controller 1520 fixes the specific region and moves the zoom window according to a movement of the pointer.

This shall be described in detail with reference to FIG. 23 later.

The controller 1520 enlarges a specific region specified with a pointer in pointing mode and displays the enlarged specific region on the zoom window. And, the specific region moves according to the movement of the pointer.

This shall be described in detail with reference to FIG. 24 later.

The controller 1520 receives a specific signal from the remote controller and adjusts a size of the zoom window with a pointer in response to the received specific signal.

This shall be described in detail with reference to FIG. 26 later.

If receiving a first signal from the remote controller, the controller 1520 stops displaying a content on the main screen and then saves the content to the memory 1540 for a prescribed time from the stop timing. If receiving a second signal different from the first signal from the remote controller after expiration of a prescribed time, the controller 1520 displays the content on the main screen by starting from the stop timing of the content saved to the memory 1540.

This shall be described in detail with reference to FIG. 28 later.

If receiving a specific signal from the remote controller, the controller 1520 stops a content video displayed on the main screen, specifies a specific object in response to a reception of an input for selecting a specific object with a pointer from the remote controller, enlarges the specified specific object, displays the enlarged specific object on the zoom window, captures the displayed zoom window, and saves the captured zoom window to the memory 1540.

This shall be described in detail with reference to FIG. 29 later.

FIG. 16A is a diagram showing a main screen, a specific region and a zoom window according to one embodiment of the present invention.

A main screen is a full screen for displaying a content.

A specific region is a partial region of the main screen and corresponds to a video desired to be enlarged and watched by a user. A specific region 1612 is a region located within a prescribed distance from a specific location specified with a pointer 1614. Although a specific region is displayed in a rectangular shape on a main screen 1610, it is one embodiment only but can be implemented in elliptical, circular, or polygonal shape.

A zoom window is a screen that displays an enlarged specific region. The zoom window is a PIP screen and displays a specific region differently according to a magnification.

Like the main screen 1610, if a specific location is specified with the pointer 1614, the specific region 1612 located within a prescribed distance from the specific location is specified.

Like the main screen 1620, a zoom window 1622 displays an enlarged specific region.

FIG. 16B is a flowchart of a display device controlling method according to one embodiment of the present invention. The present invention is performed by the controller 1520.

Referring to FIG. 16B, a content including at least object is displayed on a main screen of a display device [S1610].

A first command for selecting a specific location within the main screen is received from a remote controller [S1620].

In response to the received first command, a specific region including a specific object within a preset distance from the specific location is enlarged [S1630].

The enlarged specific region is displayed on a zoom window [S1640].

A second command for selecting a magnification of the zoom window is received from the remote controller [S1650].

Additional information corresponding to the specific object is displayed on the main screen differently according to the received second command [S1660].

Here, the content corresponds to a moving image and a location of the zoom window varies according to the specific location.

Figure 17:
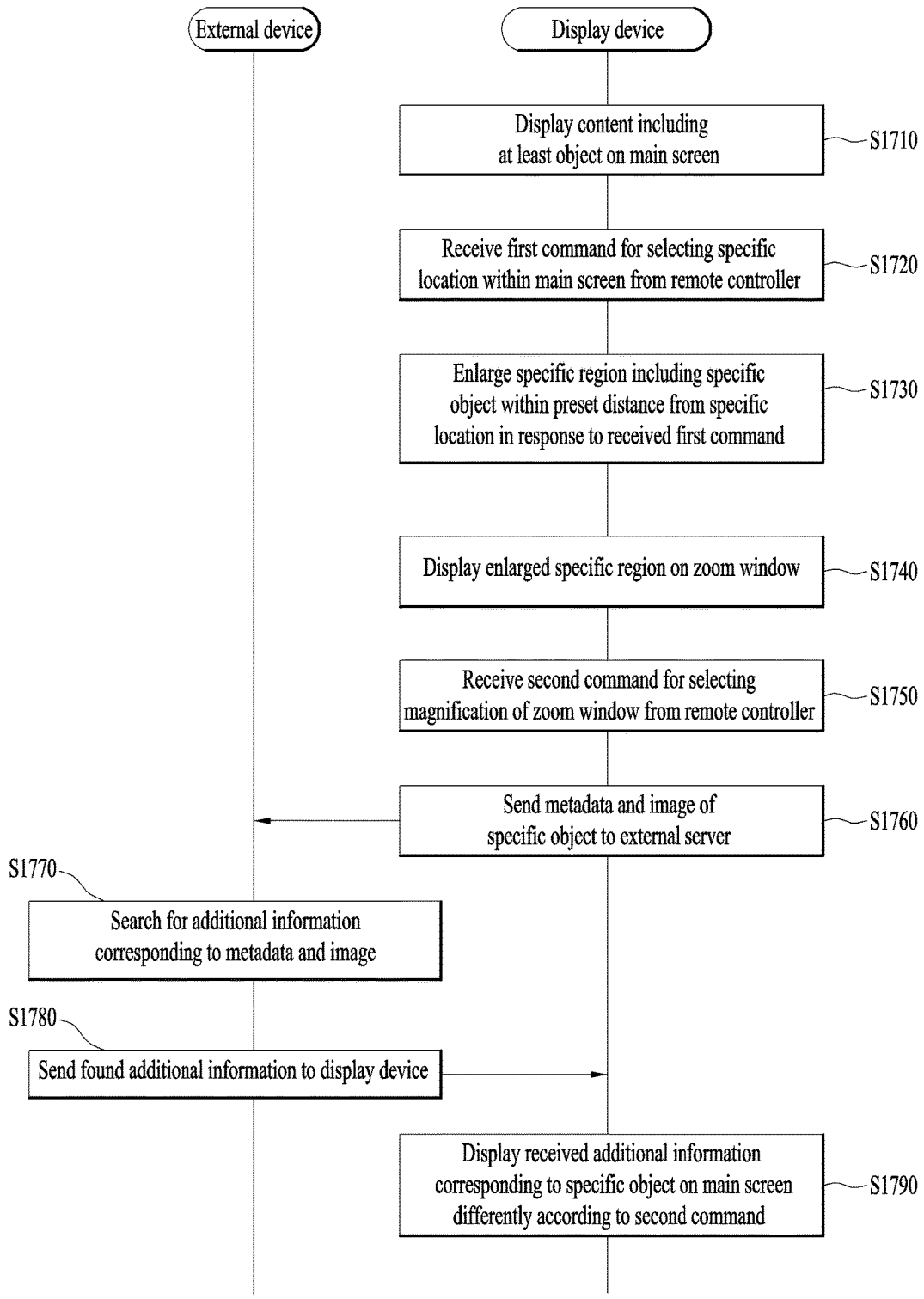
FIG. 17 is a flowchart of a display device controlling method according to one embodiment of the present invention.

FIG. 17 is a flowchart of a display device controlling method according to one embodiment of the present invention. The present invention is performed by the controller 1520.

Referring to FIG. 17, a content including at least object is displayed on a main screen of a display device [S1710].

A first command for selecting a specific location within the main screen is received from a remote controller [S1720].

In response to the received first command, a specific region including a specific object within a preset distance from the specific location is enlarged [S1730].

The enlarged specific region is displayed on a zoom window [S1740].

A second command for selecting a magnification of the zoom window is received from the remote controller [S1750].

At least one of a metadata and an image of the specific object is sent to an external server [S1760].

The external server searches for additional information corresponding to at least one of the metadata and the image [S1770].

The external server sends the found additional information to the display device [S1780].

Additional information corresponding to the specific object is displayed on the main screen differently according to the received second command [S1790].

Figure 18:
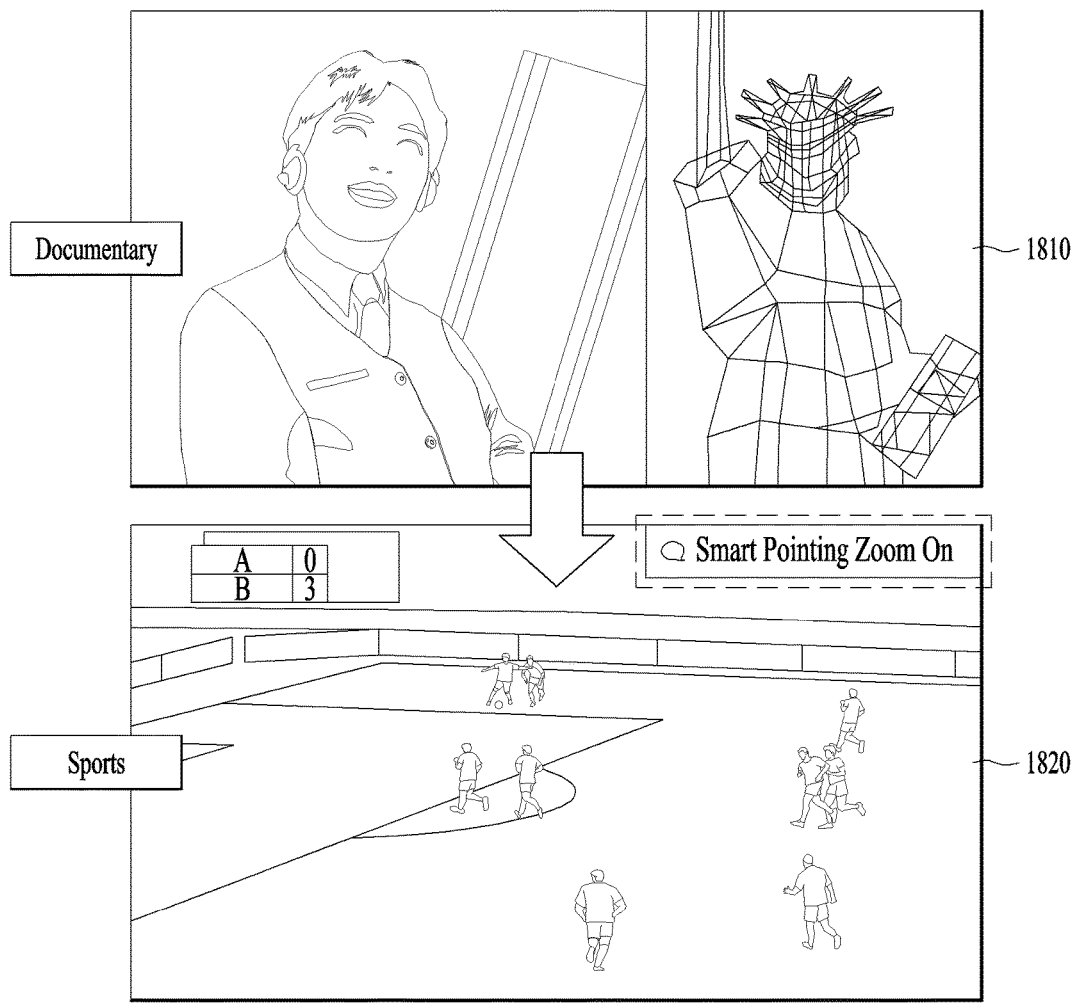
FIG. 18 is a diagram showing that a specific region enlargement mode is automatically executed in association with EPG information according to one embodiment of the present invention.

FIG. 18 is a diagram showing that a specific region enlargement mode is automatically executed in association with EPG information according to one embodiment of the present invention.

Referring to FIG. 18, the EPG signal processing module 1550 extracts category information (e.g., genre information, etc.) from a broadcast signal including an EPG signal and analyzes the extracted category. Here, the category corresponds to sports, news, documentary, move, drama, amusement, entertainment, talk show and the like for example.

If information included in the broadcast signal corresponds to a specific category such as sports or documentary like a main screen 1810, the controller 1520 automatically executes a specific region enlargement mode like a main screen 1820.

For example, if a currently outputted broadcast program (video data) corresponds to a category such as sports, news or the like, the controller 1520 automatically activates a specific region enlargement mode.

Moreover, if a currently outputted broadcast program (video data) is an adult video, a violence material, an adult action, or an X-rated content, the controller 1520 automatically switches the specific region enlargement mode to an off-state.

Therefore, according to one embodiment of the present invention, a specific region enlargement mode is designed to be automatically turned ON or OFF in accordance with category information (genre information) of video data, thereby having an advantage of minimizing a time required for specific region enlargement mode entry or reducing a room for misuse of the present invention.

Figure 19:
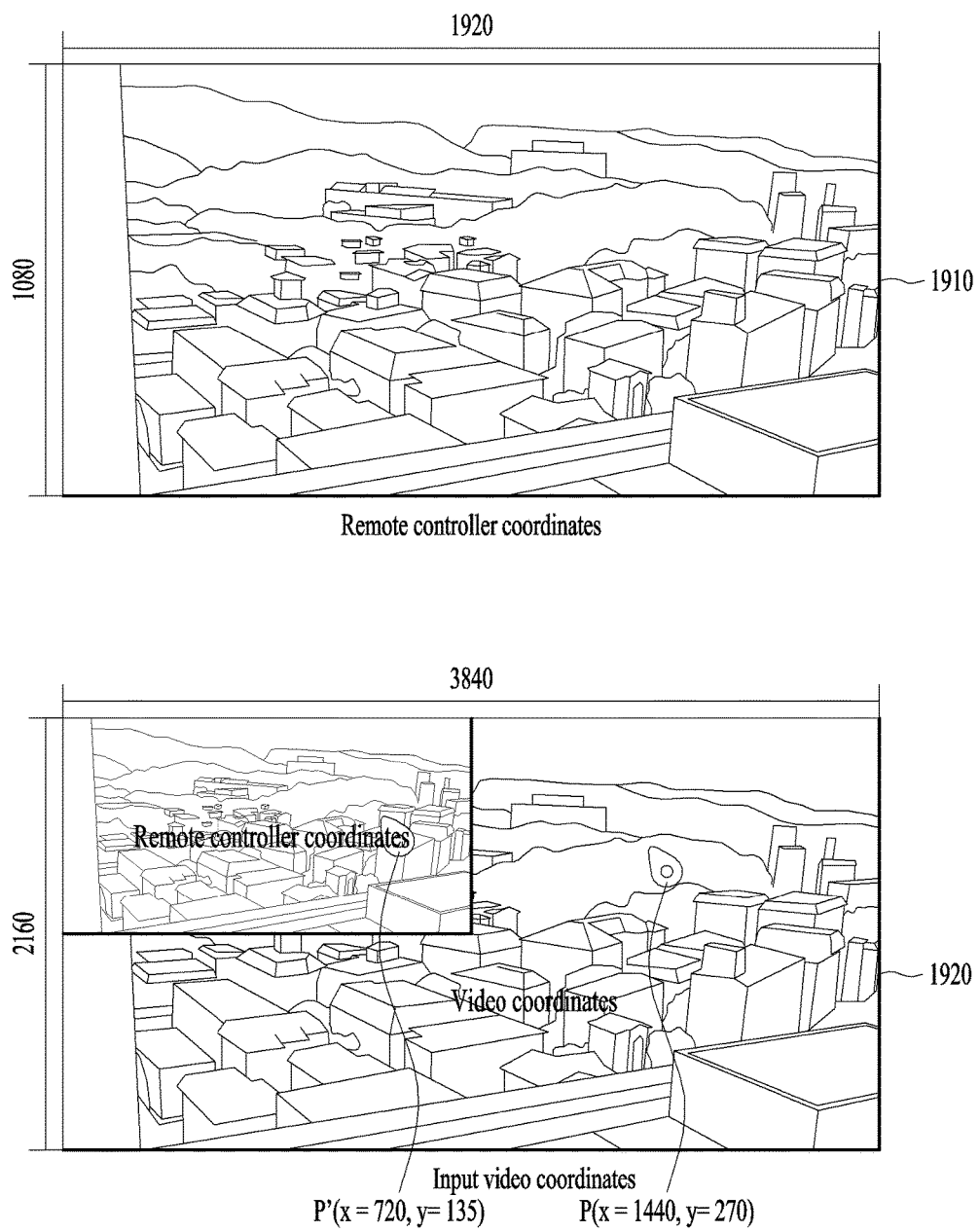
FIG. 19 is a diagram showing that if remote controller coordinates fail to match input video coordinates, such a case is resolved according to one embodiment of the present invention.

FIG. 19 is a diagram showing that if remote controller coordinates fail to match input video coordinates, such a case is resolved according to one embodiment of the present invention.

In a process for implementing another embodiment of the present invention, the technical problems described in the following should be solved in FIG. 19 and FIG. 15 or below.

Like a remote controller coordinates drawing 1910, remote controller coordinates include 1920×1060 in a 2-dimensional (2D) plane.

Like a video signal coordinates drawing 1920, coordinates may include 3840×2160. Here, coordinates are not fixed but can be changed depending on resolution of an input video signal or a device. A numeral of the coordinates is not an absolute value but can be changed into a relative value. Resolution indicates how many pixels are included in a single screen and is expressed in form of 'horizontal pixel number×vertical pixel number'. Namely, if resolution is 1920×1080, it means that the horizontal pixel number and the vertical pixel number are 1920 and 1080, respectively, which is represented as 2D plane coordinates.

For example, since the remote controller coordinates mismatch the video signal coordinates, although a user selects a point P (x=1440, y=270) from a currently display screen using a remote controller, the controller 1520 recognizes that a point P' (x=720, y=135) is selected.

Hence, there is a difference between the user-intended coordinates and the coordinates recognized by the controller 1520.

Here, when sending data to a display device, an external remote controller sends data including coordinates information of the remote controller. The external remote controller and the display device are connected to each other by wireless communication that includes RF communication and IT communication. Moreover, the external remote controller may become a mobile device such as a smartphone or a tablet PC.

The controller 1520 sales the coordinates information of the external remote controller according to video signal information of a content.

Particularly, if the video signal information of the content is changed, the controller 1520 senses the changed video signal information and then scales the plane coordinates of the externa remote controller, which is received from the external remote controller, based on the sensed video signal information.

For example, if the remote controller coordinates are 1920×1080 and the video signal resolution information of the content is 720P HD of 1280×720, the controller 1520 scales and changes the received remote controller coordinates into 1280×720 with reference to the video signal information. If resolution is HD, a scaling factor becomes 0.66.

If video signal resolution information of the content is FHD of 1920×1080, the controller 1520 scales the coordinates with reference to the video signal information. If resolution is FHD, since the remote controller coordinates and the video signal information coordinates are equal to each other, a scaling factor becomes 1.

If the video signal resolution information of the content is UHD of 3840×2160, the controller 1520 scales and changes the received remote controller coordinates into 3840×2160 with reference to the video signal information. If resolution is UHD, a scaling factor becomes 2.

Figure 20:
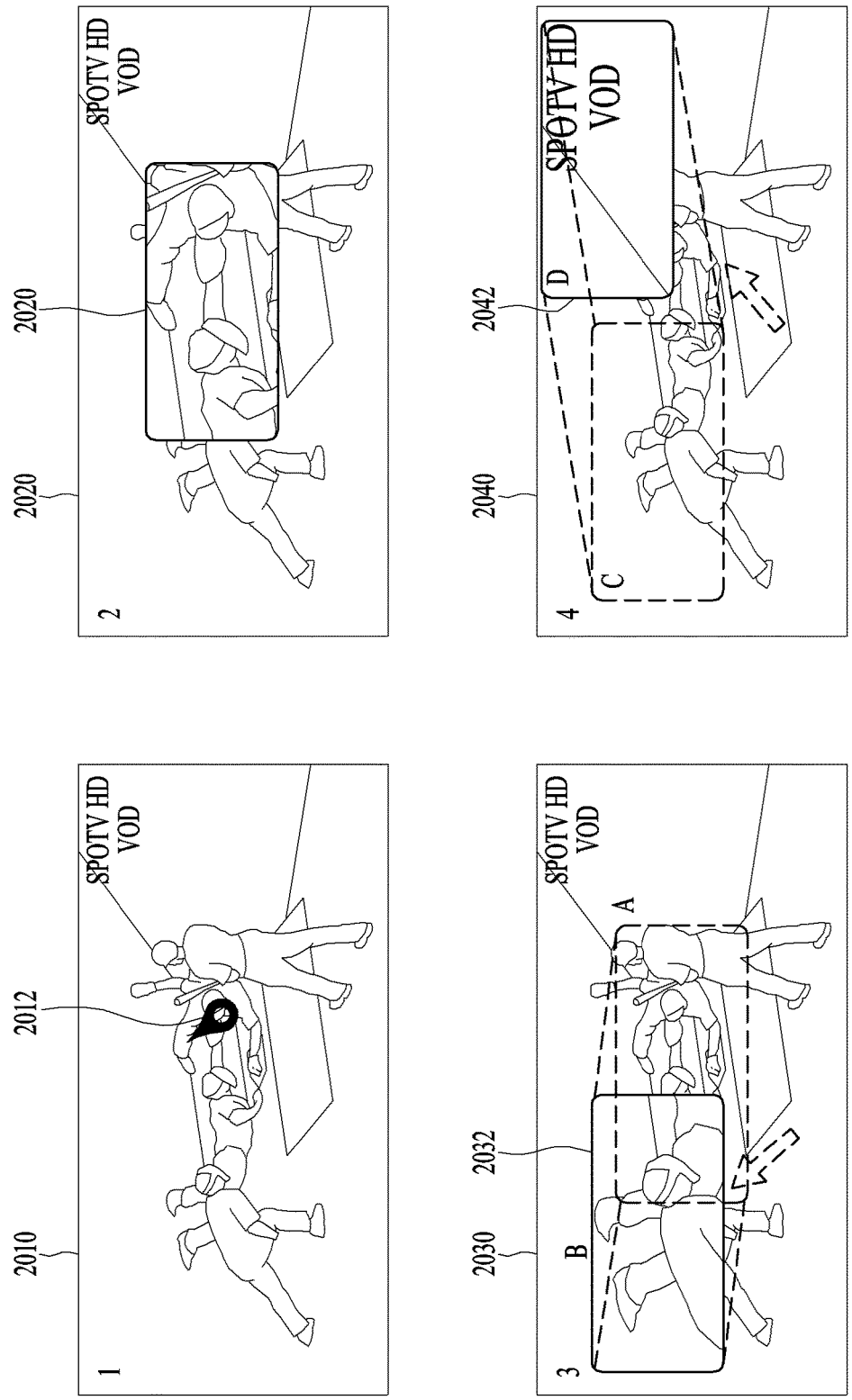
FIG. 20 is a diagram showing that a zoom window moves by real time in response to a movement of a pointer in hover mode according to one embodiment of the present invention.

FIG. 20 is a diagram showing that a zoom window moves by real time in response to a movement of a pointer in hover mode according to one embodiment of the present invention.

Implementation modes of the present invention include a hover mode, a pointing mode, and a locking mode.

In hover mode, a zoom window moves on a main screen like a helicopter. And, the hover mode is a mode for displaying an enlarged specific region on the zoom window.

In pointing mode, if a specific region of a main screen is specified with a pointer, an enlarged specific region is displayed on a zoom window. If the specific region is moved in response to a movement of the pointer, the moved specific region is enlarged and displayed on the zoom window.

In locking mode, a specific region of a main screen is specified with a pointer, an enlarged specific region is displayed on a zoom window, and the specific region is not moved in response to a movement of the pointer.

In hover mode, if a specific region is specified with a pointer 2012 like a main screen 2010, the controller 1520 displays an enlarged specific region on a zoom window like a main screen 2020.

If a zoom window 2032 is moved to a point B from a point A like a main screen 2030, the controller 1520 displays an enlarged specific region corresponding to the point B on the zoom window 2032.

If a zoom window 2042 is moved to a point D from a point C like a main screen 2040, the controller 1520 displays an enlarged specific region corresponding to the point D on the zoom window 2042. In doing so, the controller 1520 controls the pointer 2012 to disappear after a prescribed time since the appearance of the zoom window. If the pointer continues to appear, it may interrupt a user in watching the zoom window. Thus, the pointer is made to disappear in order to improve user convenience.

The controller 1520 specifies a specific region centering on a location of a pointer, enlarges the specific region centering on the location of the pointer, and displays the enlarged specific region on a zoom window. Thereafter, if receiving a specific signal from a remote controller, the controller 1520 controls the zoom window to be moved by real time in accordance with a movement of the pointer.

If receiving a specific signal from the remote controller, the controller 1520 enters a specific region enlargement mode for executing a magnifier function.

Figure 21:
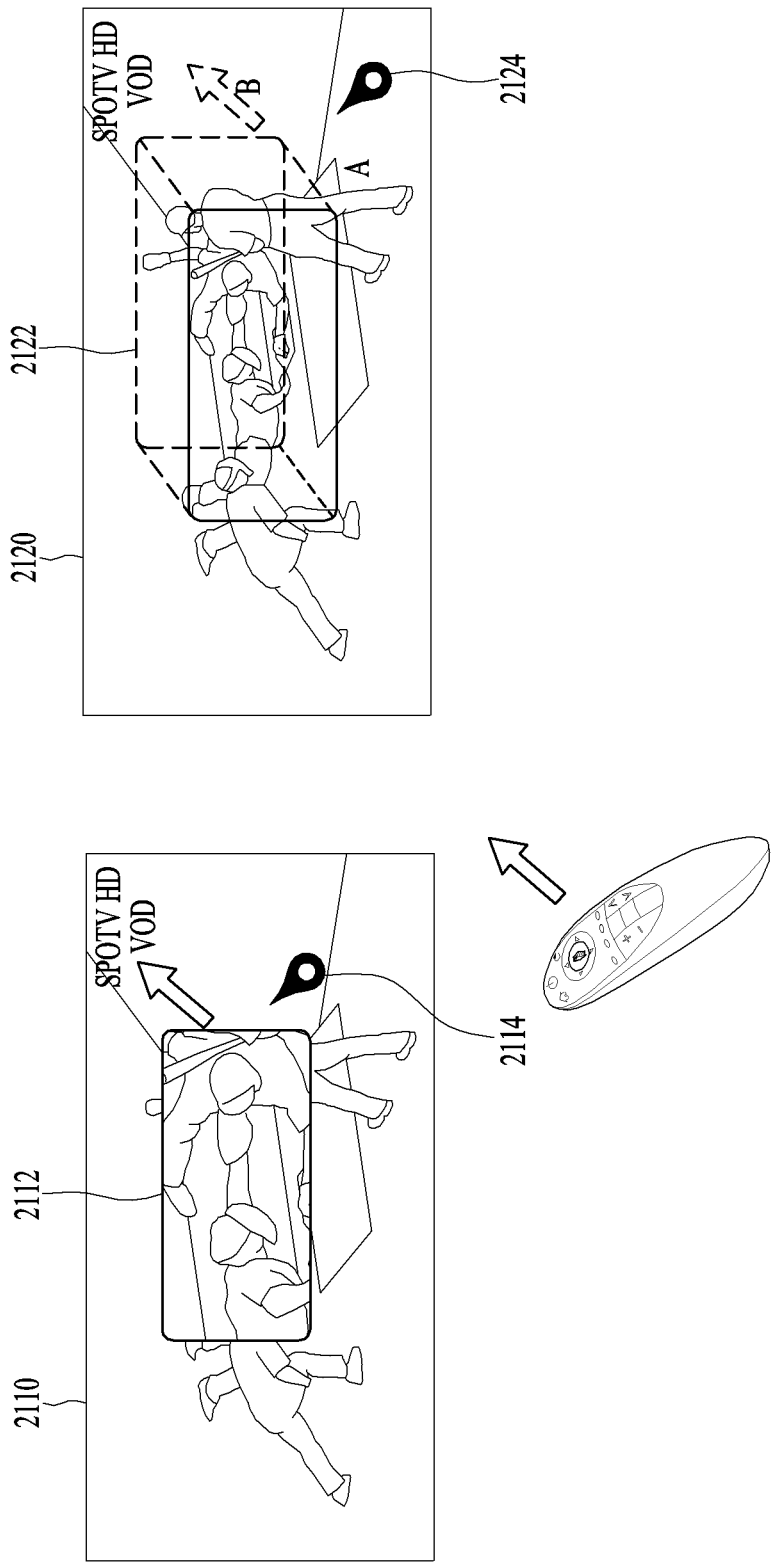
FIG. 21 is a diagram showing that an original video within a zoom window is displayed, when a pointer is moved in hover mode, according to one embodiment of the present invention.

FIG. 21 is a diagram showing that an original video within a zoom window is displayed, when a pointer is moved in hover mode, according to one embodiment of the present invention.

The controller 1520 controls a zoom window to move by real time in accordance with a movement of a pointer and switches a state of the pointer to a hidden state to improve visibility.

Like a main screen 2110, the controller 1520 displays an enlarged specific region on a zoom window 2112 in a state that a pointer 2114 is stopped.

Like a main screen 2120, if a pointer 2124 is moved to a point B from a point A, the controller 1520 displays an original video, in which a specific region corresponding to the moved pointer is not enlarged, on a zoom window 2122.

According to a related art, due to a frame delay between an original video frame and an enlarged video frame, there is an effect that an enlarged video boundary part trembles. Yet, according to the present invention, since an original video failing to enlarge a specific region is displayed on a zoom window, it is able to prevent the effect that the enlarged video boundary part trembles.

Figure 22:
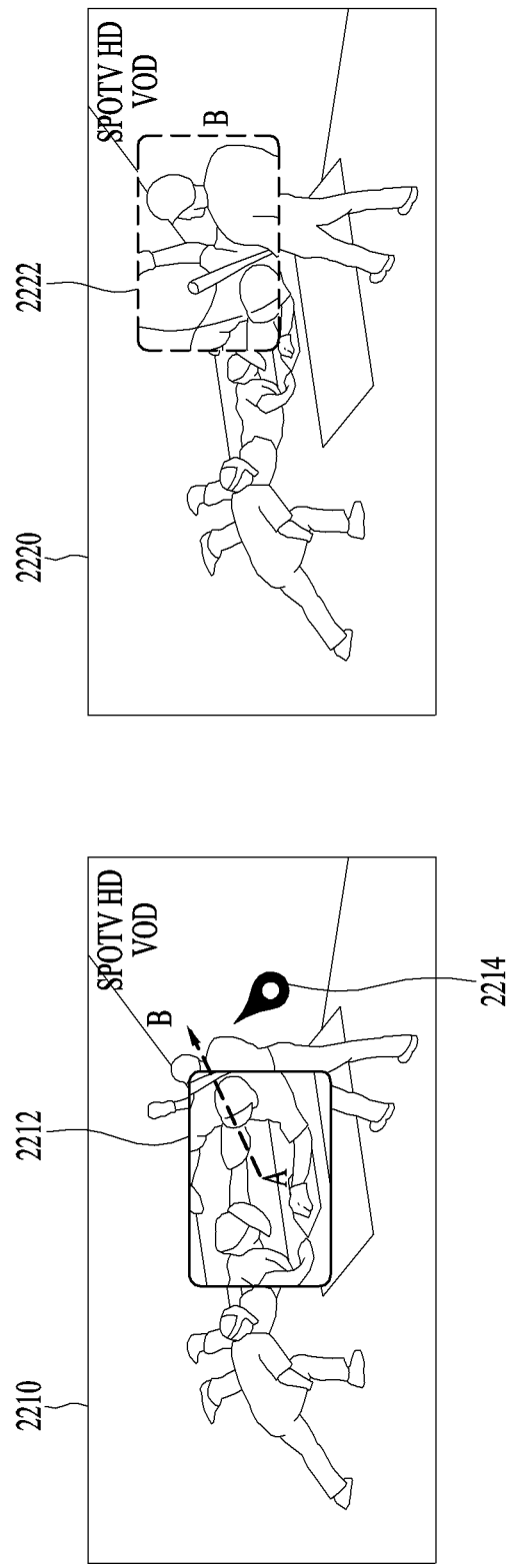
FIG. 22 is a diagram showing that a specific region within a zoom window is enlarged and displayed in a manner of moving the zoom window to a region, to which the zoom window is desired to be fixed in locking mode, according to one embodiment of the present invention.

FIG. 22 is a diagram showing that a specific region within a zoom window is enlarged and displayed in a manner of moving the zoom window to a region, to which the zoom window is desired to be fixed in locking mode, according to one embodiment of the present invention.

Like a main screen 2210, the controller 1520 moves a zoom window 2212 from a point A to a point B a user desires to fix with a pointer 2214.

Like a main screen 2220, if receiving a specific signal corresponding to a specific input such as a confirm key from a remote controller, the controller 1520 fixes a zoom window 2222 to the point B that is a current location.

Figure 23:
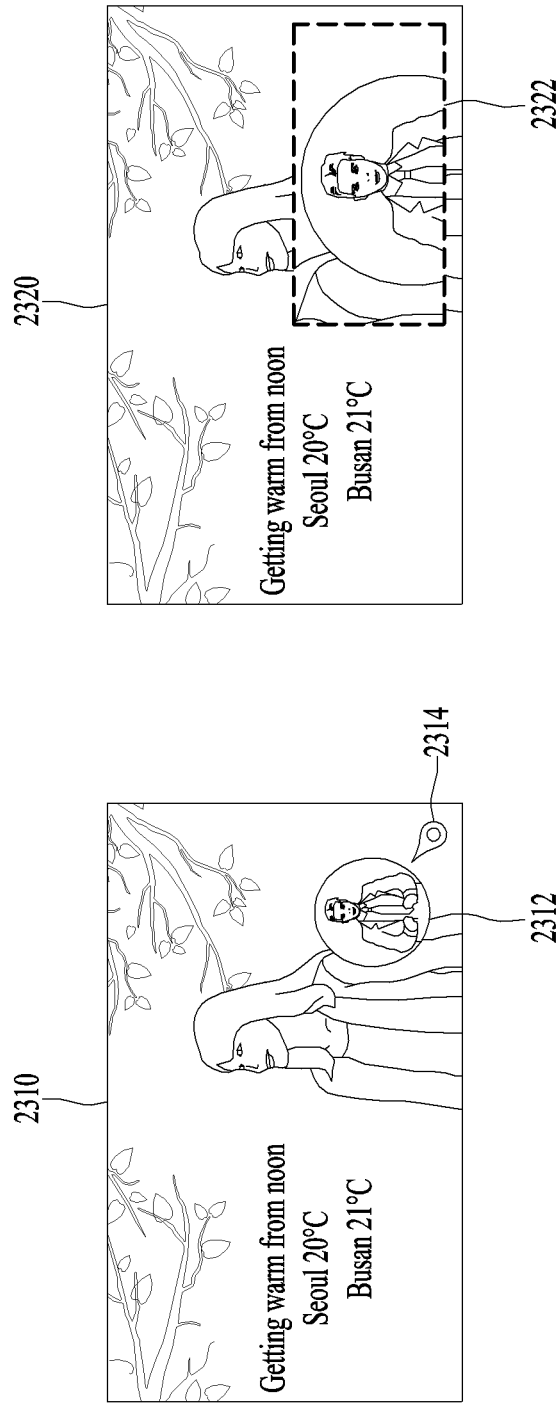
FIG. 23 is a diagram showing that a specific region within a zoom window is enlarged and displayed in a manner of fixing the zoom window in locking mode according to one embodiment of the present invention.

FIG. 23 is a diagram showing that a specific region within a zoom window is enlarged and displayed in a manner of fixing the zoom window in locking mode according to one embodiment of the present invention.

The controller 1520 specifies a specific region 2312 with a pointer 2314. If receiving a specific signal from a remote controller, the controller 1520 fixes the specific region 2312 and a zoom window 2322 moves in accordance with a movement of the pointer 2314. If receiving a specific signal from the remote controller, the controller 1520 fixes a zoom window 2322.

Like a main screen 2310, if receiving a specific signal from the remote controller in locking mode, the controller 1520 fixes the specific region 2312.

Like a main screen 2320, the controller 1520 displays an enlarged specific region on the zoom window 2322. In doing so, since it is the locking mode, the zoom window 2322 does not move in accordance with the movement of the pointer 2314.

According to the present invention, in locking mode, a content is a weather forecast and sign language is displayed on a specific region. If a size of the specific region is not enough for a user to watch, the sign language displayed specific region is enlarged and the enlarged specific region is displayed on a zoom window. As the zoom window is fixed, since the zoom window does not move in accordance with a movement of a pointer, a user can stably display the zoom window. Therefore, user convenience is improved.

Figure 24:
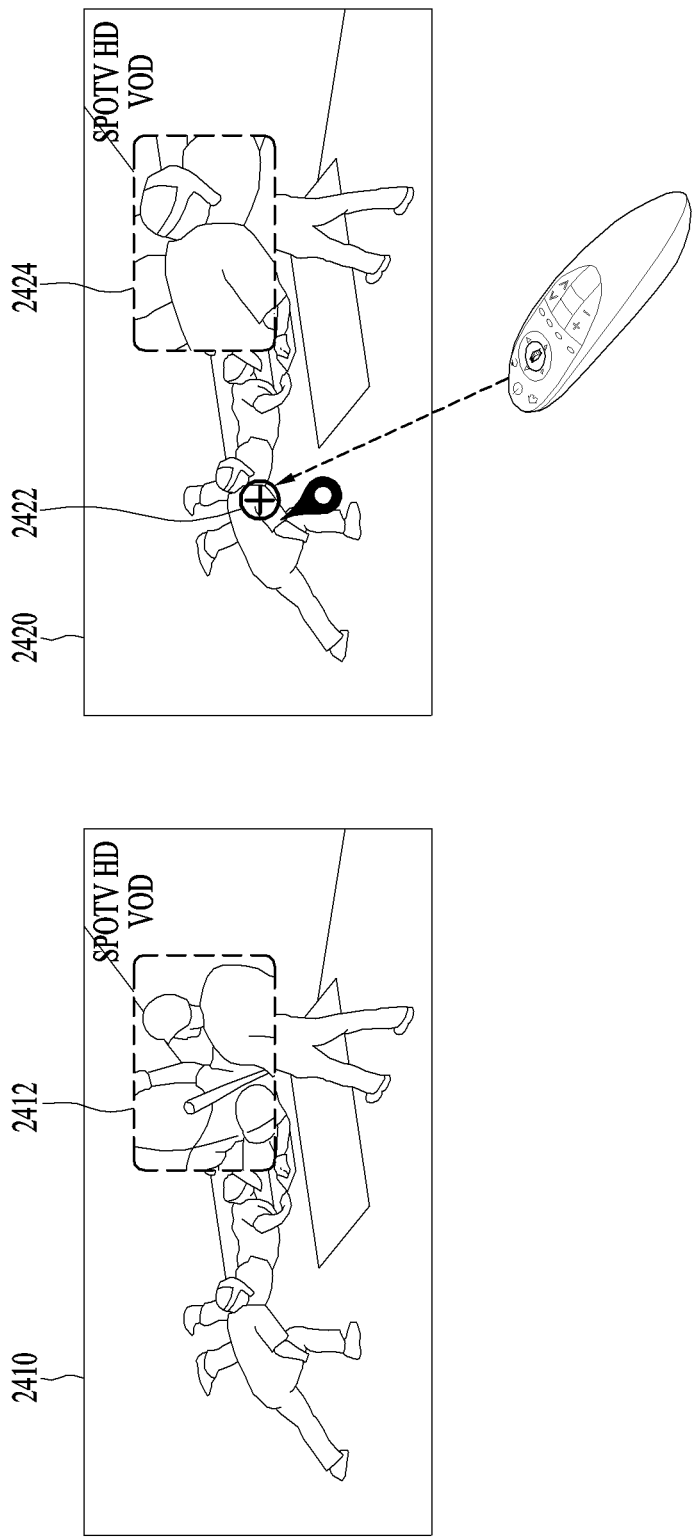
FIG. 24 is a diagram showing that a video of a specific region indicated by a pointer in pointing mode is enlarged and displayed on a zoom window according to one embodiment of the present invention.

FIG. 24 is a diagram showing that a video of a specific region indicated by a pointer in pointing mode is enlarged and displayed on a zoom window according to one embodiment of the present invention.

In pointing mode, the controller 1520 enlarges a specific region specified with a pointer and displays the enlarged specific region on a zoom window 2412. In doing so, the specific region 2422 moves in accordance with a movement of the pointer 2422.

Like a main screen 2410, the controller 1520 enlarges the specific region specified with the pointer and displays the enlarged specific region on the zoom window 2412.

Like a main screen 2420, if a specific region moves in accordance with a movement of the pointer 2422, the controller 1520 enlarges the specific region 2422 and displays the enlarged specific region on a zoom window 2424.

If receiving a specific input such as a confirm key input from a remote controller, the controller 1520 controls the pointer 2422 corresponding to the specific input to be displayed on the main screen by being activated from a hidden state.

FIG. 25 is a diagram showing that a shape of a zoom window is changed according to one embodiment of the present invention.

Like a main screen 2510, if receiving a specific input from a remote controller, the controller 1520 can change a shape of a zoom window.

For example, the controller 1520 can change the shape of the zoom window into square, rectangle, circle, ellipse, vertical bar, horizontal bar, or the like.

Moreover, the controller 1520 can freely change the shape of the zoom window according to user settings. If receiving an input of toggling a specific button from the remote controller, the controller 1520 can change the shape of the zoom window.

Figure 26:
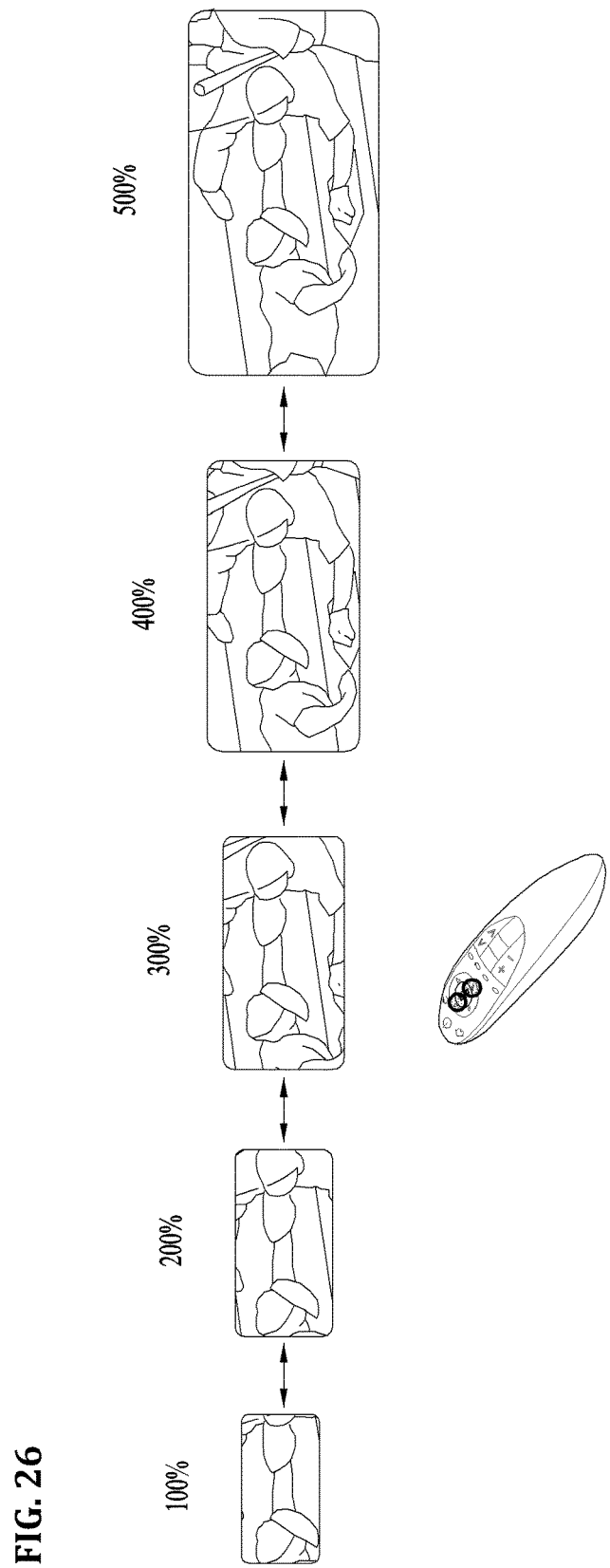
FIG. 26 is a diagram showing that a size of a zoom window is changed according to one embodiment of the present invention.

FIG. 26 is a diagram showing that a size of a zoom window is changed according to one embodiment of the present invention.

Referring to FIG. 26, if receiving a specific input such as a top-bottom 4-direction key input or a wheel mouse input from a remote controller, the controller 1520 can change a size of a zoom window.

For example, if receiving a specific input from the remote controller in a state that the zoom window is at 100%, the controller 1520 can change a size of the zoom window into 200%, 300%, 400% or 500%.

If the size of the zoom window is 100%, a face of a player is displayed on the zoom window. Yet, if the size of the zoom window is 500%, a plurality of players are displayed on the zoom window.

Here, a size magnification of the zoom window can be freely set by user settings and may be adjusted into one of 150%, 200%, 250%, and the like.

Figure 27:
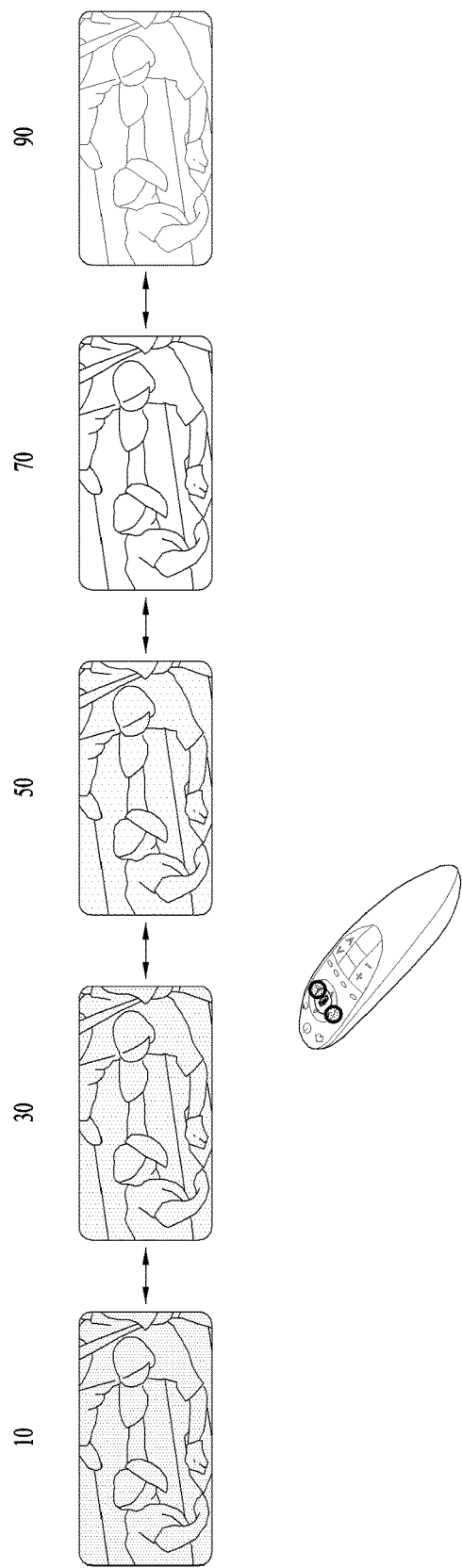
FIG. 27 is a diagram showing that an image quality setting of a zoom window video is changed according to one embodiment of the present invention.

FIG. 27 is a diagram showing that an image quality setting of a zoom window video is changed according to one embodiment of the present invention.

Referring to FIG. 27, if receiving a specific input from a remote controller, the controller 1520 can adjust video brightness of a zoom window.

Brightness ranges 0 to 100, and brightness adjustment can be freely changed by user settings. The specific input may include a right-left 4-directional key or wheel mouse input of the remote controller.

For example, if receiving a specific input from the remote controller, the controller 1520 can adjust the video brightness of the zoom window from 10 to 90.

Besides, contrast, sharpness, color, and resolution can be adjusted.

If an original screen is dark due to the video brightness of 10, the controller 1520 corrects the video brightness of a specific region into 'brighter' and displays an enlarged specific region on the zoom window.

When the brightness of the specific region is corrected, the controller 1520 may correct the brightness of the specific region into 'optimal brightness' in consideration of an object, a background screen and the like displayed on a main screen.

Moreover, when resolution of a specific region is corrected, the controller 1520 may correct the resolution of the specific region into 'optimal resolution' in consideration of property of a content, an object displayed on the main screen, a background screen, a power state of the display device, a user's use pattern and the like.

Figure 28:
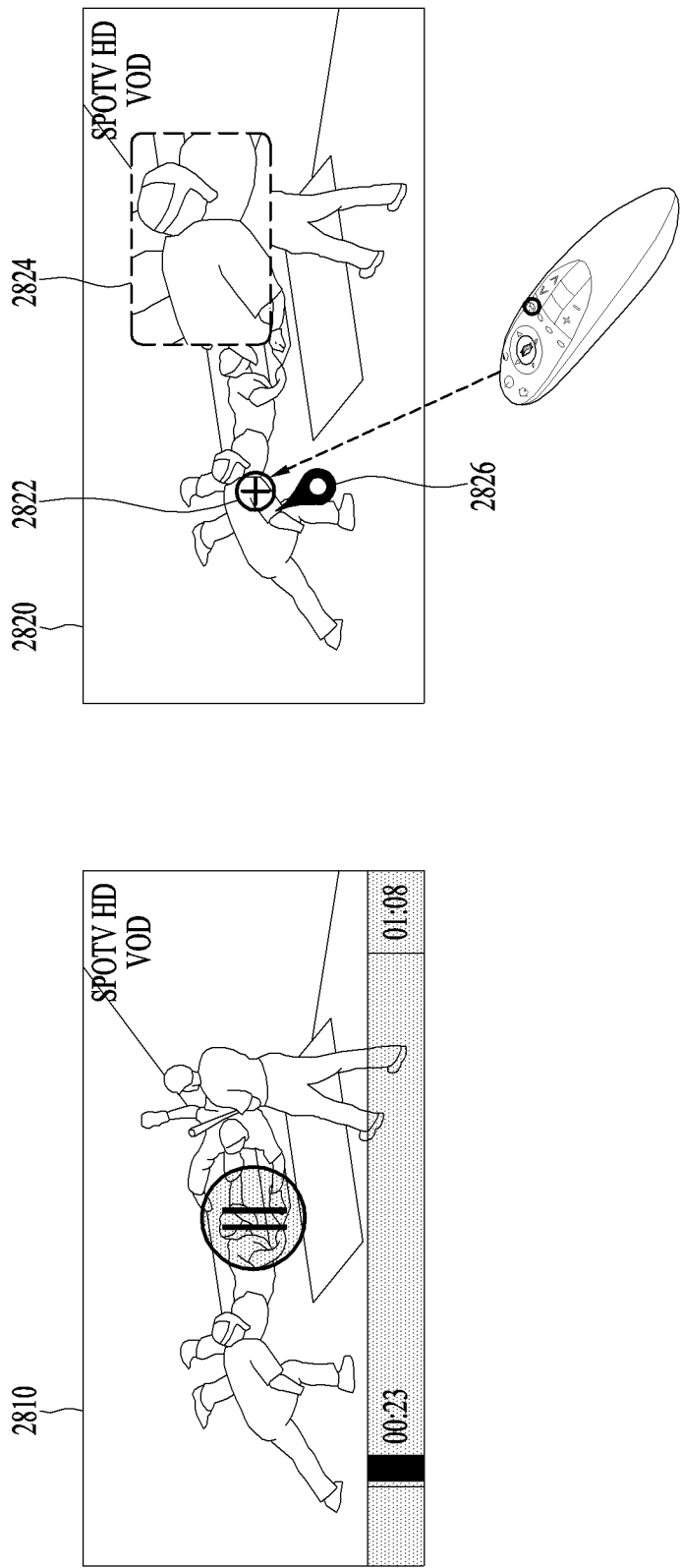
FIG. 28 is a diagram showing that a video is played from a stop timing point in association with a time shift function according to one embodiment of the present invention.

FIG. 28 is a diagram showing that a video is played from a stop timing point in association with a time shift function according to one embodiment of the present invention.

Like a main screen 2810, if receiving a first signal such as a pause signal from a remote controller, the controller 1520 stops playing a content on the main screen.

The controller 1520 saves the content to the memory 1540 for a prescribed time from a stop timing. Namely, although a still picture is displayed on the main screen, since a time shift function is enabled, the controller 1520 consecutively save the content to the memory 1540.

Like a main screen 2820, the controller 1520 stops a live video, enlarges a specific region 2822 specified with a pointer 2826, and displays the enlarged specific region on a zoom window 2824.

If receiving a second signal such as a play signal different from the first signal from the remote controller after expiration of a prescribed time, the controller 1520 displays the content on the main screen from the stop timing of the content saved to the memory 1540.

According to the present invention, since a video can be played again from a video stopped timing, a user can watch a content without missing parts, whereby user convenience is improved.

FIG. 29 is a diagram showing that a video within a zoom window is captured and saved to a memory according to one embodiment of the present invention.

Like a main screen 2910, if receiving a specific input from a remote controller, the controller 1520 stops a content video displayed on the main screen and specifies a specific object in response to a reception of an input of selecting a specific object 2912 such as a bag with a pointer 2914 from a remote controller.

Like a main screen 2920, the controller 1520 enlarges the specific object such as a bag, displays the enlarged specific object on a zoom window 2922, and captures the displayed zoom window 2922.

Like a main screen 2930, the controller 1520 saves an image within the captured zoom window to the memory 1540.

According to one embodiment of the present invention, in a state that a content moving image is displayed on a main screen, the controller 1520 can specify the specific object 2912 with the pointer 2914, capture the displayed zoom window 2922 at a specific timing, and save an image within the captured zoom window to the memory 1540.

Figure 30:
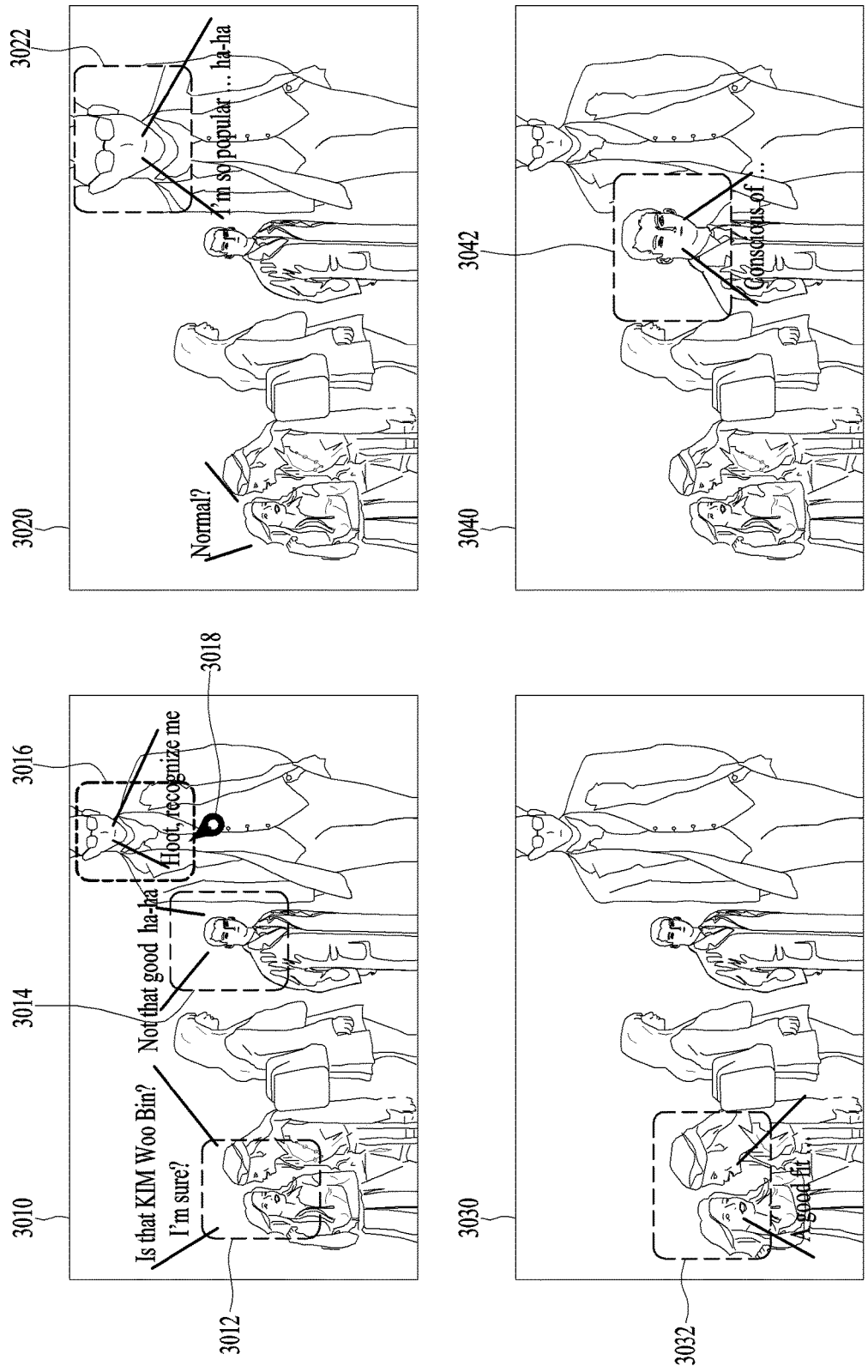
FIG. 30 is a diagram showing that a specific object is enlarged and displayed on a zoom window as soon as a volume of an audio signal from the specific object is turned up and outputted according to one embodiment of the present invention.

FIG. 30 is a diagram showing that a specific object is enlarged and displayed on a zoom window as soon as a volume of an audio signal from the specific object is turned up and outputted according to one embodiment of the present invention.

Like a main screen 3010, a plurality of objects such as an object A 3012, an object B 3014, an object C 3016 and the like exist within the main screen.

If a specific object such as the object C 3016 among a plurality of the objects is specified with a pointer 3018, the controller 1520 senses a variation of the specific object displayed on the main screen and a variation of an object different from the specific object.

Here, if the specific object and the object different from the specific object are persons, the controller 1520 senses the variation of the object based on a mouth shape change.

For example, the controller 1520 specifies the object C 3016 as a specific object and then senses a variation of an object based on a mouth shape of the object C and mouth shape changes of the object A and the object B.

In case that an object is an animal, the controller 1520 senses a variation of an object based on a mouth shape change.

Like a main screen 3020, if a variation of the specific object has the greatest value among the sensed object variations, the volume of an audio signal corresponding to the specific object is turned up, a specific region including the specific object is enlarged, and the enlarged specific region is displayed on a zoom window 3022.

A mouth shape change rate is expressed as a numerical value by normalizing a mouth shape change extent between a previous frame and a current frame. A mouth shape change rate has a value ranging from 0 to 100. If the mouth shape change rate is 0, it indicates that a mouth shape is not changed. If the mouth shape change rate is 100, it indicates that a mouth shape is changed to the maximum from a closed mouth state to an open mouth state.

For example, if mouth shape variations of the objects A to C 3012, 3014 and 3016 are 10, 20 and 70, respectively, since the mouth shape variation of the object C 3016 has the greatest value, the controller 1520 turns up the volume of an audio signal such as 'I'm so popular . . . ha-ha' corresponding to the object C, enlarges a specific region including the object C, and displays the enlarged specific region on a zoom window 3022.

Like a main screen 3030, if mouth shape variations of the objects A to C 3012, 3014 and 3016 are 65, 20 and 15, respectively, since an object having the greatest mouth shape variation is the object A, the controller 1520 turns up the volume of an audio signal such as 'A good fit . . . ' corresponding to the object A, enlarges a specific region including the object A, and displays the enlarged specific region on a zoom window 3032.

Like a main screen 3040, if mouth shape variations of the objects A to C 3012, 3014 and 3016 are 10, 75 and 10, respectively, since an object having the greatest mouth shape variation is the object B, the controller 1520 turns up the volume of an audio signal such as 'Conscious of . . . ' corresponding to the object B, enlarges a specific region including the object B, and displays the enlarged specific region on a zoom window 3042.

According to the present invention, the volume of an audio signal outputted from a specific object is turned up based on a mouth shape change of the specific object specified by a user and a specific region including the specific object is enlarged and displayed on a zoom window as well, whereby an audio signal volume and an object size of a user-interested object can be increased. Therefore, user convenience can be improved.

Figure 31:
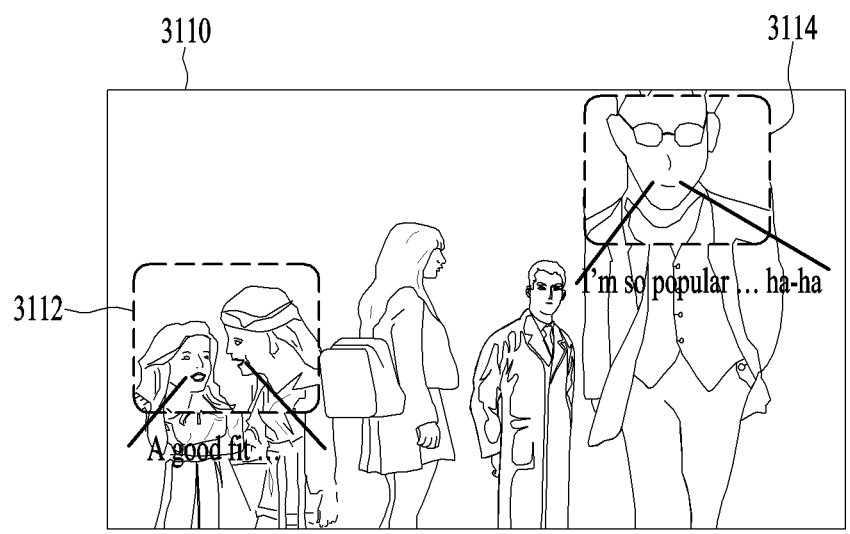
FIG. 31 is a diagram showing that when two of a plurality of persons are talking, sizes of voices of the two talking persons are enlarged and outputted as soon as a specific region containing the two persons is enlarged and displayed on a zoom window, according to one embodiment of the present invention.

FIG. 31 is a diagram showing that when two of a plurality of persons are talking, sizes of voices of the two talking persons are enlarged and outputted as soon as a specific region containing the two persons is enlarged and displayed on a zoom window, according to one embodiment of the present invention.

Like a main screen 3110, the controller senses a mouth shape change of an object by sensing a plurality of objects individually. If a mouth shape change rate of a specific object is equal to or greater than a threshold, the controller 1520 enlarges and outputs an audio signal corresponding to the specific object and also enlarges a specific region including the specific object. The controller 1520 then displays the enlarged specific region on a zoom window.

For example, if two of a plurality of persons are speaking, the controller 1520 senses mouth shape changes of the two speaking persons. If the mouth shape change rate of the two persons is equal to or greater than a threshold 50, the controller 1520 turns up and outputs 'A good fit . . . ' that is an audio signal corresponding to first person 3112 and 'I'm so popular . . . ha-ha' that is an audio signal corresponding to a second person 3114, enlarges a specific region including the first person and a specific region including the second person simultaneously, displays the enlarged first specific region on a zoom window, and displays the enlarged second specific region on a zoom window.

FIG. 32 is a diagram showing whether to enlarge a specific object in response to a mouth shape change rate according to one embodiment of the present invention.

Referring to FIG. 32, if a mouth shape change rate is smaller than a threshold, a specific object is not enlarged.

If a mouth shape change rate is greater than the threshold, the specific object is enlarged.

If a mouth shape change rate is 0, i.e., if a mouth shape in a previous frame is identical to a mouth shape in a current frame, the specific object is not enlarged.

FIG. 33 is a diagram showing that an information search function for a specific object within a zoom window is executed according to one embodiment of the present invention.

Like a main screen 3310, the controller 1520 specifies a specific region 3314 including a specific object such as a bird with a pointer 3312.

Here, if metadata for the specific object exists in the memory 1540, a shape of the pointer 3312 is changed into a magnifier 3316. If metadata for the specific object fails to exist in the memory 1540, a shape of the pointer 3312 is not changed into the magnifier 3316.

Namely, if the shape of the pointer 3312 is changed into the magnifier, additional information exists. If the shape of the pointer 3312 is not changed into the magnifier, additional information does not exist.

Like a main screen 3320, the controller 1520 displays an additional information 3322 corresponding to the specific object on the main screen, enlarges a specific region, and displays the enlarged specific region on a zoom window 3324.

For example, the controller 1520 displays 'as birds living in the equator . . . food includes fish and seaweed . . . ', which is additional information on a bird, on the main screen, enlarges a specific region including the bird, and displays the enlarged specific region on the zoom window 3324.

A process for searching an external server for additional information and displaying additional information received from the external server is described in detail as follows.

The controller 1520 sends metadata of a specific object to the external server through the interface module 1510.

The external server searches for additional information corresponding to metadata and an image. Here, the external server may include a search engine such as Google or Naver.

The controller 1520 receives the additional information corresponding to the metadata from the external server.

If the metadata of the specific object does not exist, the controller 1520 sends an image of the specific object to the external server through the interface module 1510 and receives the additional information corresponding to the image from the external server.

For example, if metadata of a specific object such as a bird does not exist, the controller 1520 sends an image of the bird to the external server, receives additional information corresponding to an image of the bird from the external server, and then displays it on the main screen.

Figure 34:
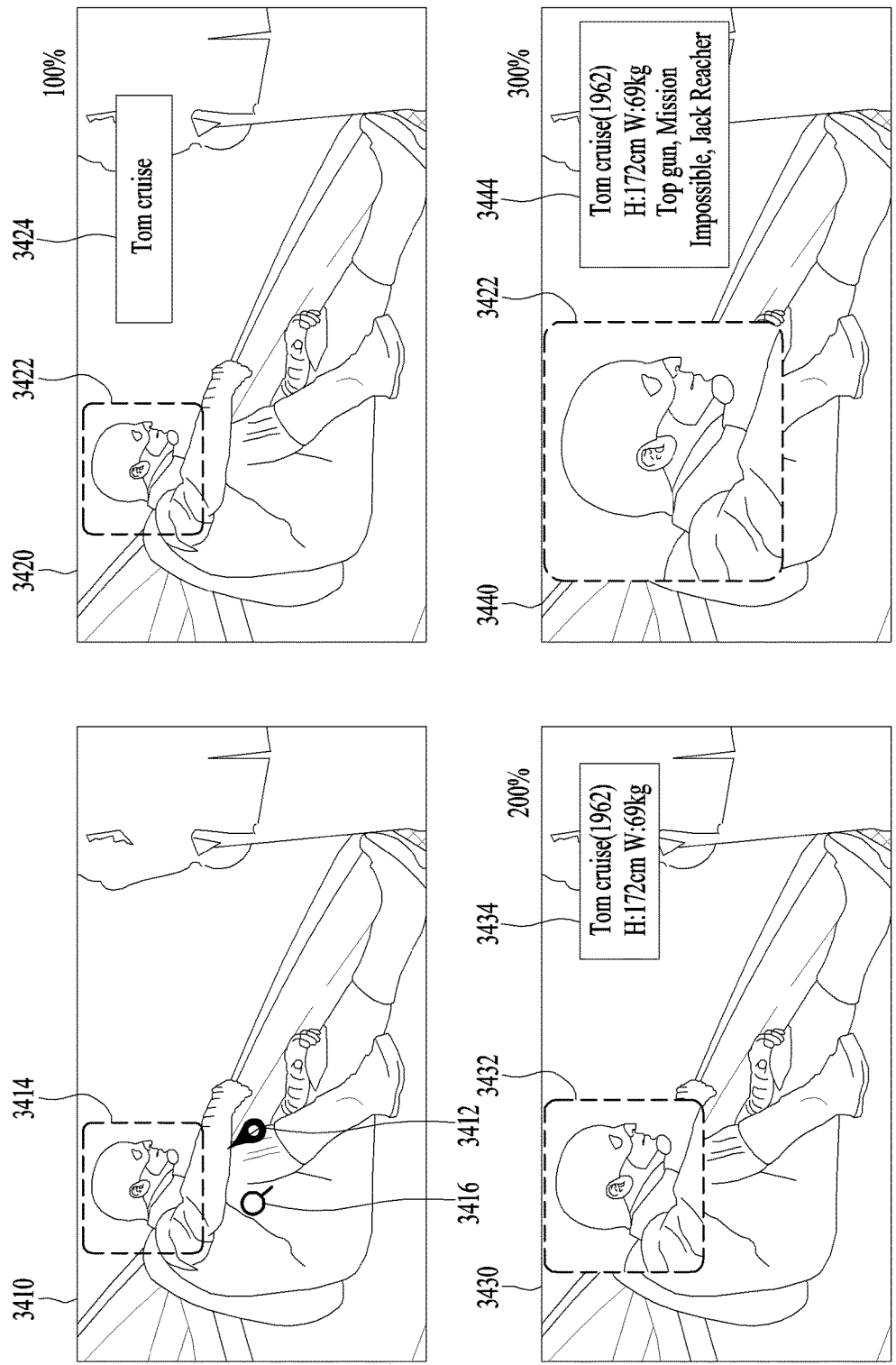
FIG. 34 is a diagram showing that if a specific object within a zoom window is a person, additional information corresponding to such a case is displayed differently depending on a magnification according to one embodiment of the present invention.

FIG. 34 is a diagram showing that if a specific object within a zoom window is a person, additional information corresponding to such a case is displayed differently depending on a magnification according to one embodiment of the present invention.

If receiving a second command for selecting a magnification of a zoom window from a remote controller, the controller 1520 displays additional information corresponding to a specific object on a main screen differently according to the received second command.

Here, a content corresponds to a moving image and a location of the zoom window varies according to a specific location. The magnification may vary into 100%, 200% or 300% according to settings and can be adjusted freely.

Like a main screen 3410, if a specific object is specified with a pointer 3312, the controller 1520 specifies a specific region including the specific object.

Here, when metadata data for the specific object exists in the memory 1540, if the pointer is located on the specific object, the controller 1520 changes a shape of the pointer 3412 into a magnifier 3416.

Like a main screen 3420, if receiving a command for a magnification 100% of the zoom window from the remote controller, the controller 1520 displays the additional information corresponding to the specific object on the main screen.

For example, if the specific object is the movie start 'Tom Cruise', the controller 1520 displays a name, which is the additional information corresponding to Tom Cruise, on the main screen.

Like a main screen 3430, when the magnification of the zoom window 3432 is 200%, the controller 1520 displays a name, date of birth, and physical size, which are the additional information corresponding to Tom Cruise, on the main screen.

Here, the additional information includes Tom Cruise, Jul. 3, 1962, height 172 cm, and weight 69 kg.

Like a main screen 3440, when the magnification of the zoom window 3442 is 300%, the controller 1520 displays a name, date of birth, physical size and representative works, which are the additional information corresponding to Tom Cruise, on the main screen.

Here, the additional information includes Tom Cruise, Jul. 3, 1962, height 172 cm, weight 69 kg, Top Gun, Mission Impossible, and Jack Reacher.

When a specific object is specified with a pointer, if all additional information corresponding to the specific object is displayed, additional information unnecessary for a user may be displayed. Hence, if the user is less interested in the specific object, a small amount of additional information is preferably displayed. If the user is more interested in the specific object, a considerable amount of additional information is preferably displayed.

According to the present invention, when a user specifies a specific object, if an enlargement ratio increases, user's interest in the specific object is big. And, the user's desire for further knowing about the specific object can be reflected. Thus, since additional information can be displayed by reflecting an extent of user's interest in the specific object in a manner of displaying additional information on the specific object differently according to a screen enlargement rate, user convenience is improved.

Figure 35:
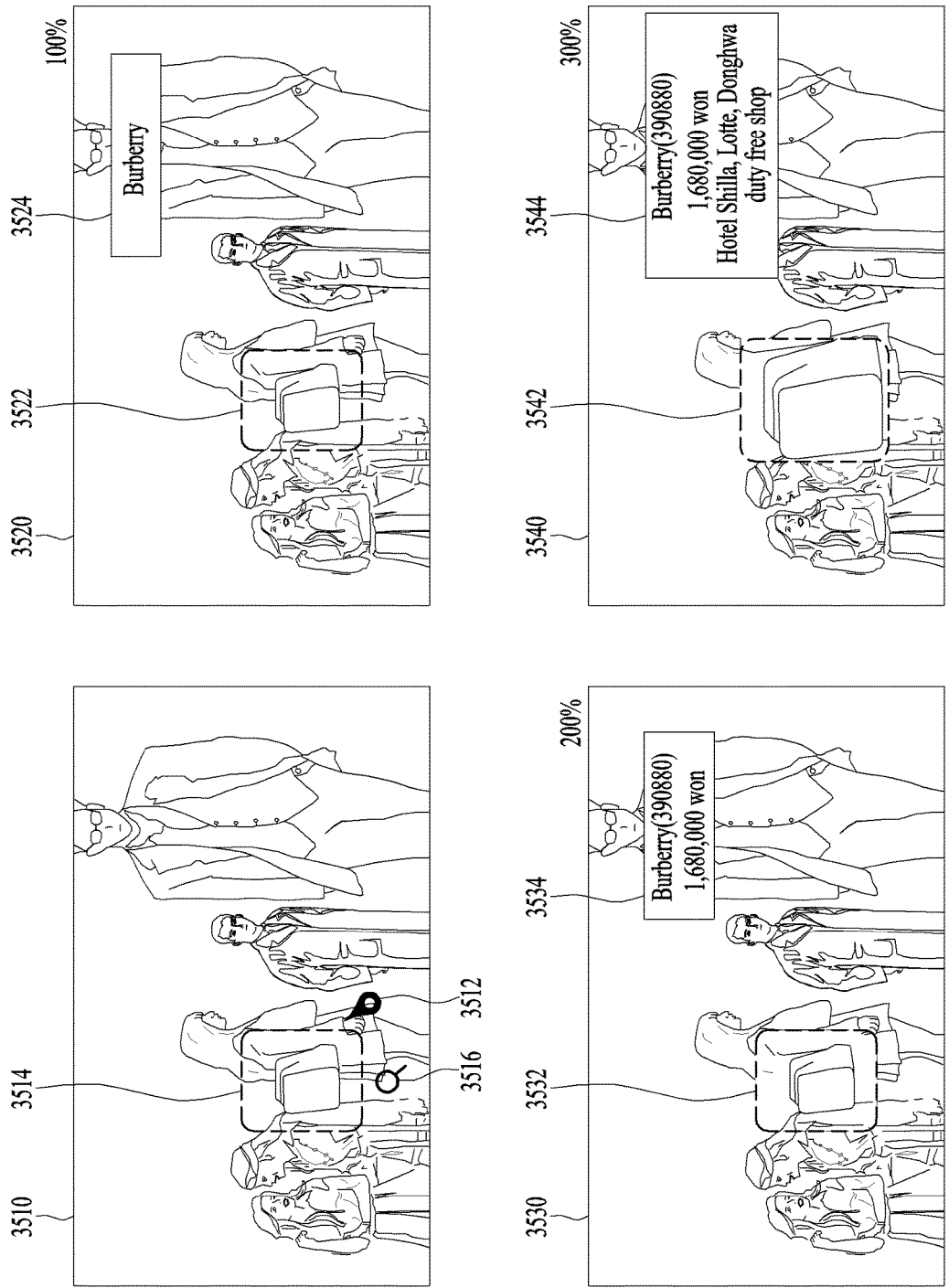
FIG. 35 is a diagram showing that if a specific object within a zoom window is a thing, additional information corresponding to such a case is displayed differently depending on a magnification according to one embodiment of the present invention.

FIG. 35 is a diagram showing that if a specific object within a zoom window is a thing, additional information corresponding to such a case is displayed differently depending on a magnification according to one embodiment of the present invention.

Like a main screen 3510, if a specific object is specified with a pointer 3512, the controller 1520 specifies a specific region including the specific object.

Here, when metadata data for the specific object exists in the memory 1540, if the pointer is located on the specific object, the controller 1520 changes a shape of the pointer 3512 into a magnifier 3516.

Like a main screen 3520, if receiving a command for a magnification 100% of the zoom window from the remote controller, the controller 1520 displays the additional information corresponding to the specific object on the main screen.

For example, if the specific object is a Burberry bag, the controller 1520 displays only a trademark, which is the additional information corresponding to Burberry bag, on the main screen.

Here, the additional information is Burberry.

Like a main screen 3530, when the magnification of the zoom window 3532 is 200%, the controller 1520 displays a trademark (product number) and price, which are the additional information corresponding to the bag, on the main screen.

Here, the additional information includes Burberry (390880) and 1,680,000 WON.

Like a main screen 3540, when the magnification of the zoom window 3542 is 300%, the controller 1520 displays a trademark (product number), price and sales place, which are the additional information corresponding to the bag, on the main screen.

Here, the additional information includes Burberry (390880), 1,680,000 WON, Hotel Shilla, Lotte, Donghwa duty free shop.

According to one embodiment of the present invention, if a plurality of specific objects exist within a zoom window, additional information is displayed per individual object [not shown].

For example, examined in the following is a case that a specific actor is holding a bag within a zoom window.

If receiving a command for a magnification 100% of a zoom window from a remote controller, the controller 1520 displays additional information corresponding to a plurality of objects within the zoom window on the main screen.

For example, if a first object is Tom Cruise and a second object is a Burberry bag, the controller 1520 displays a name that is additional information corresponding to Tom Cruise and a trademark that is additional information corresponding to the bag on the main screen only.

Here, the additional information corresponding to Tom Cruise is Tom Cruise and the additional information corresponding to the bag is Burberry.

In case of a magnification 200% of the zoom window, the controller 1520 displays a name, date of birth and physical size, which are the additional information corresponding to Tom Cruise, on the main screen and also displays a trademark (product number) and price, which are the additional information 3534 corresponding to the bag, on the main screen.

Here, the additional information corresponding to Tom Cruise includes Tom Cruise, Jul. 3, 1962, height 172 cm, and weight 69 kg. The additional information corresponding to the bag includes Burberry (390880) and 1,680,000 WON.

Like the diagram 3540, when the magnification of the zoom window 3542 is 300%, the controller 1520 displays a name, date of birth, and physical size, which are the additional information corresponding to Tom Cruise, on the main screen and also displays a trademark (product number), price and sales place, which are the additional information corresponding to the bag, on the main screen.

Here, the additional information corresponding to Tom Cruise includes Tom Cruise, Jul. 3, 1962, height 172 cm, weight 69 kg, Top Gun, Mission Impossible, and Jack Reacher. And, the additional information corresponding to the bag includes Burberry (390880), 1,680,000 WON, Hotel Shilla, Lotte, Donghwa duty free shop.

According to the present invention, in case that a plurality of objects exist within a zoom window, by displaying additional information per object on a screen, user's interest can be objectively reflected. Therefore, user convenience is improved.

FIG. 36 is a diagram showing that additional information corresponding to a type of a specific object within a zoom window is displayed differently depending on a magnification according to one embodiment of the present invention.

When an object type is a person, if a magnification is 100%, the controller 1520 displays additional information on a main screen.

If a magnification is 200%, the controller 1520 displays additional information a+b on the main screen.

If a magnification is 300%, the controller 1520 displays additional information a+b+c on the main screen.

Here, the additional information a may become a name, b may become date of birth, and c may become a representative work title. Moreover, the additional information a may become a name, b may become date of birth and physical size, and c may become academic ability and career. The above additional informations are just exemplary and changeable by user settings.

When an object type is a thing, if a magnification is 100%, the controller 1520 displays additional information A on a main screen.

If a magnification is 200%, the controller 1520 displays additional information A+B on the main screen.

If a magnification is 300%, the controller 1520 displays additional information A+B+C on the main screen.

Figure 37:
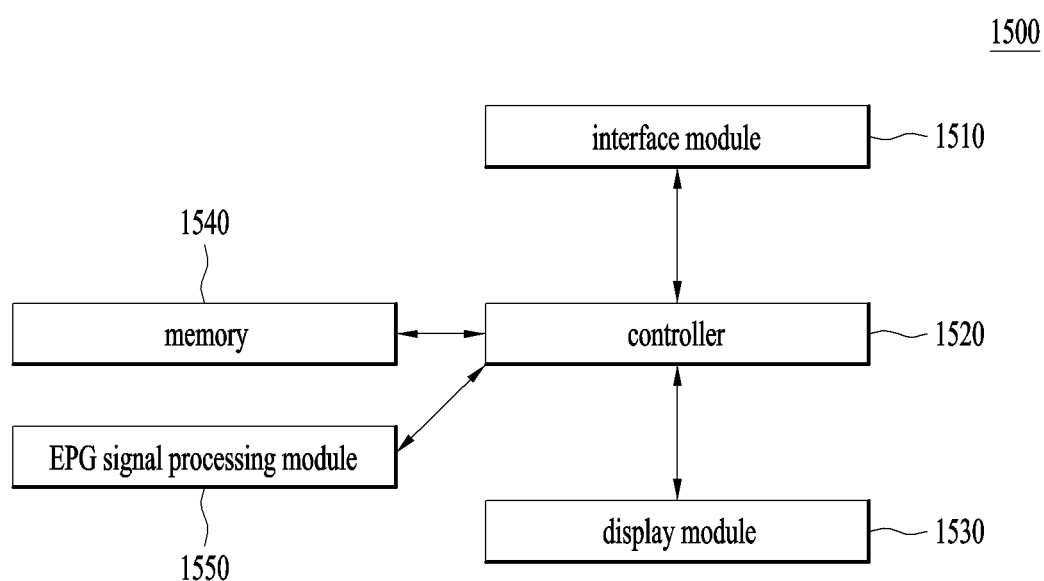
FIG. 37 is a diagram for configuration of a display device according to one embodiment of the present invention.

FIG. 37 is a diagram for configuration of a display device according to one embodiment of the present invention.

Referring to FIG. 37, a display device 1500 may include an interface module 1510, a controller 1520, a display module 1530, a memory 1540, and an EPG signal processing module 1550.

The interface module 1510 receives a first command for selecting a specific location displayed on a main screen from a remote controller.

The display module 1530 displays a content on the main screen of the display device.

The memory 1540 stores the content displayed on the main screen.

The controller 1520 controls the display module 1530, the memory 1540, and the interface module 1510.

The controller 1520 enlarges a specific region located within a preset distance from a specific location and displays the enlarged specific region on a zoom window. If a partial region of the zoom window is located within the main screen, the controller 1520 adjusts a size of the zoom window and a size of the specific region and displays the adjusted zoom window.

Here, the content corresponds to a moving image and a location of the zoom window varies depending on the specific location.

If a full region of the zoom window is located within the main screen, the controller 1520 adjusts the size of the specific region and the size of the zoom window at the same magnification in response to a movement of the pointer by setting a point indicated with the pointer as a start point, and then displays the adjusted zoom window.

This shall be described in detail with reference to FIG. 42 later.

The controller 1520 adjusts a size of a zoom window and a size of a specific region at the same magnification in response to a movement of a pointer by setting a point indicated with the pointer as a start point.

This shall be described in detail with reference to FIG. 43 later.

In specific mode, the controller 1520 changes a zoom window size. If a partial region of the zoom window is located within a main screen, the controller 1520 moves a center point of the zoom window corresponding to a point indicated by a pointer so as to display all regions of the zoom window within the main screen.

This shall be described in detail with reference to FIG. 44 later.

Figure 38:
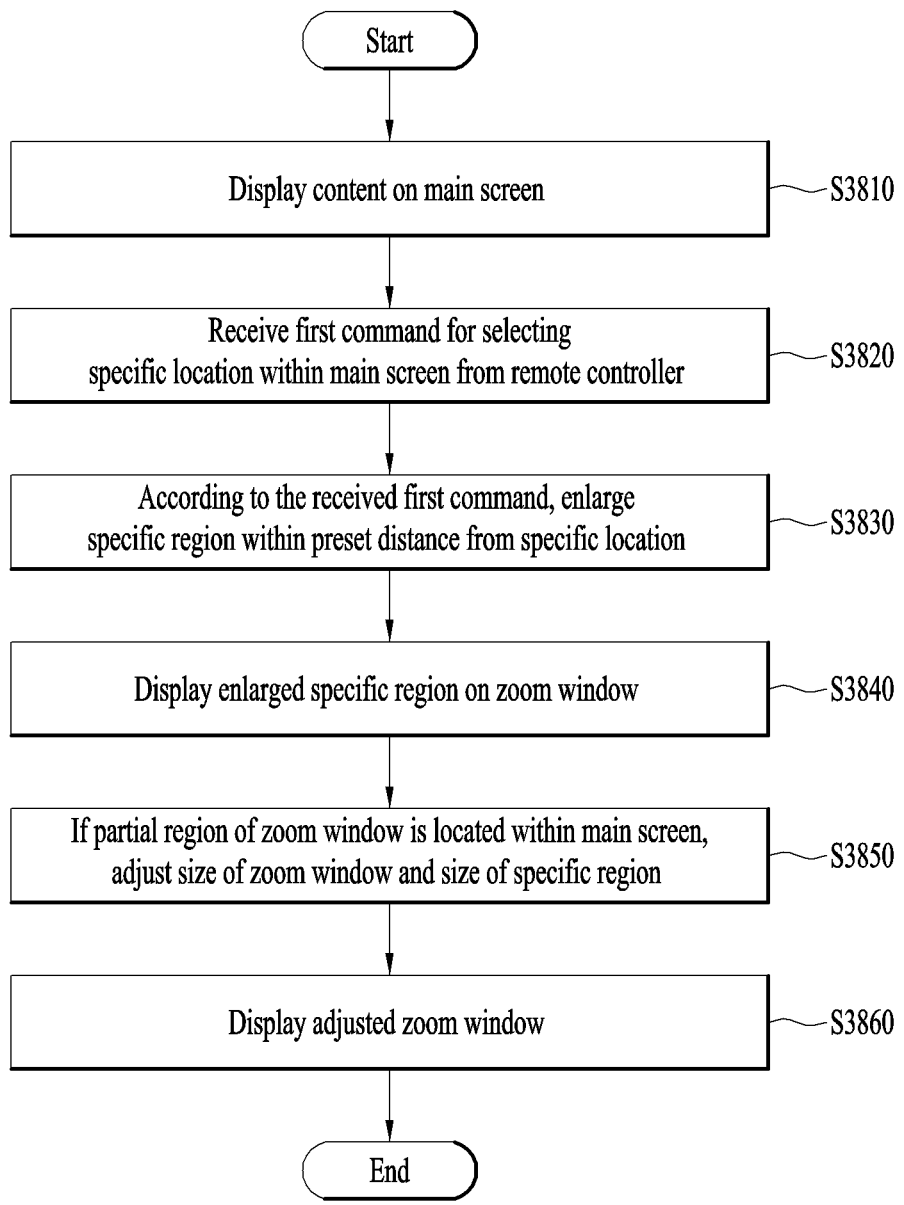
FIG. 38 is a flowchart of a display device controlling method according to one embodiment of the present invention.

FIG. 38 is a flowchart of a display device controlling method according to one embodiment of the present invention. The present invention is performed by the controller 1520.

Referring to FIG. 38, a content is displayed on a main screen of a display device [S3810].

A first command for selecting a specific location within the main screen is received from a remote controller [S3820].

According to the received first command, a specific region within a preset distance from a specific location is enlarged [S3830].

The enlarged specific region is displayed on the zoom window [S3840].

If a partial region of the zoom window is located within the main screen, a size of the zoom window and a size of the specific region are adjusted [S3850].

The adjusted zoom window is displayed [S3860].

Here, the content corresponds to a moving image and a location of the zoom window varies depending on the specific location.

Figure 39:
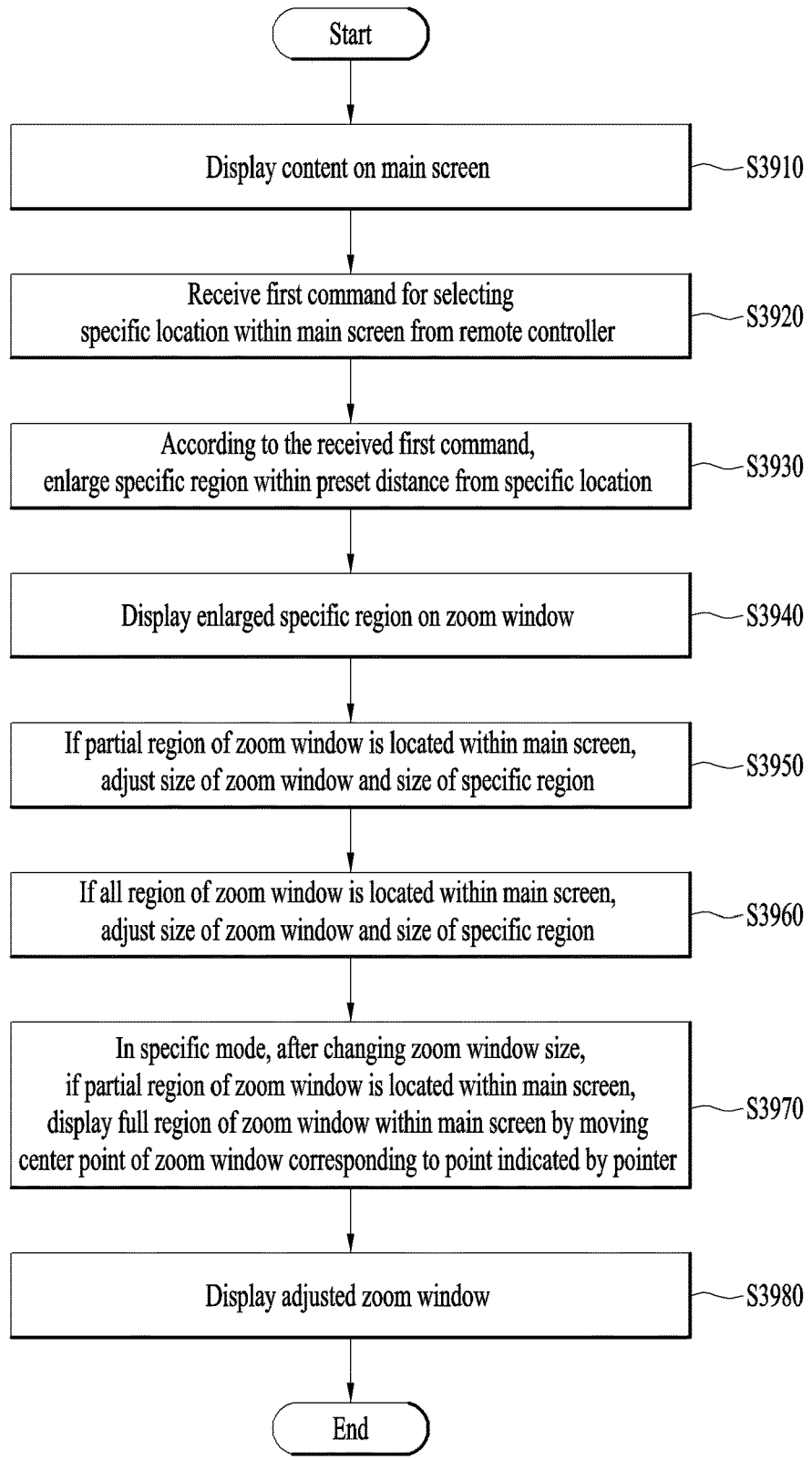
FIG. 39 is a flowchart of a display device controlling method according to one embodiment of the present invention.

FIG. 39 is a flowchart of a display device controlling method according to one embodiment of the present invention. The present invention is performed by the controller 1520.

Referring to FIG. 39, a content is displayed on a main screen of a display device [S3910].

A first command for selecting a specific location within the main screen is received from a remote controller [S3920].

According to the received first command, a specific region within a preset distance from a specific location is enlarged [S3930].

The enlarged specific region is displayed on the zoom window [S3940].

If a partial region of the zoom window is located within the main screen, a size of the zoom window and a size of the specific region are adjusted [S3950].

If a full region of the zoom window is located within the main screen, a size of the zoom window and a size of the specific region are adjusted [S3960].

In specific mode, the controller 1520 changes a zoom window size. If a partial region of the zoom window is located within a main screen, the controller 1520 moves a center point of the zoom window corresponding to a point indicated by a pointer so as to display the full region of the zoom window within the main screen [S3970].

The adjusted zoom window is displayed [S3980].

Figure 40:
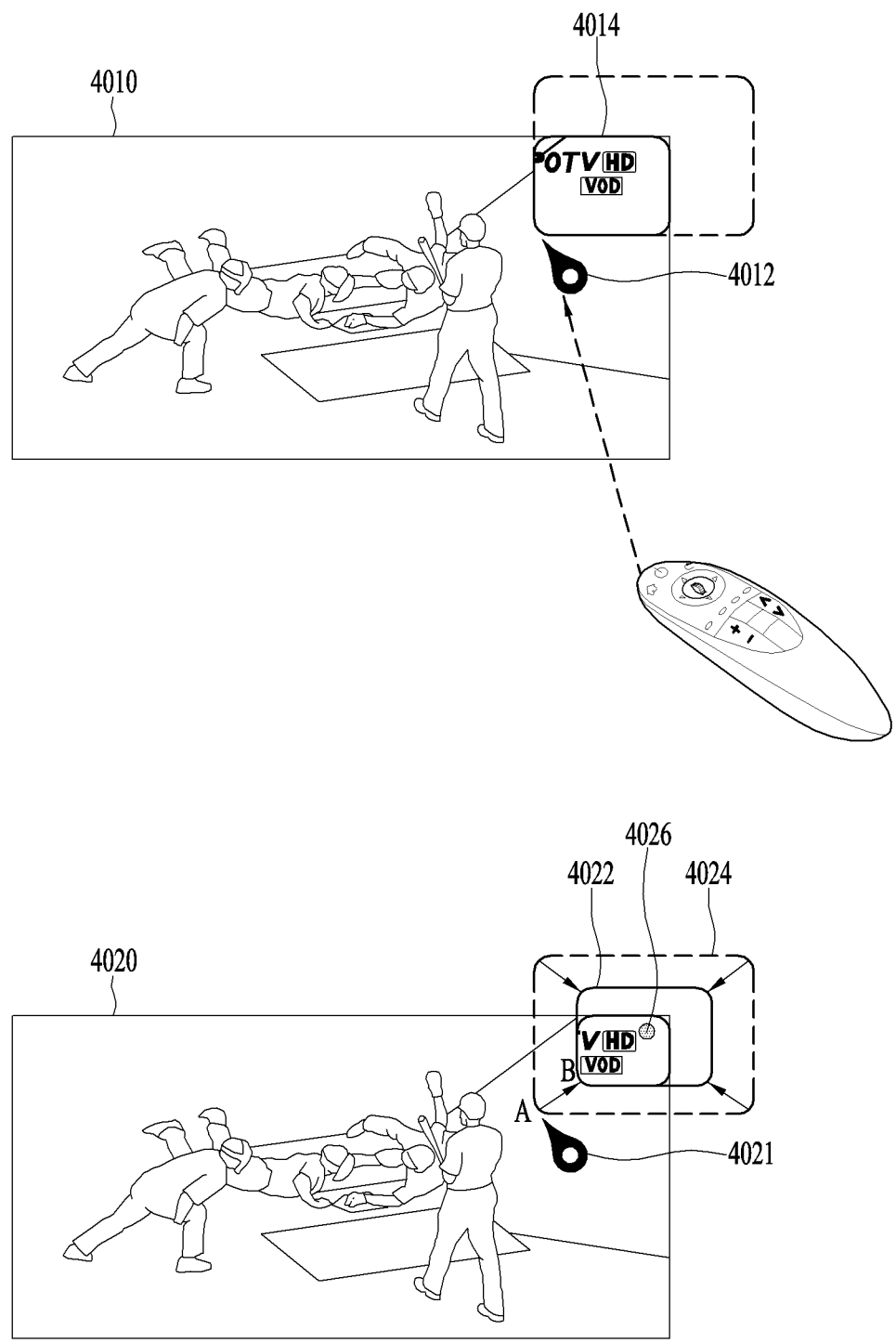
FIG. 40 is a diagram showing that a size of a zoom window is adjusted in hover mode or locking mode according to one embodiment of the present invention.

FIG. 40 is a diagram showing that a size of a zoom window is adjusted in hover mode or locking mode according to one embodiment of the present invention.

Like a main screen 4010, if a zoom window is moved with a pointer 4012 in hover mode, a partial region 4014 of the zoom window is displayed on the main screen.

Like a main screen 4020, if a point A of a zoom window is specified with a pointer 4021 and the specified point A is then moved to a point B, the controller 1520 changes a size of the zoom window from a first size 4024 into a second size 4022 smaller than the first size centering on specific coordinates 4026 of the zoom window.

Here, the specific coordinates 4026 may move to a corner of the main screen from a specific point according to a movement of the pointer 4021.

According to the present invention, since specific coordinates of a zoom window can move to a corner of a main screen from a specific point, a specific region can be specified up to a corner portion of the main screen, an enlarged specific region can be displayed on the zoom window, and a user can watch an enlarged video up to edge corner portions. Therefore, user convenience is improved.

FIG. 41 is a diagram showing that if a prescribed region of a zoom window is located within a main screen in hover mode, a video of the prescribed region is enlarged according to one embodiment of the present invention.

Like a main screen 4110, in hover mode, a zoom window 4112 is moved from a point A to a point B with a pointer 4114.

Like a main screen 4120, the controller 1520 does not display a region of the zoom window located in an external region of the main screen, specifies a partial region of the zoom window displayed on the main screen as a specific region only, and displays an enlarged specific region on the zoom window 4122.

FIG. 42 is a diagram showing that if a whole region of a zoom window is located within a main screen in hover mode, relation between a prescribed region and the zoom window is established according to one embodiment of the present invention.

If a full region of a zoom window is located within a main screen, the controller 1520 adjusts a size of a specific region and a size of the zoom window at the same magnification in response to a movement of a pointer by taking a point indicated with the pointer as a start point and displays the adjusted zoom window.

Like a main screen 4210, resolution of a content is FHD (1920×1080) and coordinates of a corner of a main screen in top-left direction are taken as a reference point (0, 0). An x-coordinate value increases if moving in a right direction from the reference point. A y-coordinate value increases if moving in a bottom direction from the reference point.

Like a main screen 4220, (x, y) is specified with a pointer. Here, x is a width direction center coordinate of a zoom window 4212 and y is a height direction center coordinate of the zoom window.

w_out is a width length of the zoom window. h_out a height length of the zoom window.

x_out is a width direction start point of the zoom window, and y_out is a height direction start point of the zoom window.

x_out=x−w_out/2, where 2 is a magnification and can be adjusted into other values.

y_out=y−h_out/2, where 2 is a magnification and can be adjusted into other values.

Hence, the controller 1520 can display the zoom window based on coordinates (x_out, y_out) of a start point of the zoom window, the width length of the zoom window, and the height length of the zoom window.

Subsequently, a specific region is specified. The present invention specifies a zoom window first and then specifies a specific region according to a magnification based on this.

For example, if a magnification is 2, ½ of a width length of a zoom window and ½ of a height length thereof becomes a width length and a height length of a specific region, respectively.

For example, if a magnification is 3, ⅓ of a width length of a zoom window and ⅓ of a height length thereof become a width length and a height length of a specific region, respectively.

Like a main screen 4220, (x, y) is specified with a pointer. Here, x is a width direction center coordinate of a specific region 4224 and y is a height direction center coordinate of the specific region. And, center coordinates of the specific region 4224 are equal to center coordinates of the zoom window 4222.

w_in is a width length of the specific region. h_out a height length of the specific region.

x_in is a width direction start point of the specific region, and y_in is a height direction start point of the specific region.

x_in =x−w_in/2, where 2 is a magnification and can be adjusted into other values.

y_in =y−h_in/2, where 2 is a magnification and can be adjusted into other values.

Hence, the controller 1520 can specify the specific region based on coordinates (x_in, y_in) of a start point of the specific region, the width length of the specific region, and the height length of the specific region, and adjust a size of the specific region.

Figure 43:
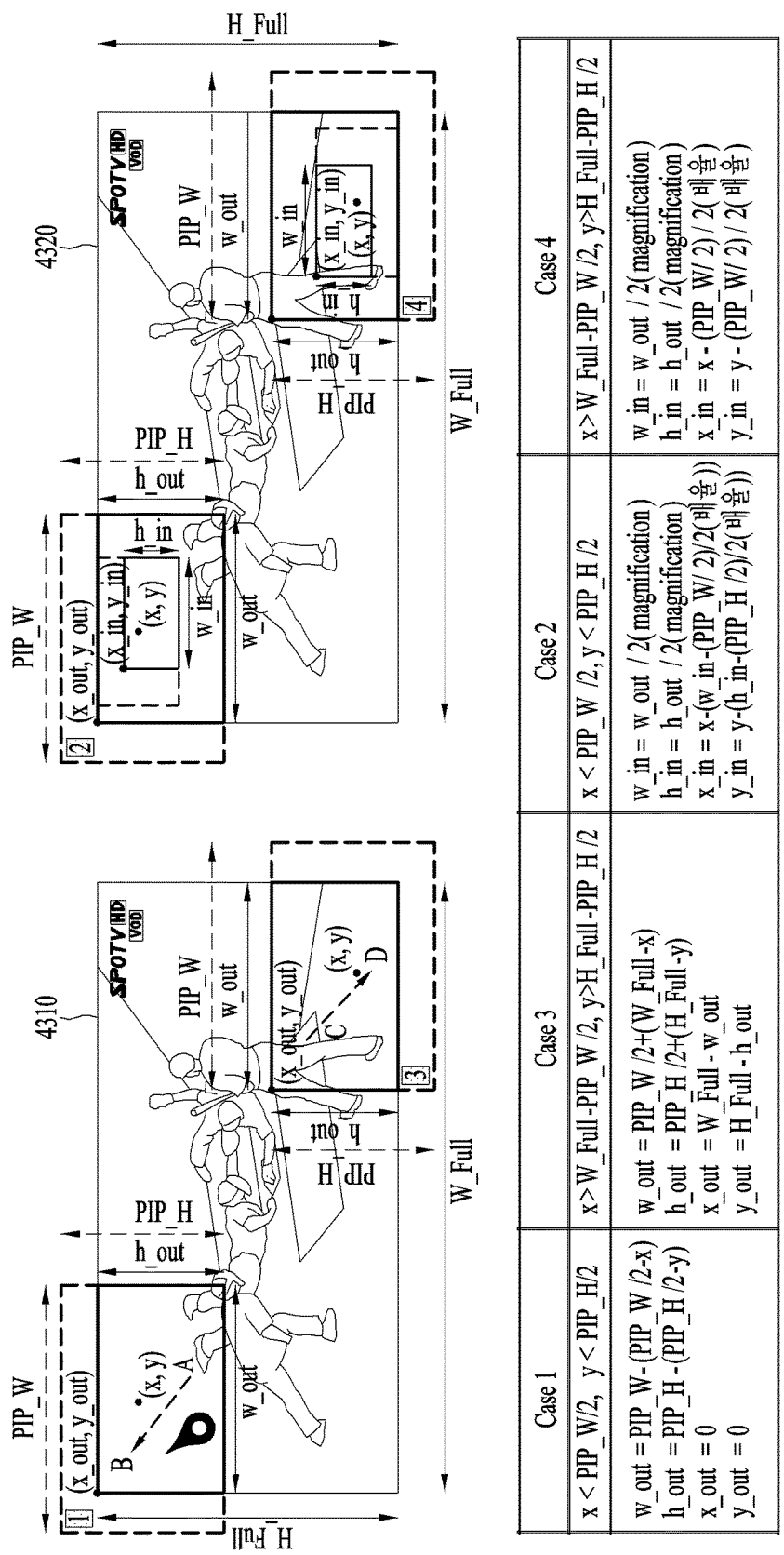
FIG. 43 is a diagram showing that if a prescribed region of a zoom window is located within a main screen in hover mode, relation between a prescribed region and the zoom window is established according to one embodiment of the present invention.

FIG. 43 is a diagram showing that if a prescribed region of a zoom window is located within a main screen in hover mode, relation between a prescribed region and the zoom window is established according to one embodiment of the present invention.

If a partial region of a zoom window is located within a main screen, the controller 1520 adjusts a size of a specific region and a size of the zoom window at the same magnification in response to a movement of a pointer by taking a point indicated with the pointer as a start point and displays the adjusted zoom window.

Case 1 of a main screen 4310 shows a case of moving a zoom window from a point A to a point B using a pointer. A size of the zoom window gradually decreases according to a movement toward the point B from the point A.

Hence, in Case 1, 0<x<PIP_W/2, and 0<y<PIP_H/2.

Namely, an x-coordinate value is smaller than a value resulting from dividing a width length (PIP_W) of a first set zoom window by a magnification 2, and a y-coordinate value is smaller than a value resulting from dividing a height length (PIP_W) of the first set zoom window by a magnification.

First of all, (x, y) is specified with a pointer. Here, x is a width direction center coordinate of the zoom window and y is a height direction center coordinate of the zoom window.

W_out is a width length of the zoom window. H_out is a height length of the zoom window.

W_Full is a width length of a main screen. H_Full is a height length of the main screen.

PIP_W is an initial width length of a zoom window. PIP_H is an initial height length of a zoom window. Here, the initial width length and the initial height length are the lengths before decreasing a size of the zoom window. Moreover, the initial width length and the initial height length may become the lengths of the first set zoom window.

x_out is a width direction start point of the zoom window, and y_out is a height direction start point of the zoom window. In Case 1, x_out=0, and y_out=0.

w_out=PIP_W−(PIP_W/2−x), where 2 is a magnification and can be adjusted into other values.

Namely, the width length (w_out) is a value resulting from subtracting a difference between a value of dividing the width length (PIP_W) of the initial zoom window by a magnification 2 and an x-coordinate value from the width length (PIP_W) of the initial zoom window.

h_out=PIP_H−(PIP_H/2−y), where 2 is a magnification and can be adjusted into other values.

Namely, the height length (h_out) of the zoom window is the value resulting from subtracting a difference between a value of dividing the height length (h_out) of the initial zoom window by the magnification 2 and a y-coordinate value from the height length (PIP_H) of the initial zoom window.

Therefore, the controller 1520 adjusts a size of a zoom window based on coordinates (x_out, y_out) of a start point of a zoom window, a width length of the zoom window, and a height length of the zoom window, and is able to display the zoom window.

Case 2 of a main screen 4320 shows a case of specifying a specific region when a zoom window is moved from a point A to a point B with a pointer. A size of the zoom window gradually decreases according to a movement toward the point B from the point A. And, the specific region gradually decreases according to a movement toward the point B from the point A as well.

Hence, in Case 2, 0<x<PIP_W/2, and 0<y<PIP_H/2.

Namely, when a size of a specific region is adjusted, an x-coordinate value is smaller than a value resulting from dividing a width length (PIP_W) of an initial zoom window by a magnification 2, and a y-coordinate value is smaller than a value resulting from dividing a height length (PIP_W) of the initial zoom window by a magnification 2.

First of all, (x, y) is specified with a pointer. Here, x is a width direction center coordinate of the specific region and y is a height direction center coordinate of the specific region. Center coordinates of the specific region 4224 are equal to center coordinates of the zoom window 4222.

w_in is a width length of a specific region. h_in is a height length of the specific region.

x_in is a width direction start point of the specific region, and y_in is a height direction start point of the specific region.

w_in=w_out/2, where 2 is a magnification and can be adjusted into other values.

Namely, the width length (w_in) of the specific region is a value resulting from dividing the width length (w_out) of the zoom window by a magnification 2.

h_in =h_out/2, where 2 is a magnification and can be adjusted into other values.

Namely, the height length (h_in) of the specific region is a value resulting from dividing the height length (h_out) of the zoom window by a magnification 2.

x_in =x−(w_in−(PIP_W/2))/2, where 2 is a magnification and can be adjusted into other values.

Namely, a start point x-coordinate value (x_in) of the specific region is a value resulting from subtracting a value, which results from dividing a difference between the width length (w_in) of the zoom window and a value, which result from dividing the width length (PIP_W) of the initial zoom window by a magnification 2, by the magnification 2 from the x-coordinate value.

y_in =y−(h_in−(PIP_W/2))/2, where 2 is a magnification and can be adjusted into other values.

A start point y-coordinate value (y_in) of the specific region is a value resulting from subtracting a value, which results from subtracting a value of dividing the height length (PIP_H) of the initial zoom window by the magnification 2 from the height length (h_in) of the zoom window, divided by the magnification 2 from the y-coordinate value.

Hence, the controller 1520 can specify the specific region based on the coordinates (x_in, y_in) of a start point of the specific region, a width length of the specific region and a height length of the specific region and adjust a size of the specific region.

Case 3 of a main screen 4310 shows a case of moving a zoom window from a point C to a point D using a pointer. A size of the zoom window gradually decreases according to a movement toward the point D from the point C.

Hence, in Case 3, W_Full−PIP_W/2<x<W_Full, and H_Full−PIP_H/2<y<H_Full.

First of all, (x, y) is specified with a pointer. Here, x is a width direction center coordinate of the zoom window and y is a height direction center coordinate of the zoom window.

x_out is a width direction start point of a zoom window, and y_out is a height direction start point of the zoom window.

x_out=W_Full−w_out, and y_out=H_Full−h_out.

w_out=PIP_W/2+(W_Full−x), where 2 is a magnification and can be adjusted into other values.

h_out=PIP_H/2−(H_Full−y), where 2 is a magnification and can be adjusted into other values.

Therefore, the controller 1520 can display the zoom window based on the coordinates (x_out, y_out) of the start point of the zoom window, the width length of the zoom window and the height length of the zoom window.

Case 4 of a main screen 4320 shows a case of specifying a specific region when a zoom window is moved from a point C to a point D with a pointer. A size of the zoom window gradually decreases according to a movement toward the point D from the point C. And, the specific region gradually decreases according to a movement toward the point D from the point C as well.

Hence, in Case 4, W_Full−PIP_W/2<x<W_Full, and H_Full−PIP_H/2<y<H_Full.

First of all, (x, y) is specified with a pointer. Here, x is a width direction center coordinate of the specific region and y is a height direction center coordinate of the specific region. Center coordinates of the specific region are equal to center coordinates of the zoom window.

w_in is a width length of a specific region. h_in is a height length of the specific region.

x_in is a width direction start point of the specific region, and y_in is a height direction start point of the specific region.

w_in=w_out/2, where 2 is a magnification and can be adjusted into other values.

h_in =h_out/2, where 2 is a magnification and can be adjusted into other values.

x_in =x−(PIP_W/2)/2, where 2 is a magnification and can be adjusted into other values.

y_in =y−(PIP_W/2)/2, where 2 is a magnification and can be adjusted into other values.

Hence, the controller 1520 can specify the specific region based on the coordinates (x_in, y_in) of a start point of the specific region, a width length of the specific region and a height length of the specific region and adjust a size of the specific region.

Figure 44:
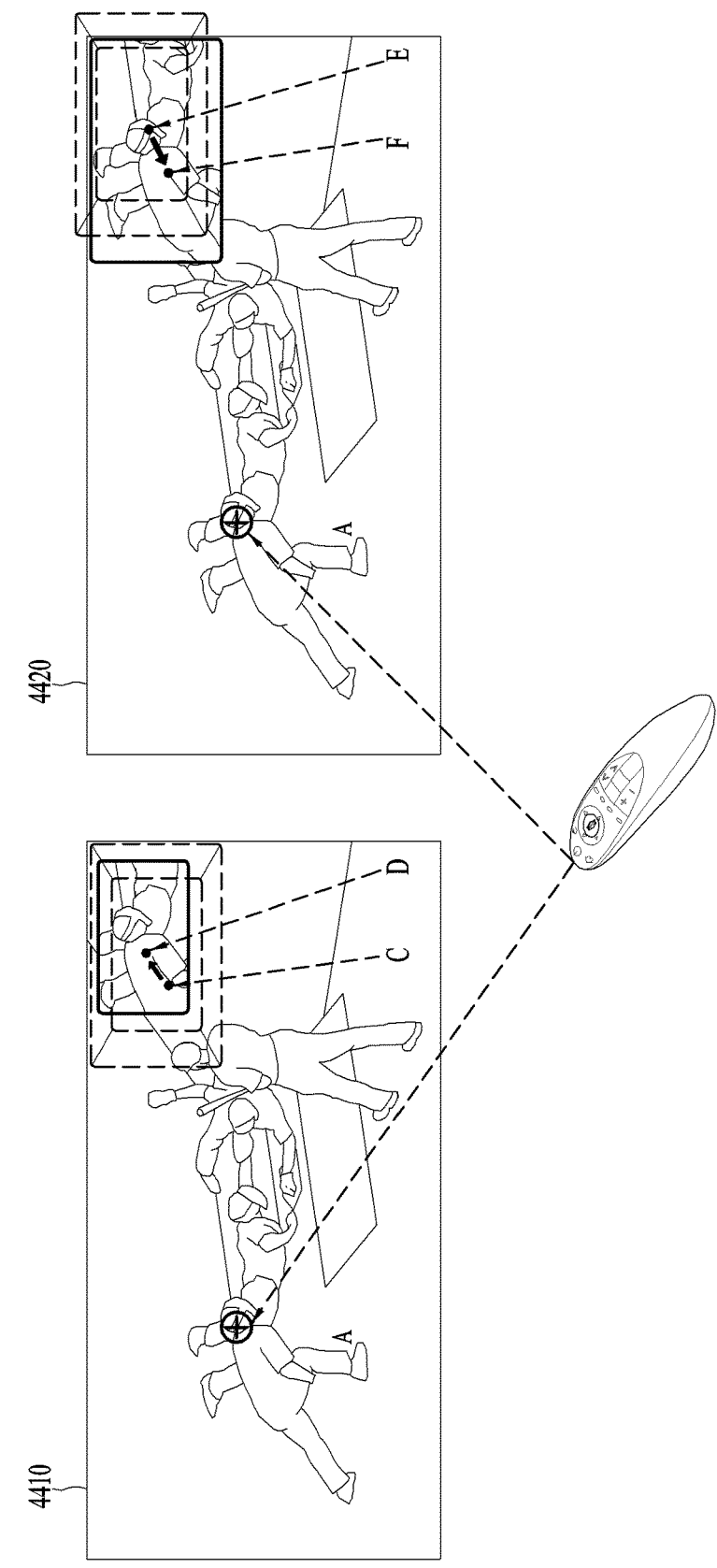
FIG. 44 is a diagram showing that a size of a zoom window is adjusted in pointing mode according to one embodiment of the present invention.

FIG. 44 is a diagram showing that a size of a zoom window is adjusted in pointing mode according to one embodiment of the present invention.

The controller 1520 changes a zoom window size in pointing mode. If a partial region of the zoom window is located within a main screen, the controller 1520 moves a center point of the zoom window corresponding to a point indicated with a pointer so that all regions of the zoom window are displayed in a manner of being located within the main screen.

Like a main screen 4410, in pointing mode, the controller 1520 controls a specific region of a point A to be displayed on a zoom window. If a size of the zoom window is reduced by moving a center point of the zoom window from a point C to a point D with a pointer, the controller 1520 controls all regions of the zoom window to be located and displayed within the main screen.

Namely, when the center point of the zoom window is moved from the point C to the point D, the controller 1520 reduces the specific region and the zoom window at the same rate simultaneously.

Like a main screen 4420, in pointing mode, the controller 1520 controls a specific region of a point A to be displayed on a zoom window. If a size of the zoom window is enlarged by moving a center point of the zoom window from a point E to a point F with a pointer, the controller 1520 controls all regions of the zoom window to be located and displayed within the main screen.

Namely, when the center point of the zoom window is moved from the point E to the point F, the controller 1520 enlarges the specific region and the zoom window at the same rate simultaneously.

FIG. 45 is a diagram showing that if a zoom window is located within a main screen, relation between a specific region and the zoom window is established according to one embodiment of the present invention.

In pointing mode, if a specific region is specified with a pointer, the controller 1520 displays the specific region enlarged at a prescribed magnification on a zoom window.

Like a main screen 4510, (x2, y2) is specified. Here, x2 is a width direction center coordinate of a zoom window 4512 and y2 is a height direction center coordinate of the zoom window.

w_out is a width length of the zoom window. h_out is a height length of the zoom window.

x_out is a width direction start point of the zoom window, and y_out is a height direction start point of the zoom window.

x_out=x2−w_out/2, where 2 is a magnification and can be adjusted into other values.

y_out=y2−h_out/2, where 2 is a magnification and can be adjusted into other values.

Therefore, based on the coordinates (x_out, y_out) of the start point of the zoom window, the width length (w_out) of the zoom window and the height length (h_out) of the zoom window, the controller 1520 can display the zoom window 4512.

Subsequently, a specific region is specified. The present invention specifies a zoom window first and then specifies a zoom window at a magnification based on this.

Like a main screen 4520, (x, y) is specified with a pointer. Here, x is a width direction center coordinate of the specific region 4524 and y is a height direction center coordinate of the specific region. Center coordinates of the specific region 4524 are different from center coordinates of the zoom window 4522 unlike the hover mode.

w_in is a width length of a specific region. h_in is a height length of the specific region.

x_in is a width direction start point of the specific region, and y_in is a height direction start point of the specific region.

x_in =x−(PIP_W/2)/2, where 2 is a magnification and can be adjusted into other values.

y_in =y−(PIP_W/2)/2, where 2 is a magnification and can be adjusted into other values.

Hence, the controller 1520 can specify the specific region based on the coordinates (x_in, y_in) of a start point of the specific region, a width length of the specific region and a height length of the specific region and adjust a size of the specific region.

Figure 46:
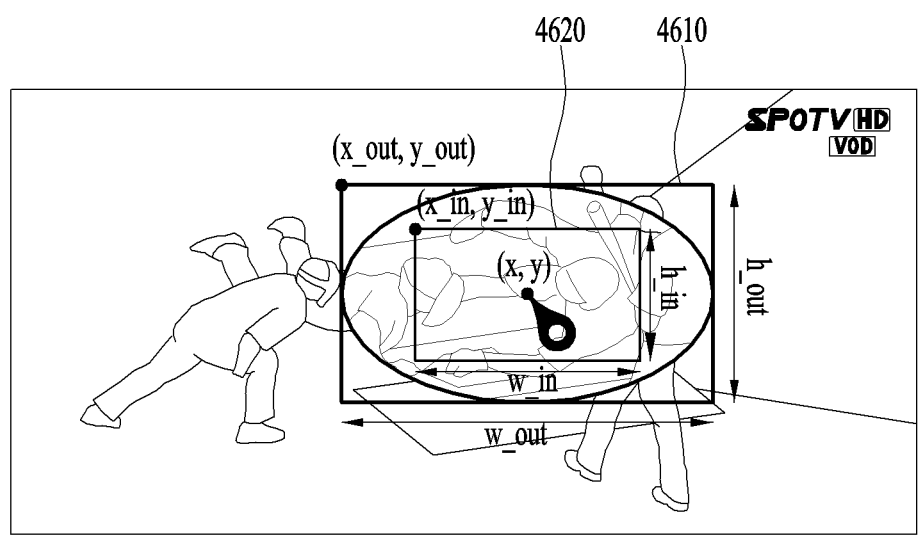
FIG. 46 is a diagram showing that shapes of a zoom window and a specific region are changed according to one embodiment of the present invention.

FIG. 46 is a diagram showing that shapes of a zoom window and a specific region are changed according to one embodiment of the present invention.

Referring to FIG. 46, there are a zoom window 4610 and a specific region 4620.

If receiving an input of specifying a specific location (x, y), the controller 1520 specifies the specific region 4620 located within a prescribed distance centering on the specific location, enlarges the specific region, and displays the enlarged specific region on the zoom window 4610.

The specific region 4620 and the zoom window 4610 are defaulted as rectangles or squares.

When a shape of the specific region is the rectangle, if a specific input signal is received from a remote controller, the controller 1520 can change the shape of the specific region into an ellipse inscribed in the rectangle.

When a shape of the specific region is the square, if a specific input signal is received from a remote controller, the controller 1520 can change the shape of the specific region into an ellipse inscribed in the square.

The above case applies to a case that a shape of the zoom window is a rectangle or a square.

According to the present invention, the following advantages can be provided. First of all, a shape of a specific region or a zoom window can be changed from a rectangle into an ellipse inscribed in the rectangle or from a square into a circle inscribed in the square. Secondly, using an ellipse or circle inscribed in an original shape, the correlation configuration between a specific region and a zoom window can be used as it is.

Each of FIG. 47A and FIG. 47B is a diagram showing an enlarged video within a zoom window when a center of a zoom window is moved from a specific point to a corner of a main screen according to one embodiment of the present invention.

Like a main screen 4710, in hover mode, a shape of a zoom window is a circle. The controller 1520 displays a specific region enlarged at a magnification of 300% on the zoom window 4712.

Like a main screen 4720, if the zoom window is moved from a point A to a point B, the controller 1520 displays a specific region enlarged at 300% on the zoom window. Here, as the zoom window is moved from the point A to the point B, a shape of the zoom window is changed into a quartile circle 4722 from a circle.

Like a main screen 4730, if the zoom window is moved from a point A to a point B, the controller 1520 displays a specific region enlarged at 300% on the zoom window. Here, as the zoom window is moved from the point A to the point B, a shape of the zoom window is changed into an ellipse 4732 from a circle.

Like a main screen 4740, if the zoom window is moved from a point A to a point B, the controller 1520 displays a specific region enlarged at 300% on the zoom window. Here, as the zoom window is moved from the point A to the point B, a shape of the zoom window is changed into a rectangle 4742 from a circle.

In particular, the point A is a current center point of the circular zoom window and the point B is a top-right corner to which the circular zoom window can reach as far as possible. If the center of the zoom window reaches the corner point B from the point A, the controller 1520 changes a shape of the zoom window.

For example, if coordinates of a zoom window center point is changed from (1600, 480) into (1920, 0), the controller 1520 executes a command for changing a shape of a zoom window. According to the command execution, the shape of the zoom window is changed from a circle into one of various shapes including a rectangle, an ellipse and the like. Here, the coordinates (1920, 0) are the final values the coordinates of the zoom window center point can reach as far as possible, whereby the zoom window center point cannot move further.

After the shape of the zoom window has been changed, the controller 1520 flickers an outline of the zoom window for a prescribed time like a flasher. Hence, a user can intuitively recognize that the shape of the zoom window has been changed.

According to the present invention, using a circular zoom window, a user interface enabling a user to recognize a screen enlargement function intuitively can be provided and a full region of a main screen can be enlarged without generating a blind spot from a corner portion. Therefore, user convenience is improved.

FIG. 48 is a diagram showing that an enlarged video of a zoom window is displayed differently depending on a magnification according to one embodiment of the present invention.

Like a main screen 4810, in hover mode, if a magnification is 300%, the controller 1520 displays a specific region enlarged at 300% on a zoom window 4812.

Like a main screen 4820, in hover mode, if a magnification is 500%, the controller 1520 displays a specific region enlarged at 500% on a zoom window 4822.

According to one embodiment of the present invention, a screen can be implemented follows. First of all, the relation between a specific region and a zoom window is established by a mathematical algorithm. When the zoom window is moved to a corner of a main screen from a specific point, the specific region and the zoom window can be naturally reduced on the screen, thereby improving user convenience.

According to another embodiment of the present invention, all regions of a main screen can be enlarged without generating a blind spot from a corner part when a zoom window is moved to a corner of the main screen from a specific point, thereby improving user convenience.

According to another embodiment of the present invention, using a zoom window of a circular type, a user interface enabling a user to intuitively recognize a screen enlargement function can be provided, thereby improving user convenience.

According to one embodiment of the present invention, a user-interested specific region is specified on a screen, the specific region can be enlarged at a user-desired rate centering on a point indicated by a pointer, and a user can be provided with an intuitive magnifier function by reflecting a location change of the specific region according to a movement of the pointer by real time. Therefore, user convenience is improved.

According to another embodiment of the present invention, when a user specifies a specific object, additional information on the specific object is displayed differently according to a screen enlargement rate. Thus, the additional information can be displayed by reflecting an extent of user's interest in the specific object. Therefore, user convenience is improved.

According to another embodiment of the present invention, the volume of an audio signal of a specific object specified by a user is turned up and an enlarged specific object is displayed as well, whereby a size of a user-interested specific object and a volume of an audio signal can be simultaneously increased. Therefore, user convenience is improved.

According to further embodiment of the present invention, if a content is a weather forecast, a specific region in which a sign language appears is enlarged. The enlarged specific region is displayed on a zoom window. As the zoom window is fixed, it is not moved according to a movement of a pointer, thereby enabling a user to stably display the zoom window. Therefore, user convenience is improved.

The video display device and operating method thereof according to the present invention can be achieved by combination of structural elements and features of the present invention. Each of the structural elements or features should be considered selectively unless specified separately. Also, some structural elements and/or features may be combined with one another to enable various modifications of the embodiments of the present invention.

The method of operating the video display device according to the present invention can be implemented as processor-readable codes in a recording medium readable by a processor provided to the video display device. The processor-readable media may include all kinds of recording devices in which data readable by a processor are stored. The processor-readable recording media may include ROM, RAM, CD-ROM, magnetic tapes, floppy discs, optical data storage devices, and the like for example and also include carrier-wave type implementations (e.g., transmission via Internet). Further, the recording medium readable by a processor is distributed to a computer system connected to a network, whereby codes readable by the processor by distribution can be saved and executed.

Moreover, although embodiments have been described with reference to a number of illustrative embodiments thereof, it should be understood that numerous other modifications and embodiments can be devised by those skilled in the art that will fall within the spirit and scope of the principles of this disclosure. And, such modifications and variations should not be individually understood from the technical idea or prospect of the present invention.

The present invention is applicable to TV, STB (set-top box), mobile devices and the like and its industrial applicability is acknowledged.

What is claimed is:

1. A broadcast receiver, comprising:
a tuner configured to receive a broadcast signal;
a display configured to display a content on a main screen;
an interface configured to receive a first command for selecting a specific location within the main screen from a remote controller; and
a controller configured to control the tuner, the display and the interface,
wherein the controller is configured to:
enlarge a specific region within a distance from the specific location according to the received first command,
display the enlarged specific region on a zoom window on the display,
if the zoom window is moved to a side of the main screen, adjust a size of the zoom window, and
display the adjusted zoom window on the display.

2. The broadcast receiver of claim 1, wherein the interface is further configured to receive information on a motion sensed through a sensor of the remote controller.

3. The broadcast receiver of claim 1, wherein the content corresponds to a moving image received through the tuner, and
wherein the location of the zoom window varies depending on the specific location.

4. The broadcast receiver of claim 1, wherein if the zoom window is recognized as located in a specific range within the main screen, the controller is further configured to automatically change a graphic image corresponding to the zoom window.

5. The broadcast receiver of claim 4, wherein the specific range comprises a present distance from a corner of the main screen.

6. The broadcast receiver of claim 1, wherein the interface is configured to receive a specific command sensed through a touch sensor or wheel mouse attached to the remote controller, and
wherein the controller is configured to automatically change at least one of a size of the zoom window and a resolution within the zoom window according to the received command.

7. The broadcast receiver of claim 6, wherein the specific command comprises at least one of first information on directivity and second information on a speed.

8. The broadcast receiver of claim 1, wherein the interface is configured to receive a second command for selecting a magnification of the zoom window from the remote controller, and
wherein the controller is further configured to display other additional information according to the received second command.

9. The broadcast receiver of claim 8, further comprising a communication module configured to communicate with a server to receive the additional information.

10. The broadcast receiver of claim 1, wherein a location of the zoom window is changed in response to a motion of the remote controller.

11. The broadcast receiver of claim 1, wherein the controller is further configured to:
if the zoom window is located within the main screen, display the zoom window with a first size, and if the zoom window is moved to the side of the main screen, display the zoom window with a second size smaller than the first size.

12. The broadcast receiver of claim 11, wherein the side of the main screen is at least one of the corners of the main screen.

13. The broadcast receiver of claim 1, wherein if a partial region of the zoom window is located within the main screen, the controller is further configured to adjust the size of the zoom window and a size of the specific region.

14. A method of controlling a broadcast receiver, comprising:
receiving a broadcast signal via a tuner;
displaying a content on a main screen of a display;
receiving, via an interface, a first command for selecting a specific location within the main screen from a remote controller; and
controlling, via a controller, to enlarge a specific region within a distance from the specific location according to the received first command;
displaying, via the controller, the enlarged specific region on a zoom window on the display,
if the zoom window is moved to a side of the main screen, adjusting, via the controller, a size of the zoom window, and
displaying, via the controller, the adjusted zoom window on the display.

15. The method of claim 14, wherein the receiving the first command comprises receiving information on a motion sensed through a sensor of the remote controller.

16. The method of claim 14, wherein the content corresponds to a moving image received through the tuner, and wherein the location of the zoom window varies depending on the specific location.

17. The method of claim 14, wherein the controlling further comprises, if the zoom window is recognized as located in a specific range within the main screen, automatically changing a graphic image corresponding to the zoom window.

18. The method of claim 17, wherein the specific range comprises a present distance from a corner of the main screen.

19. The method of claim 14, wherein the receiving the first command comprises receiving a specific command sensed through a touch sensor or wheel mouse attached to the remote controller and wherein the controlling comprises automatically changing at least one of a size of the zoom window and a resolution within the zoom window according to the received command.

20. The method of claim 19, wherein the specific command comprises at least one of first information on directivity and second information on a speed.

21. The method of claim 14, wherein the receiving the first command comprises receiving a second command for selecting a magnification of the zoom window from the remote controller and wherein the controlling comprises displaying other additional information according to the received second command.

22. The method of claim 21, further communicating with a server to receive the additional information.

* * * * *